(12) United States Patent  
Cai et al.

(10) Patent No.: US 11,196,742 B2  
(45) Date of Patent: Dec. 7, 2021

(54) METHOD, SYSTEM, AND DEVICE FOR COMMUNICATING DATA BETWEEN DEVICES TO CONTROL ONE OF THE DEVICES

(71) Applicant: BANMA ZHIXING NETWORK (HONGKONG) CO., LIMITED, Kowloon (HK)

(72) Inventors: Yanming Cai, Hangzhou (CN); Chunhui Zhang, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 112 days.

(21) Appl. No.: 16/230,603

(22) Filed: Dec. 21, 2018

(65) Prior Publication Data

US 2019/0273737 A1     Sep. 5, 2019

Related U.S. Application Data

(63) Continuation-in-part of application No. PCT/CN2017/088943, filed on Jun. 19, 2017.

(30) Foreign Application Priority Data

Jun. 30, 2016    (CN) .......................... 201610503294.9

(51) Int. Cl.
| | |
|---|---|
| *H04L 29/06* | (2006.01) |
| *H04N 21/2387* | (2011.01) |
| *H04N 21/25* | (2011.01) |
| *H04L 9/32* | (2006.01) |

(52) U.S. Cl.
CPC ............ *H04L 63/0876* (2013.01); *H04L 9/32* (2013.01); *H04L 29/06* (2013.01); *H04L 63/045* (2013.01); *H04N 21/2387* (2013.01); *H04N 21/25* (2013.01)

(58) Field of Classification Search
CPC ..... H04L 63/0876; H04L 63/045; H04L 9/32; H04L 29/06
See application file for complete search history.

(56) References Cited

U.S. PATENT DOCUMENTS

| | | |
|---|---|---|
| 7,725,584 B1 | 5/2010 | Lee |
| 7,805,605 B2 | 9/2010 | Yukiko |
| 8,515,066 B2 | 8/2013 | Makoto |

(Continued)

FOREIGN PATENT DOCUMENTS

| | | |
|---|---|---|
| CN | 103067919 | 4/2013 |
| CN | 104881593 | 9/2015 |

(Continued)

*Primary Examiner* — Vance M Little  
(74) *Attorney, Agent, or Firm* — Van Pelt, Yi & James LLP

(57) ABSTRACT

The present application discloses a method, device, and system for data transmission. The system includes a first terminal having an associated terminal ID and a server. At least one of the first terminal and the server establishes a channel between the first terminal and the server based at least in part on the terminal ID, the channel corresponding to a communication channel that is to be used by the first terminal and the server to communicate data. The terminal ID is used to authenticate the first terminal in connection with the channel being established between the first terminal and the server.

26 Claims, 17 Drawing Sheets

(56) References Cited

U.S. PATENT DOCUMENTS

| | | |
|---|---|---|
| 8,848,912 B2 | 9/2014 | Koichi |
| 9,398,623 B2 | 7/2016 | Shinji |
| 2005/0065796 A1* | 3/2005 | Wyss .................. G10L 15/30 704/270 |
| 2005/0255886 A1 | 11/2005 | Janne |
| 2006/0114863 A1 | 6/2006 | Sanzgiri |
| 2008/0098464 A1 | 4/2008 | Mizrah |
| 2010/0057843 A1* | 3/2010 | Landsman .......... H04L 63/0876 709/203 |
| 2015/0222517 A1* | 8/2015 | McLaughlin ........... H04L 9/006 713/156 |
| 2015/0222621 A1* | 8/2015 | Baum ................. H04L 63/0807 726/9 |
| 2016/0111091 A1* | 4/2016 | Bakish .................. G10L 15/30 704/275 |
| 2016/0195602 A1* | 7/2016 | Meadow ............. G06Q 20/308 701/517 |
| 2016/0226732 A1* | 8/2016 | Kim ............... H04W 12/04031 |
| 2016/0283352 A1* | 9/2016 | Kraus .................... H04L 41/00 |
| 2016/0300537 A1* | 10/2016 | Hoffman ............. G09G 3/2092 |

FOREIGN PATENT DOCUMENTS

| | | |
|---|---|---|
| CN | 105101206 | 11/2015 |
| WO | 2009155872 | 12/2009 |

\* cited by examiner

700

METHOD, SYSTEM, AND DEVICE FOR COMMUNICATING DATA BETWEEN DEVICES TO CONTROL ONE OF THE DEVICES

CROSS REFERENCE TO OTHER APPLICATIONS

This application is a continuation-in-part of and claims priority to International (PCT) Application No. PCT/CN2017/088943 entitled DATA TRANSMISSION SYSTEM, METHOD AND DEVICE filed Jun. 19, 2017 which is incorporated herein by reference in its entirety for all purposes, which claims priority to China Patent Application No. 201610503294.9 entitled A DATA TRANSMISSION SYSTEM, METHOD AND DEVICE, filed on Jun. 30, 2016 which is incorporated by reference in its entirety for all purposes.

FIELD OF THE INVENTION

The present invention relates to a field of computer application technology. In particular, the present application relates to a system, method, and device for data transmission.

BACKGROUND OF THE INVENTION

As a result of the continuing development of computer networks and smart devices and, in particular, the evolution of the Internet of Things, various types of information are being communicated between various devices, including information being communicated between a terminal device and a server device, and information being communicated between terminal devices. In other words, various electronic devices (e.g., terminals, servers, etc.) are becoming interconnected. However, although the Internet of Things is in a stage of rapid development, the Internet of Things is formed of disparate technologies, including different implementations for communicating among terminals and servers.

In view of the above, there is a need for a method, system, and device for data transmission, and for a more effective and efficient method for configuring and performing data transmission in the context of the Internet of Things.

BRIEF DESCRIPTION OF THE DRAWINGS

Various embodiments of the invention are disclosed in the following detailed description and the accompanying drawings.

DETAILED DESCRIPTION

Figure 1:
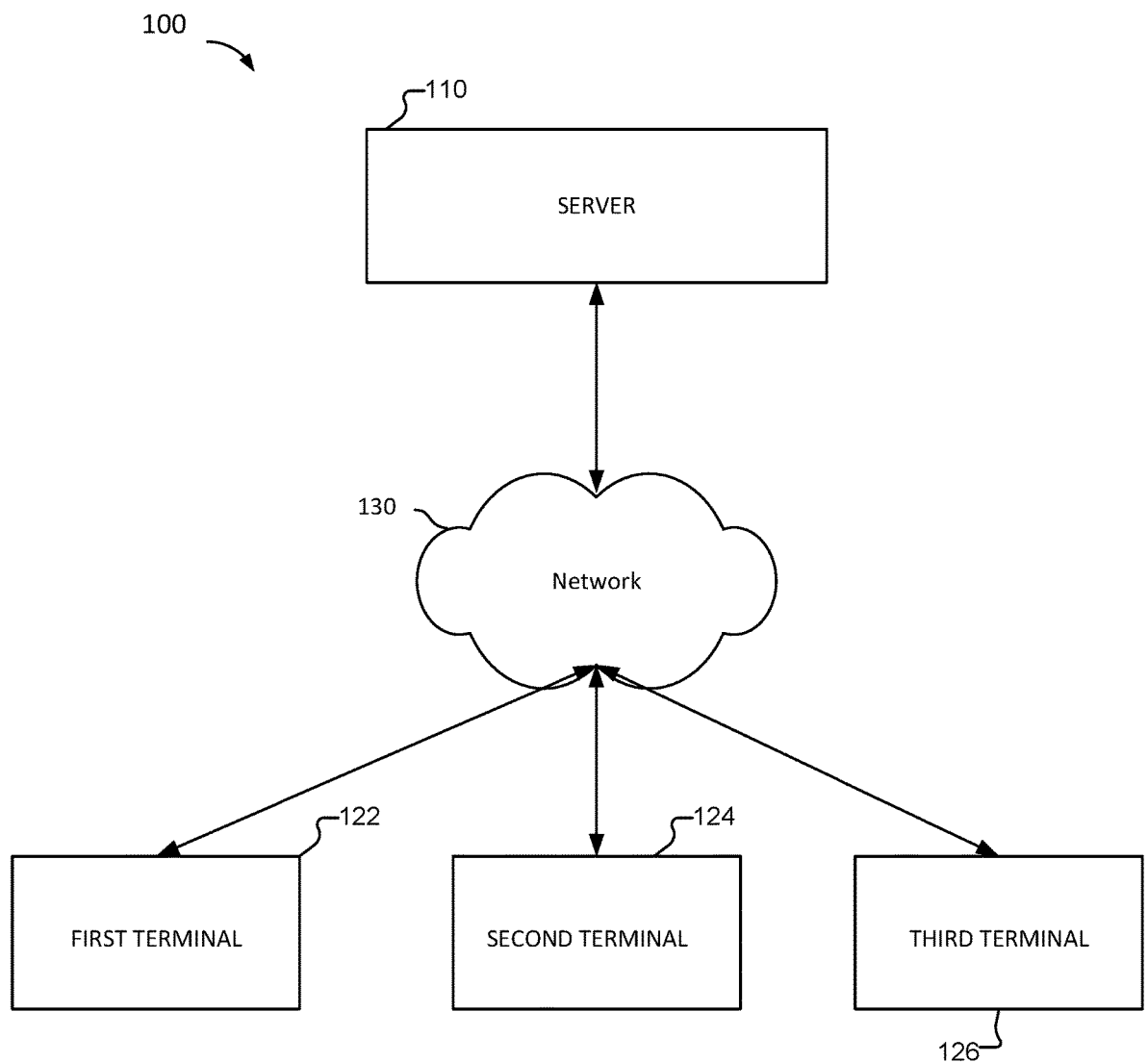
FIG. 1 is a structural diagram of a system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to further clarify the goals, technical schemes, and advantages of the present invention, the present invention is described in detail below in light of the drawings and specific embodiments.

The terms used in embodiments of the present invention merely serve to describe specific embodiments and are not intended to restrict the present invention. "A," "said," and "the" or "this" as used in their singular form in embodiments of the present invention and the claims also are intended to encompass the plural form, unless otherwise clearly indicated by the context.

Please note that the term "and/or" used herein is merely a relationship describing related objects. It may indicate three kinds of relationships. For example, A and/or B may indicate the three situations of: only A exists, A and B both exist, and only B exists. In addition, the symbol "/" herein generally expresses an "or" relationship between the preceding and following objects.

Depending on context, the word "if" when used herein may be interpreted as "when" or "upon" or "in response to the determination that" or "in response to the detection of" Depending on the context, the phrase "upon determining" or "upon detecting (a stated condition or event)" may be understood as "when it is determined" or "in response to the determination that" or "upon detecting (a stated condition or event" or "in response to the detection of (a stated condition or event))."

As used herein, a "terminal" generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, a smart watch, an augmented reality device, a mixed reality device such as a device that can support virtual reality and augmented reality), a kiosk such as a vending machine, a smart home appliance or device, vehicle-mounted mobile stations, a terminal mounted to a vehicle, an Internet-connected vehicle, a smart medical device, or the like. A terminal can run various operating systems. A smart home appliance or device can be, but is not limited to, a smart television, smart air-conditioning, a smart water heater, a smart refrigerator, or a smart air-purifier. The smart home device may also be a smart lock, a smart electrical outlet, a smart lamp, or a smart camera. Smart medical devices can include, for example, smart thermometers, smart blood pressure monitors, and smart blood glucose meters. A smart terminal can correspond to a terminal that operates an operating system. For example, one or more applications can be installed on a smart terminal. The smart terminal can exchange information with another terminal or a server (e.g., via the Internet). Various embodiments provide a technical framework for data transfers of a system. The system can comprise one or more terminals, one or more servers, and/or one or more networks. The technical framework can include security mechanisms with respect to an identifier that is trusted by the system (e.g., a "trusted ID").

FIG. 1 is a structural diagram of a system according to various embodiments of the present application.

Referring to FIG. 1, system 100 is provided. System 100 can implement at least part of method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, method 1400 of FIG. 14, computer system 1500 of FIG. 15, system 1600 of FIG. 16A, and/or system 1650 of FIG. 16B.

As illustrated in FIG. 1, system 100 comprises one or more servers (e.g., server 110) and/or one or more terminals (e.g., first terminal 122, second terminal 124, third terminal 126, etc.). The one or more servers communicate with the one or more terminals, or the one or more terminals communicate with each other. In some embodiments, system 100 comprises one or more networks (e.g., network 130). Server 110 can communicate with first terminal 122, second terminal 124, and/or third terminal 126 via network 130.

According to various embodiments, the one or more networks include the Internet, a WiFi network, a Local Area Network (LAN), a Wide Area Network (WAN), a telecommunications network, etc.

A terminal can be connected to one or more peripherals (e.g., smart peripherals) or to one or more other terminals. For example, the terminal can be connected to one or more peripherals and/or to one or more other terminals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

The one or more terminals can be connected directly (e.g., via a direct connection such as Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.), and/or the one or more terminals can be widely distributed (e.g., the one or more terminals can communicate via one or more networks such as the Internet).

In some embodiments, each server (or a plurality of the servers) of the one or more servers in system 100 is logically differentiated. Servers in system 100 can be deployed on a single or multiple server computers. For example, each of the servers of the one or more servers corresponds to one server computer. As another example, the one or more servers are deployed on one server computer. As another example, at least two of the one or more servers are deployed on the same server computer.

According to various embodiment, the one or more terminals are configured to establish respective channels between corresponding ones of the one or more terminals and the one or more servers. In some embodiments, the channels established (e.g., configured) between corresponding ones of the one or more terminals and the one or more servers are established based at least in part on an identifier (ID) corresponding to the terminal (such identifier also referred to herein as a terminal ID). The one or more terminals can comprise a module such as a communication module that is configured to establish channels (e.g., communication channels) to be used for communication with a server or another terminal. The channel can be used for data transmission.

In some embodiments, a channel for communication between first terminal 122 and server 110 is established based on the terminal ID corresponding to first terminal 122. For example, first terminal 122 configures the channel for communication (e.g., data transmission) between first terminal 122 and server 110.

In some embodiments, server 110 authenticates first terminal 122 in connection with the channel being established. Server 110 can authenticate first terminal 122 based at least in part on the terminal ID corresponding to first terminal 122. For example, first terminal 122 can communicate the terminal ID corresponding to first terminal 122 (or information from which server 110 can determine the corresponding terminal ID) to server 110. The terminal ID (or information from which server 110 can determine the corresponding terminal ID) can be communicated in connection with the channel being established between first terminal 122 and server 110.

The terminal ID can be an identifier that uniquely identifies a corresponding device (e.g., terminal). The terminal ID can be allocated to the corresponding terminal in advance. In some embodiments, a terminal registers the terminal ID corresponding to the terminal with a server. The server can store a mapping of terminal identifiers to terminals. In some embodiments, the terminal ID corresponds to a media access control (MAC) address, a device identifier, a unique device identifier (UDID), an internet protocol (IP) address, etc. In some embodiments, server 110 sets (e.g., presets) the terminal ID corresponding to a terminal. Server 110 can provide the terminal ID to the corresponding terminal. The server can have an allocation module that allocates unique terminal IDs to terminals and/or provides the terminal IDs to the corresponding terminals. In some embodiments, the terminal ID is written to (e.g., stored on) the terminal during manufacturing of the terminal.

According to various embodiments, system 100 runs in an Internet of Things environment. An Internet of Things environment can comprise various terminals and various servers communicating there between. For example, one or more servers can provide services to the various terminals in the Internet of Things environment. In some embodiments, at least some of the one or more terminals in system 100 directly or indirectly access the Internet. For example, a smart terminal connected to system 100 can be referred to as an Internet device. As another example, a smart peripheral connects to the Internet (e.g., communicates information with a server, etc.) via a terminal in system 100 to which the smart peripheral is connected (e.g., paired). Such a smart peripheral can be referred to as an Internet device. Internet devices have data and service flow capabilities between terminals and the cloud (e.g., a server connected to the Internet, etc.). As a result, Internet services can be delivered to users via various types of hardware. In some examples, the terminal includes a Yun on Chip (YoC).

According to various embodiments, a YoC is a component that enables an Internet device to carry an Internet service. A YoC has a built-in terminal ID for the Internet device that is commonly referred to as an ID2. In some embodiments, the ID2 is permanently set within the device. The ID2 is an unfalsifiable, unique ID that cannot be predicted. A YoC can also include multiple keys (e.g., a key for increasing communication security, a key for authenticating devices, a key for increasing terminal security, a key for increasing system security, a key for increasing application security, etc.). The keys included with the YoC can be associated with the ID2. A server can store an association (e.g., a mapping) between keys and YoCs, and an association (e.g., a mapping) between YoCs and terminals. According to various embodiments, the ID2 can be an alpha-numeric value.

A method for generating (or setting, associating, etc.) a terminal ID is discussed below in connection with FIG. 2.

Figure 2:
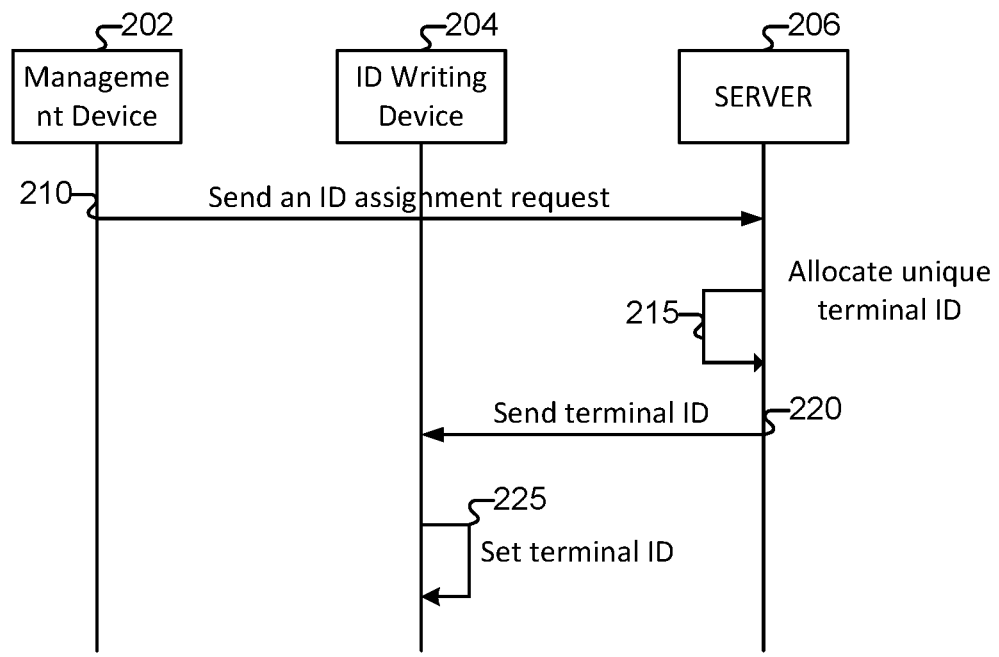
FIG. 2 is a flowchart of a method for allocating a terminal identifier (ID) according to various embodiments of the present application.

FIG. 2 is a flowchart of a method for allocating a terminal identifier (ID) according to various embodiments of the present application.

Referring to FIG. 2, method 200 is provided. Method 200 can be implemented in connection with method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. Method 200 can be implemented at least in part by system 100 of FIG. 1, computer system 1500 of FIG. 15, system 1600 of FIG. 16A, and/or system 1650 of FIG. 16B.

According to various embodiments, method 200 can be implemented at least in part by manufacturer management devices and ID writing devices. As an example, the manufacturer management device is set up by the manufacturer (of the terminal) and is configured for device-related management in the device (e.g., terminal) production process. The ID writing device can be configured by the manufacturer (e.g., of the terminal), or configured independently such as by an administrator of the terminal (or system to which the terminal belongs), the manufacturer of the ID writing device, etc. According to various embodiments, the ID writing device sets (e.g., writes) terminal IDs that are allocated to terminals into the corresponding terminals (e.g., to hardware on the terminal, to a part of an operating system loaded on a terminal such as a secure part of a kernel of the operating system, etc.). According to various embodiments, method 200 is implemented in connection with setting a terminal ID or allocating a terminal ID to a corresponding terminal. A manufacturer management device can also be referred to herein as a management device.

At 210, an ID assignment request is provided. The ID assignment request can be provided to a server. According to various embodiments, management device 202 provides the ID assignment request to server 206. Management device 202 and server 206 can communicate with each other via one or more networks. Accordingly, management device 202 can provide the ID assignment request to server 206 via one or more networks. In some embodiments, server 206 stores (or has access to) a mapping of terminal IDs to terminals.

According to various embodiments, the ID assignment request pertains to one or more terminals (e.g., the one or more terminals for which a terminal ID is being requested). The ID assignment request can comprise (or provided in connection with) information associated with the one or more terminals to which the ID assignment request pertains. The information associated with the one or more terminals can comprise information that identifies the terminal such as a MAC ID, a UDID, an IP address, a user name associated with a user registered with, or otherwise corresponding to, the terminal, etc. Other information associated with the one or more terminals can be included in (or provided in connection with) the ID assignment request. For example, such other information includes a model type of the corresponding terminal, information associated with an operating system that is to run on the corresponding terminal, hardware specifications of the corresponding terminal, system version information corresponding to the terminal, chip information associated with the corresponding terminal, an indication of a quantity of terminals for which an ID is to be assigned (e.g., set or allocated, etc.), etc.

The ID assignment request can be invoked (e.g., via a user interface operatively connected to management device 202) by an administrator such as an administrator of a system to which the terminal is to be connected (or in which the terminal is to be included). The ID assignment request can be invoked in connection with a manufacturing process of the terminal for which the ID assignment request corresponds.

At 215, a terminal ID is allocated. According to various embodiments, the terminal ID is unique with respect to at least a system in which the terminal is to be included (or used in). Server 206 can allocate the terminal ID. For example, in response to receiving the ID assignment request, server 206 allocates the terminal ID(s) for the one or more terminals associated with the ID assignment request. According to various embodiments, the terminal ID is allocated (e.g., generated) in real time. For example, the terminal ID is allocated (e.g., generated) contemporaneously with reception of the corresponding ID assignment request.

In some embodiments, server 206 generates the terminal ID. For example, the allocation of the terminal ID comprises generating the terminal ID and assigning the terminal ID to a corresponding terminal (e.g., of the one or more terminals associated with the ID assignment request).

The terminal ID can be stored (e.g., by server 206) in connection with the allocation of the terminal ID. For example, in response to generating the terminal ID, the terminal ID is stored in a mapping of terminal IDs to terminals. The terminal ID can be stored in association with the terminal to which the terminal ID is allocated.

In some embodiments, the terminal ID is generated based at least in part on device information associated with the terminal to which the terminal ID is allocated. For example, the terminal ID is generated based at least in part on device information carried within (or provided in connection with) the ID assignment request to generate a terminal ID for the corresponding terminal to which the terminal ID is to be assigned. One terminal ID can uniquely identify one terminal and differentiate the terminal from other terminals (e.g., devices). The terminal ID can uniquely identify the terminal to which the terminal ID corresponds at least within a system in which the terminal ID is to be deployed (e.g., used).

In some embodiments, the terminal ID is generated based at least in part on one or more pre-set rules (e.g., preset ID-generating rules). For example, in connection with generation of specific identification information, information that is unique for each terminal (e.g., device) and capable of differentiation from other terminals is generated in accordance with a preset ID-generating rule.

An example of a preset ID-generating rule is a requirement that the terminal ID be composed of 17 characters (e.g., alphanumeric characters, etc.) and use 8 bytes for storage. The format of the terminal ID can be: Y-AAAA-BBBB-XXXXXXXX, wherein the first character "Y" can be a fixed character that serves as an identifier for the terminal ID. The four characters "AAAA" can be hexadecimal characters (or alphanumeric characters) representing a manufacture code (e.g., a code corresponding to a manufacturer of the terminal, etc.). The four characters "BBBB" can be hexadecimal characters representing the chip model number of the terminal for which the terminal ID is being generated. In some embodiments, the system version number or some other number (e.g., a MAC ID, etc.) is used. The final eight characters "XXXXXXXX" can be hexadecimal characters comprising a series of random numbers. The series of random numbers can be generated by a random number generator.

The above is merely an example of a preset ID-generating rule. Various embodiments can use various other preset ID-generating rules or processes for generating a terminal ID. Other lengths of character strings can be used, and/or other device information for some of the content of the terminal ID can be used in connection with generating the terminal ID.

According to various embodiments, in addition to using device information in connection with generating terminal IDs, server 206 can use other information to generate device information. For example, server 206 generates device information by generating random numbers. Various other methods for generating the terminal ID can be used provided that according to various embodiments the terminal ID is unique (e.g., uniquely identifies the terminal to which the terminal ID is allocated).

In addition to generating terminal IDs in real time after receiving corresponding ID assignment requests, an ID pool can be pre-generated. The ID pool can comprise terminal IDs (e.g., that are pre-generated) and, in response to receiving an ID assignment request, a terminal ID (e.g., selected) from the ID pool is assigned to a terminal corresponding to the ID assignment request. One terminal ID from the ID pool can be assigned to a single terminal (e.g., for which a terminal ID assignment is requested).

At 220, the terminal ID is provided. In some embodiments, the terminal ID(s) allocated to the one or more terminals corresponding to the ID assignment request are provided. Server 206 can provide the terminal ID to ID writing device 204. ID writing device 204 and server 206 can communicate with each other via one or more networks. Accordingly, server 206 can provide the terminal ID to ID writing device 204 via one or more networks.

Server 206 can send the generated terminal IDs directly to ID writing device 204 or can send the generated terminal IDs via management device 202 to ID writing device 204 (e.g., server 206 can indirectly send the terminal IDs to ID writing device 204).

At 225, the terminal ID is set. According to various embodiments, the terminal ID is set to the corresponding terminal (e.g., the terminal to which the terminal ID is allocated). For example, ID writing device 204 writes the terminal ID to the corresponding terminal. The terminal ID can be stored in a secure zone of the corresponding terminal (e.g., in a secure zone of the kernel of the operating system of the terminal, etc.).

Setting the terminal ID can comprise burning or in some other way writing the terminal ID to the corresponding terminal (e.g., into a device chip of the corresponding terminal). To ensure security, the terminal ID may be stored in secure storage of the terminal to which the terminal ID is set. According to various embodiments, a terminal ID corresponding to a terminal cannot be altered. For example, the terminal ID corresponding to a terminal cannot be altered at the terminal end or at the server end (e.g., the server that allocates the terminal ID to the corresponding terminal and/or stores the terminal ID in association with the terminal in a mapping of terminal IDs to terminals). As an example, a terminal ID that is written into a terminal cannot be altered, and the terminal can obtain its own terminal ID (e.g., read the terminal ID from the secure storage, etc.) when necessary so that the terminal can use the terminal ID in connection with an authentication of the terminal (e.g., the terminal can present the terminal ID as representative of the identity of the terminal and/or legitimacy or authenticity of the terminal).

According to various embodiments, the allocation of terminal IDs is performed centrally at a network. For example, the manufacturer may not have authority to generate terminal IDs. As another example, a server associated with providing terminal service can generate the terminal IDs for the terminals to which the server is to provide service. In some embodiments, the terminal IDs are allocated (e.g., generated and/or assigned) in connection with a registration of the terminal with the server (or registration with a service provided by the server). The server that allocates terminal IDs can provide a unified safeguarding of all terminal IDs. In other words, the server provides unified safeguarding of device legitimacy. The separation of the manufacturer from authority to allocate terminal IDs can be illustrated in FIG. 2 in which management device 202 (e.g., the manufacturer) requests a server for ID assignment.

In some embodiments, the server that allocates terminal IDs (e.g., server 206) generates encryption key information (e.g., one or more encryption key pairs, etc.) and provides all or part of the encryption key information together with the terminal ID (e.g., to ID writing device 204). The ID writing device can set (e.g., writes) both the received terminal ID and the encryption key information to the terminal (e.g., into a chip of the corresponding terminal to which the terminal ID is allocated, or to a secure storage of the terminal, etc.). The server (e.g., server 206) can generate a private key and, in addition to safeguarding the private key, send the private key together with terminal information (e.g., the terminal ID) to the ID writing device. The server can also generate a public key-private key pair and, in addition to safeguarding the public key-private key pair, send the public key or the private key together with the terminal ID to the ID writing device for setting to the terminal (e.g., writing into the corresponding terminal). The generation of the encryption key information can be performed in connection with the allocation of the terminal ID (e.g., in response to the ID assignment request). The encryption key information can be obtained (e.g., generated) in accordance with one or more preset encryption mechanisms (e.g., a type of encryption, etc.). For example, the ID assignment request can comprise an indication of an encryption mechanism (e.g., the type of encryption), etc.

In some embodiments, the information (e.g., the terminal ID, the encryption key information, a subset thereof, etc.) is stored in a secure storage of the terminal. For example, the terminal ID is written together with encryption key information into a secure storage of the corresponding terminal (e.g., the terminal to which the terminal ID is allocated) in order to ensure security. The secure storage can be a secure hardware zone isolated by a mechanism such as ARM TrustZone, Secure Element, or TI M-Shield, etc. The secure storage can be an independent, secure environment isolated using a virtualization mechanism. Secure storage ensures that saved encryption key information and terminal IDs cannot be falsified or deleted. In some embodiments, the secure storage ensures that saved encryption key information and terminal IDs cannot be modified.

According to various embodiments, the terminal IDs are used in connection with one or more authentication mechanisms (e.g., an authentication of the corresponding terminal, such as an authentication process used in connection with a login of the terminal to a service, etc.). The allocated (e.g., generated and/or assigned) terminal IDs can be provided to a security platform (e.g., by the corresponding terminal) for device authentication. If a terminal ID provided by a terminal is a terminal ID generated and safeguarded by a security platform, the terminal corresponding to this terminal ID can be confirmed as a legitimate device. The authentication of the terminal using the terminal ID can be widely applied to multiple business scenarios, including but not limited to device activation processes, business data release processes, processes for storing device data on a cloud, etc. According to various embodiments, only legitimate devices (e.g., authenticated terminals) are activated; only legitimate terminals receive issued business data; only data from legitimate devices can receive cloud storage services; etc.

According to various embodiments, one or more channels are established between one or more terminals and one or more servers. For example, referring back to system 100 of FIG. 1, one or more channels are established between corresponding ones of the one or more terminals (e.g., first terminal 122, second terminal 124, third terminal 126, etc.) and the one or more servers (e.g., server 110, etc.). In some embodiments, the one or more channels include one or more of a message channel, a streaming media channel, a large file channel, etc. Other channels can be established between terminals and servers. The message channel can be a persistent connection channel that is used in connection with control signaling and transmitting small amounts of data. A streaming channel is used in connection with streaming data communication within an interval of time. A large file channel is used in connection with one-time, large-volume data communication.

In some embodiments, the one or more channels are established between a terminal and a server in connection with an indication that information is to be communicated between the terminal and the server. For example, in response to invocation of a function on the terminal that is associated with the communication of information with the server (e.g., to access a network resource provided by the server, to obtain service information from a server, to stream information from a server, etc.), the terminal can invoke establishing the one or more channels. The invocation of establishing the one or more channels can include providing an indication to the server that the terminal is attempting to establish a channel, providing a request to access a network resource provided by the server, providing a request to obtain a service from the server, a login request, etc. In some embodiments, the invocation of the function on the terminal can be based at least in part on a user input, an application that is running on the terminal, etc. In some embodiments, the indication that information is to be communicated between the terminal and the server arises at the server side. For example, the indication that information is to be communicated between the terminal and the server can be generated in connection with a server providing a service or information to the terminal. Accordingly, the server can provide an indication to the terminal that the one or more channels are to be established between the terminal and the server.

According to various embodiments, to ensure security, a terminal is authenticated in connection with a terminal establishing a channel (e.g., between the terminal and the server). The server can authenticate the terminal device while the terminal is establishing a channel. A method for establishing a channel is described below.

The terminal obtains an authentication code and the terminal ID corresponding to the terminal (e.g., from a secure storage of the terminal) and provides (e.g., sends) data including the authentication code and the terminal ID to a server (e.g., a server with which the terminal is to establish a channel, an authentication server, etc.). The authentication code can be sent from the terminal to the server via one or more networks.

The server obtains (e.g., receives) the data including the authentication code and terminal ID, and the server authenticates the terminal based at least in part on the authentication code and the terminal ID. For example, the server uses the authentication code and terminal ID to authenticate the terminal. In response to determining that authentication of the terminal is successful, the server provides (e.g., sends) channel-establishing parameter information to the terminal (e.g., the terminal that provided the server with the authentication code, or that corresponds to the terminal ID). In response to determining that the authentication of the terminal is not successful, the server can provide the terminal with an indication that authentication is unsuccessful. According to various embodiments, the channel-establishing parameter information is used in connection with establishing a channel (e.g., between the terminal and a server such as the server that performed authentication of the terminal or that is associated with such server).

The terminal obtains (e.g., receives) the channel-establishing parameter information. The channel-establishing parameter information is used in connection with establishing a channel. For example, the terminal uses the parameter information to establish a channel.

The authentication of a terminal based at least in part on the authentication code and the terminal ID can be performed according to various authentication processes. Two processes for a server to authenticate a terminal using the authentication code and terminal ID are described below.

A first approach for a server to authenticate the terminal based at least in part on the authentication code and the terminal ID includes a first server that obtains the authentication code and the terminal ID providing the authentication code and the terminal ID to a second server (e.g., an authentication server). The second server can authenticate the terminal based at least in part on the terminal ID and the authentication code, and the second server can provide an indication of the result of the authentication of the terminal to the first server. Correspondingly, the first server obtains the indication of the result of the authentication from the second server. The first server can deem whether the terminal is authenticated based on the indication of the result of the authentication obtained from the second server.

A first approach for a server to authenticate the terminal based at least in part on the authentication code and the terminal ID includes a first server, which obtains the authentication code and the terminal ID, providing (e.g., sends) the terminal ID to a second server. In response to receiving the terminal ID, the second server can provide the first server with an authentication code corresponding to the terminal ID. As an example, the second server can obtain the authentication code based at least in part on a mapping of authentication codes to terminal IDs. Correspondingly, the first server obtains the authentication code corresponding to the terminal ID from the second server. In response to obtaining the authentication code corresponding to the terminal ID, the first server authenticates the terminal based at least in part on the authentication code obtained from the second server and the authentication code obtained from the terminal. For example, the first server can authenticate the terminal based at least in part on whether the authentication code obtained from the second server matches the authentication code obtained from the terminal. In response to determining that the authentication code obtained from the second server matches the authentication code obtained from the terminal, the first server can deem the terminal to be authenticated. In response to determining that the authentication code obtained from the second server does not match the authentication code obtained from the terminal, the first server can deem the terminal to not be authenticated. Accordingly, the first server can use the authentication code obtained from the second server to verify the authentication code sent by the terminal.

The channel-establishing parameter information (e.g., that is used in connection with establishing a channel) can include: a session ID (SID), a connection server IP address, a port number, and any combination thereof, etc. The channel-establishing parameter information can include: a seed key. The terminal and the server (e.g., with which the channel is to be established) engage in data transmissions on the channel, the seed key is used for encryption/decryption (of information being communicated across the channel).

A method for establishing a channel is discussed below in connection with FIG. 3.

Figure 3:
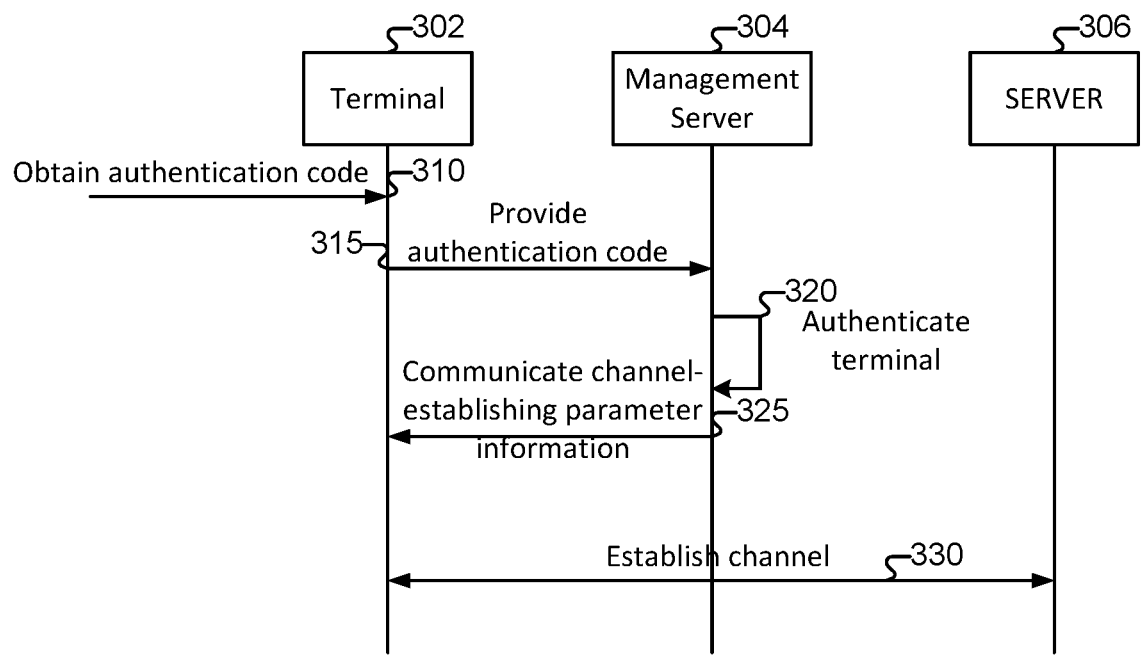
FIG. 3 is a flowchart of a method for establishing a communication channel according to various embodiments of the present application.

FIG. 3 is a flowchart of a method for establishing a communication channel according to various embodiments of the present application.

Referring to FIG. 3, method 300 is provided. Method 300 can be implemented in connection with method 200 of FIG. 2, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. Method 300 can be implemented at least in part by system 100 of FIG. 1, computer system 1500 of FIG. 15, system 1600 of FIG. 16A, and/or system 1650 of FIG. 16B.

At 310, authentication code is obtained. In some embodiments, terminal 302 obtains the authentication code. Terminal 302 can obtain the authentication code in connection with an indication that information is to be communicated between the terminal and a server (e.g., server 306). Terminal 302 can obtain the authentication code from local storage. For example, terminal 302 can obtain the authentication code from a secure storage of a terminal (e.g., a secure zone of the kernel of the operating system of terminal 302). Terminal 302 can obtain the authentication code from a server. For example, in response to determining that information is to be communicated between the terminal and a server (e.g., server 306), terminal 302 can request the authentication code from a server (e.g., server 306 or another server that can be associated with server 306), and correspondingly obtain the authentication code from the server. In some embodiments, the authentication code is generated via an application running on terminal 302. The authentication code can be randomly generated according to one or more predefined rules.

An authentication code is used in connection with authentication of the terminal. For example, the authentication code is provided to management server 304 for use during authentication. Various embodiments impose no restriction on the form of the authentication code. As an example, the authentication code can exhibit a certain degree of randomness and of uniqueness. The randomness and/or uniqueness can be exhibited within at least a time range. An identification server can maintain and allocate authentication codes to terminals. Accordingly, terminal 302 can obtain the authentication code from an identification server. After allocating authentication codes to terminals, the identification server can locally maintain correspondences between terminals (e.g., unique identification information of a terminal) and authentication codes (e.g., a mapping of terminals to authentication codes).

At 315, the authentication code is provided by terminal 302. In some embodiments, terminal 302 provides the authentication code to management server 304. For example, terminal 302 can communication the authentication code in connection with an authentication request or an authentication process of the terminal. The authentication code can be communicated by terminal 302 to management server 304 via one or more networks. In some embodiments, terminal 302 provides the authentication code in response to terminal 302 obtaining the authentication code at 310.

In some embodiments, unique identification information pertaining to terminal 302 is sent to management server 304 contemporaneously with the authentication code being sent by terminal 302. As an example, terminal 302 can provide the unique identification information pertaining to terminal 302. The unique identification information pertaining to terminal 302 can correspond to a terminal ID allocated to terminal 302, or another form of information that uniquely identifies the terminal (e.g., a MAC ID, etc.). According to various embodiments, management server 304 authenticates terminal 302 based at least in part on the unique identification information pertaining to terminal 302 and the authentication code. For example, management server 304 uses the unique identification information pertaining to terminal 302 to verify the authentication code.

At 320, the terminal is authenticated. In some embodiments, management server 304 authenticates terminal 302. For example, management server 304 authenticates terminal 302 based at least in part on the authentication code. Management server 304 can extract the authentication code from data obtained from the terminal at 315. Management server 304 uses the authentication code in connection with determining whether terminal 302 is to be authenticated.

According to various embodiments, in connection with authenticating terminal 302, management server 304 provides the authentication code to an identification server. The identification server (not shown) can authenticate the terminal based at least in part on the authentication code. For example, the identification server can verify the authentication code. In response to verifying the authentication code, the identification server sends the authentication result to management server 304.

According to various embodiments, in connection with authenticating terminal 302, management server 304 provides unique identification information pertaining to terminal 302 (e.g., terminal ID for terminal 302) to the identification server. In response to receiving the unique identification information pertaining to terminal 302, the identification server can obtain (e.g., lookup) an authentication code corresponding to the unique identification information pertaining to terminal 302, and provide the authentication code corresponding to the unique identification information pertaining to terminal 302 to management server 304. In response to obtaining the authentication code corresponding to the unique identification information pertaining to terminal 302 from the identification server, management server 304 can authenticate terminal 302. For example, management server 304 can authenticate the terminal based at least in part on whether the authentication code obtained from the identification server matches the authentication code obtained from terminal 302. In response to determining that the authentication code obtained from the identification server matches the authentication code obtained from terminal 302, the management server 304 deems terminal 302 to be authenticated. In response to determining that the authentication code obtained from the identification server does not match the authentication code obtained from terminal 302, the management server 304 does not deem terminal 302 to be authenticated. Accordingly, management server 304 can verify the authentication code obtained from terminal 302 based at least in part on an authentication code obtained from the identification server (that obtains the corresponding authentication code based on a mapping of authentication codes to terminals or information that identifies terminals).

In some embodiments, the authentication code obtained from terminal 302, or the information in which authentication code is included in communication from terminal 302 to management server 304, includes signature information. The signature information can be used in checks (e.g., verifications or authentications) performed by management server 304.

At 325, channel-establishing parameter information is communicated. According to various embodiments, management server 304 communicates the channel-establishing parameter information to terminal 302. For example, in response to authenticating terminal 302 at 320 (e.g., determining that authentication is successful), management server 304 provides the channel-establishing parameter information to terminal 302.

The channel-establishing parameter information (e.g., that is used in connection with establishing a channel) can include: a seed key and one or more connection parameters. The seed key is used to encrypt/decrypt transmission data (e.g., information being communicated across the channel). The one or more connection parameters are used in connection with establishing the channel between terminal 302 and connection servers (e.g., server 306). For example, the one or more connection parameters include SID, a connection server IP address, a port number, any combination thereof, etc.

In some embodiments, the authentication code, or the data including the authentication code, that is communicated from terminal 302 to management server 304 is sent via HTTP POST, and the channel-establishing parameter information that is communicated from management server 304 to terminal 302 is sent in the form of an HTTP response.

At 330, a channel is established. The channel can be established between terminal 302 and server 306. According to various embodiments, the channel is established based at least in part on the channel-establishing parameter information. For example, terminal 302 uses the channel-establishing parameter information to establish a channel to server 306 (e.g., a connection server such as a server that provides a service, access to network resources, etc. to terminal 302). Terminal 302 and server 306 communicate via the established channel. For example, data subsequently transmitted between the user (of terminal 302) and the cloud passes through the established channel.

According to various embodiments, the establishing of a channel (e.g., between a terminal and a server) includes one or more of using connection parameters (e.g., channel-establishing parameter information) to establish a persistent connection between the terminal and the connection server, establishing a channel (e.g., the channel between a terminal and the cloud), and data encryption/decryption on the channel (e.g., the channel between a terminal and the cloud) that is configured to use a seed key.

Figure 4:
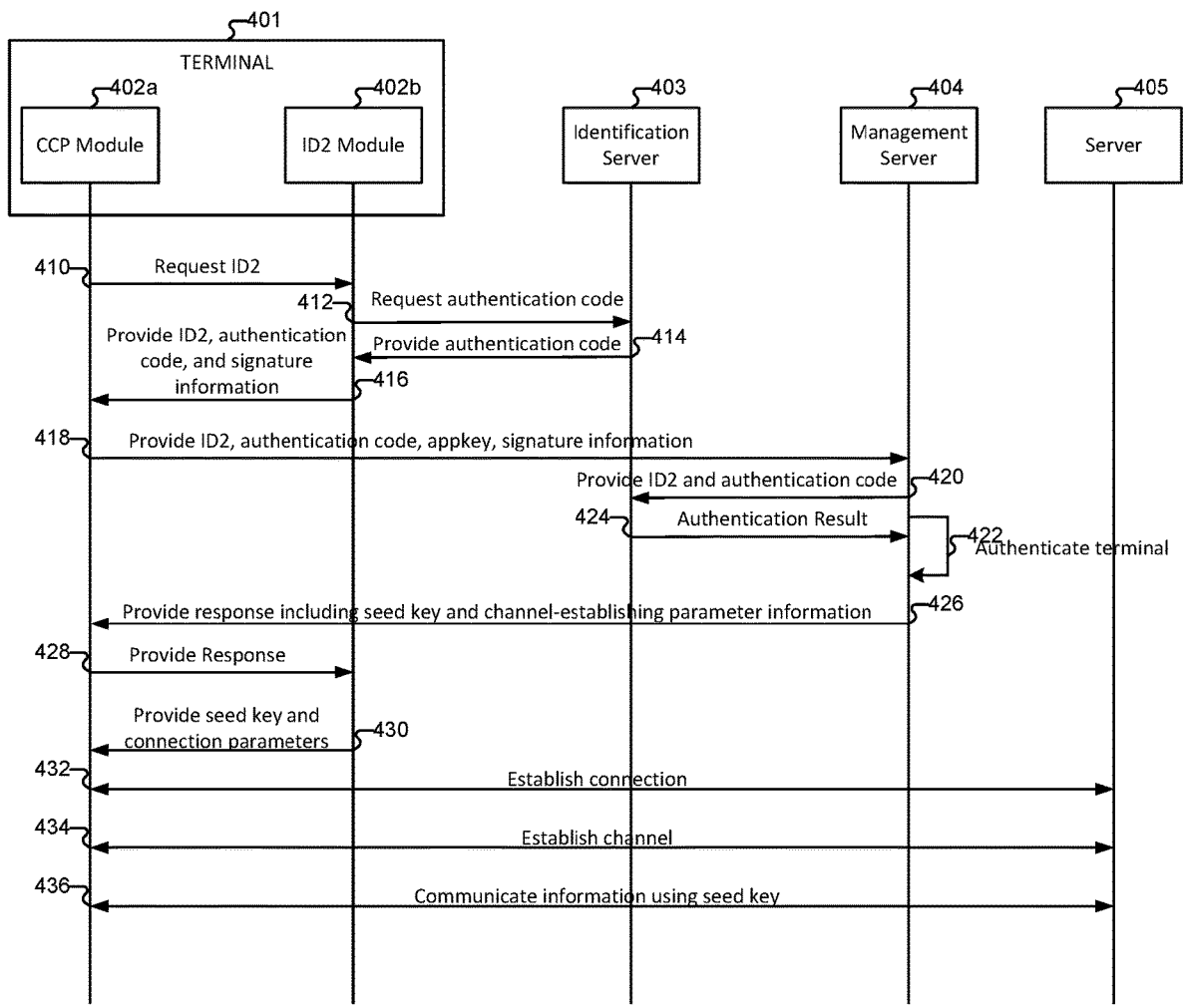
FIG. 4 is a flowchart of a method for establishing a communication channel according to various embodiments of the present application.

FIG. 4 is a flowchart of a method for establishing a communication channel according to various embodiments of the present application.

Referring to FIG. 4, method 400 is provided. Method 400 can be implemented in connection with method 200 of FIG. 2, method 300 of FIG. 3, method 500 of FIG. 5, device profile 600 of FIG. 6, device profile 700 of FIG. 7, method 800 of FIG. 8, method 900 of FIG. 9, method 1000 of FIG.

Figure 11:
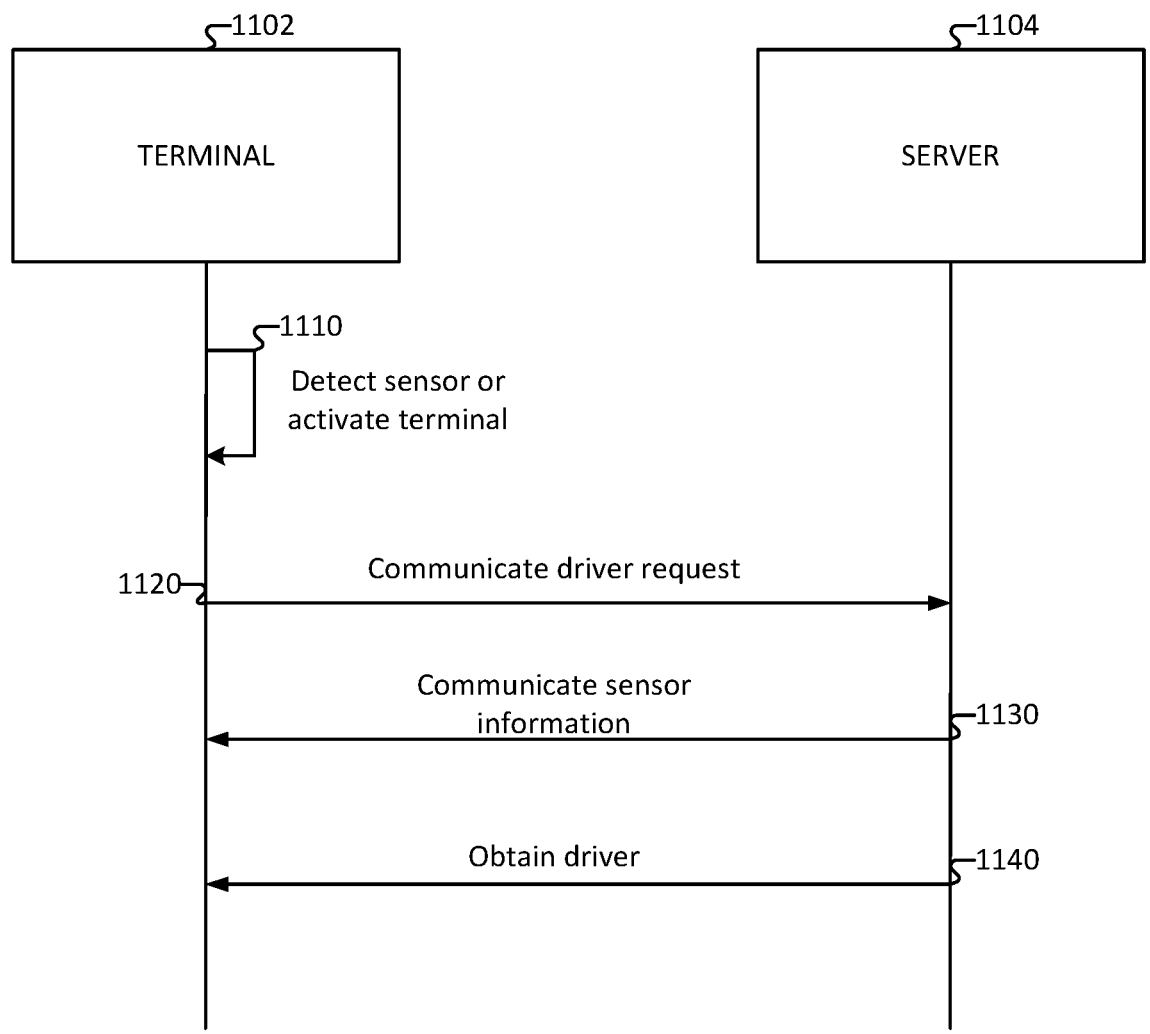
FIG. 11 is a flowchart of a method for dynamic loading of a type of driver according to various embodiments of the present application.
Figure 12:
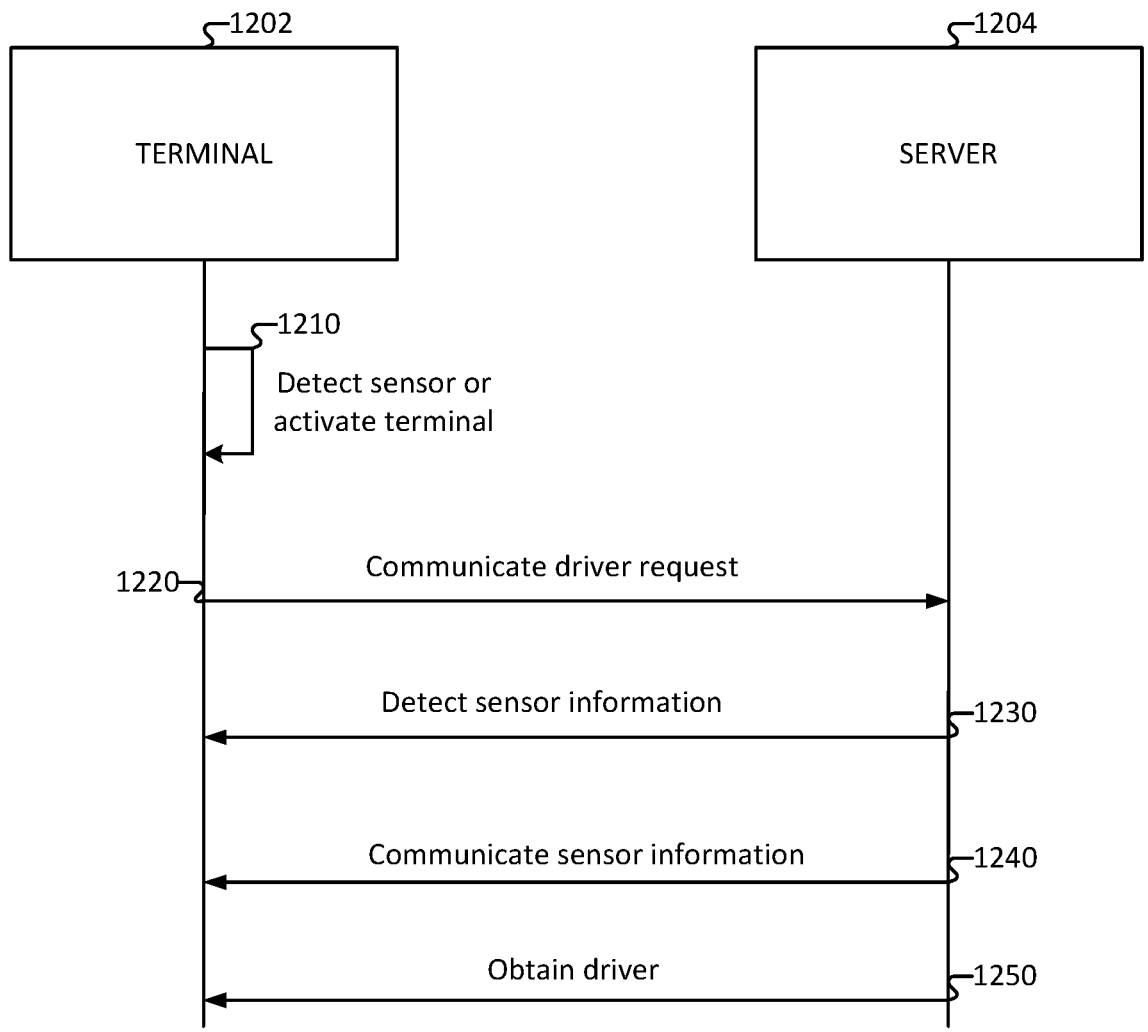
FIG. 12 is a flowchart of a method for dynamic loading of a type of driver according to various embodiments of the present application.
Figure 13:
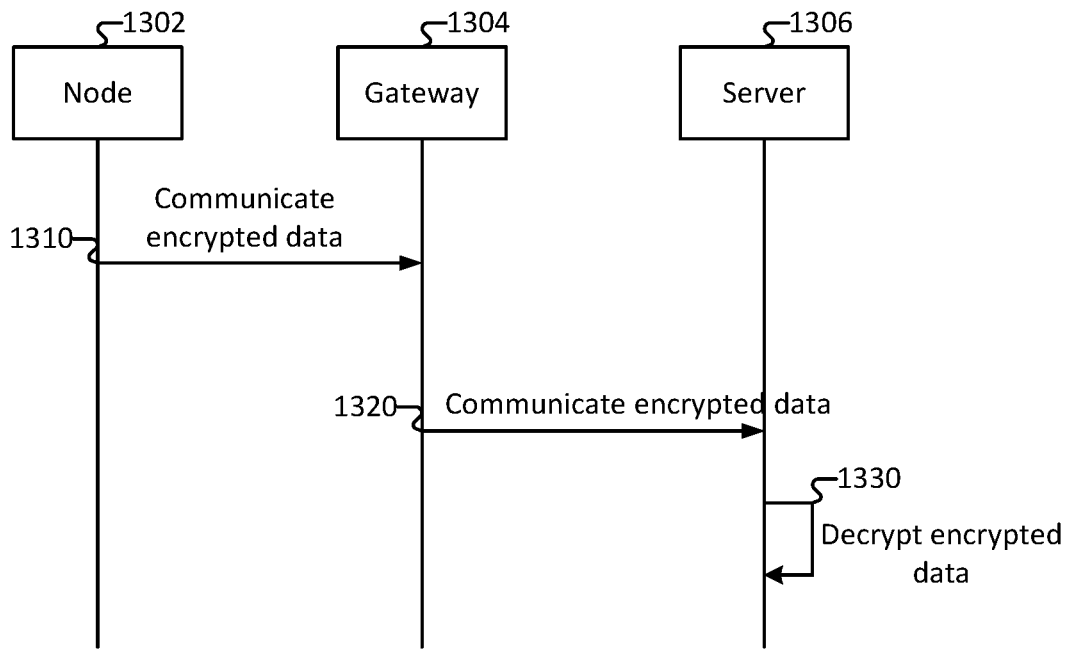
FIG. 13 is a flowchart of a method for establishing a node-server channel according to various embodiments of the present application.
Figure 14:
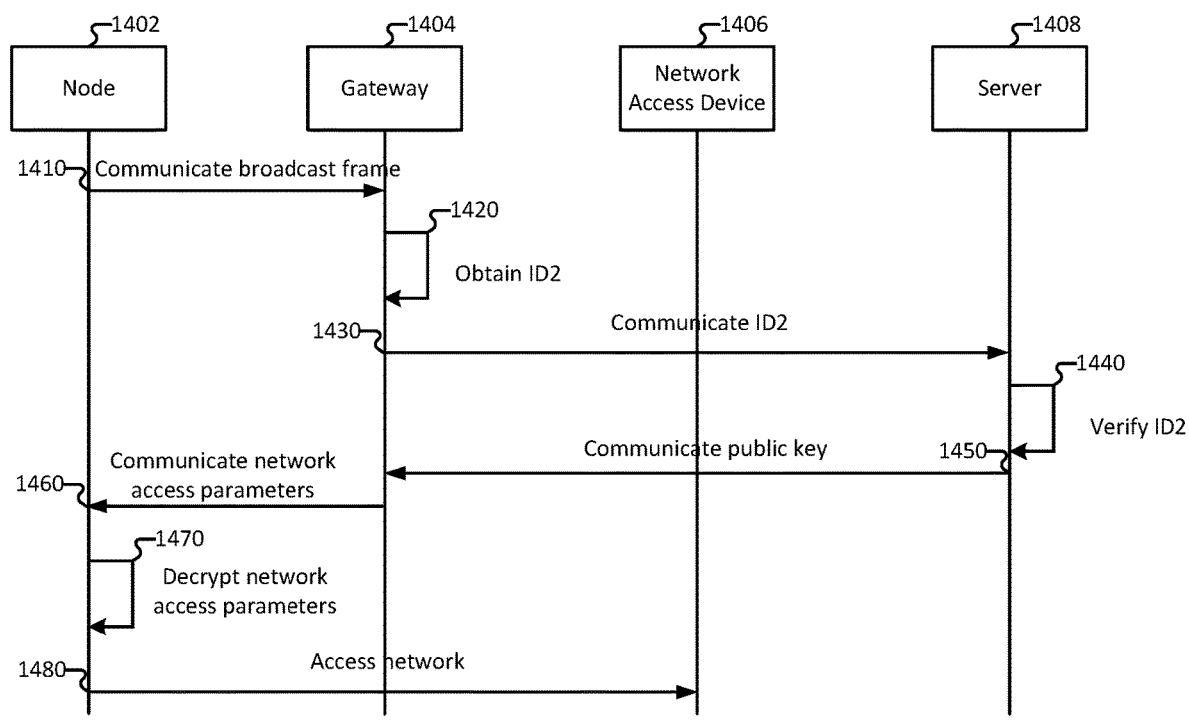
FIG. 14 is a flowchart of a method for establishing a node-server channel according to various embodiments of the present application.

10, method 1100 of FIG. 11, method 1200 of FIG. 12, method 1300 of FIG. 13, and/or method 1400 of FIG. 14. Method 400 can be implemented at least in part by system 100 of FIG. 1, computer system 1500 of FIG. 15, system 1600 of FIG. 16A, and/or system 1650 of FIG. 16B.

Referring to FIG. 4, terminal 401 comprises Cloud Channel Protocol (CCP) module 402a and ID2 module 402b. CCP module 402a and/or ID2 module 402b can be implemented via hardware, software, or both. CCP module 402a can be an execution module on the system level or an execution module on the application level. If CCP module 402a is an application-level execution module, then the ID2 module provides access permissions to the application-level CCP module 402a. ID2 module 402b can be a module installed in a secure execution environment in terminal 401 (e.g., in a trusted platform module). According to various embodiments, terminal ID (e.g., a unique identifier corresponding to terminal 401) corresponds to ID2. With respect to CCP module 402a, CCP module implements a cloud-channel protocol. However, other types of protocols can be used for cloud-user channels.

At 410, a request for the ID2 is communicated. For example, CCP module 402 communicates a request for the ID2 to ID2 module 402b.

Various embodiments ensure security via use of a chip permanently set in terminal 401 (e.g., a chip corresponding to ID2). The ID2 cannot be falsified or illegitimately obtained. In some embodiments, the ID2 of terminal 401 cannot be modified. Accordingly, ID2 serves as the terminal ID (e.g., an identifier that is unique at least within the system within which terminal 401 is used or deployed). The ID2 can be permanently secured within a trusted platform module. ID2 module 402b can correspond to the trusted platform module within which the ID2 is permanently secured. For example, only ID2 module 402b has permission to process the ID2 (e.g., to retrieve the ID2). Other modules can request the ID2 from ID2 module 402b.

According to various embodiments, when terminal 401 is to interact with the cloud, a CCP channel is established between terminal 401 and a server (e.g., a cloud connection server such as server 405). For example, terminal 401 establishes the CCP channel every time terminal 401 is to communicate with server 405 (e.g., to access the cloud). The CCP channel is used in connection with transmission of data between terminal 401 and server 405. In some embodiments, CCP module 402a requests the ID2 from ID2 module 402b in connection with establishing the CCP channel (e.g., in connection with interacting with the cloud).

At 412, an authentication code is requested. In some embodiments, the request for the authentication code comprises the ID2 corresponding to terminal 401, or the request for the authentication code is communicated in connection with the ID2. ID2 module 402b can request an authentication code from identification server 403. The request for the authentication code can be communicated via one or more networks. ID2 module 402b can communicate the request for the authentication code in response to receiving the request for the ID2 (e.g., from CCP module 402a at 410).

According to various embodiments, identification server 403 stores a mapping of ID2s to terminals. The mapping of ID2s to terminals can be stored securely to prevent modification, falsification, or unapproved access to the ID2s. In some embodiments, identification server 403 allocates an authentication code corresponding to terminals (e.g., approved terminals or terminals for which the mapping of ID2s to terminals comprises a corresponding ID2, etc.). In response to receiving the request for the authentication code at 412, identification server 403 verifies terminal 401. For example, identification server 403 verifies the legitimacy of the ID2 included in (or communicated in connection with) the request for the authentication code. In response to determining that the terminal 401 is verified or that the ID2 (included in, or communicated in connection with the request for the authentication code) corresponds to a legitimate device ID2, identification server 403 allocates an authentication code to terminal 401. Otherwise, in response to determining that the terminal 401 is not verified or that the ID2 (included in, or communicated in connection with the request for the authentication code) does not correspond to a legitimate device ID, identification server 403 does not (e.g., refuses to) allocate the authentication code to terminal 401. In some embodiments, allocating the authentication code to terminal 401 comprises generating the authentication code. The authentication code can be based at least in part on a random number or value generator. The authentication code can be valid for a predefined period of time. For example, the authentication code can have a corresponding expiry date beyond which the authentication code is not valid. The authentication code can be generated by identification server 403.

At 414, the authentication code is communicated. In some embodiments, identification server 403 provides the authentication code to terminal 401 (e.g., ID2 module 402b). As an example, identification server 403 provides the authentication code to terminal 401 in response to receiving the request for the authentication code.

In some embodiments, information exchange between ID2 module 402b and identification server 403 passes through a channel between ID2 module 402b and identification server 403. Connection parameters for the channel between ID2 module 402b and identification server 403 can be preset in ID2 module 402b. After a connection is established between ID2 module 402b and identification server 403, a pre-set key (e.g., a key that was agreed upon in advance) can be used to encrypt/decrypt the ID2 and the authentication code (e.g., in connection with communication between ID2 module 402b and identification server 403). The key that was agreed upon in advance can be pre-written into the ID2 module or another secure zone of terminal 401. In some embodiments, negotiations for determining a key to be used for encryption/decryption of information communicated between ID2 module 402b and identification server 403 is performed after the connection between ID2 module 402b and identification server 403 is established. The negotiated key can then be used to encrypt/decrypt the ID2 and the authentication code.

At 416, the ID2, the authentication key, and signature information are communicated. ID2 module 402b can provide the ID2, the authentication key, and the signature information to CCP module 402a. ID2 module 402b can further provide an application key (appkey) and an application secret (appsecret) to CCP module 402a. In some embodiments, ID2 module 402b can provide the ID2, the authentication key, and the appkey to CCP module 402a after ID2 module 402b signs the ID2, the authentication code, the appkey, and an appsecret. Various signature technologies can be implemented for signing the ID2, the authentication code, the appkey, and the appsecret, or for the signature information. For example, RSA can be implemented for such signing. In some embodiments, an appkey corresponds to a key pair (e.g., a private key and public key. In some embodiments, an appsecret corresponds to a key pair (e.g., a private key and public key. The appsecret can be stored at the server. As an example, the appkey and/or appsecret can be used in connection with enhancing security verification.

According to various embodiments, the ID2, the authentication code, the appkey, and the appsecret are each signed, however, the appsecret is not communicated (e.g., by ID2 module 402b to CCP module 402a). For example, the data by ID2 module 402b after signing the ID2, the authentication code, the appkey, and the appsecret does not include the appsecret (e.g., the signed appsecret). In some embodiments, the appkey originates from CCP module 402a. For example, ID2 module 402b obtains the appkey from CCP module 402a before the process of signing the ID2, the authentication code, the appkey, and the appsecret (or at least before signing the appkey). After performing the signing described above, ID2 module 402b provides the ID2, the authentication code, the appkey, and the signature information to CCP module 402a.

According to various embodiments, the obtaining and signing of the authentication code is performed at ID2 module 402b. Because ID2 module 402b is a trusted platform module, 402b module serves as a secure execution environment. Therefore, the authentication code cannot be acquired (from ID2 module 402b) and falsified from outside ID2 module 402b. The security of the authentication code strengthens security of the authentication process and the process for establishing the channel between terminal 401 and server 405.

At 418, the ID2, the authentication code, the app key, and signature information are communicated by terminal 401. In some embodiments, CCP module 402a communicates the ID2, the authentication code, the appkey, and the signature information to management server 404. CCP module 402a can send the ID2, the authentication code, the appkey, and the signature information via HTTP POST to management server 404. CCP module 402a can communicate the ID2, the authentication code, the appkey, and the signature information in response to receiving the ID2, the authentication code, and the signature information from ID2 module 402b.

At 420, the ID2 and the authentication code are communicated. In some embodiments, management server 404 provides the ID2 and the authentication code to identification server 403. For example, management server 404 sends the ID2 and the authentication code to identification server 403 in response to receiving the ID2, the authentication code, the appkey, and the signature information from terminal 401 (e.g., CCP module 402a).

At 422, terminal 401 is authenticated. In some embodiments, management server 404 performs an authentication of terminal 401. For example, management server 404 performs a check based at least in part on the ID2 corresponding to terminal 401, the authentication code, the appkey, and the signature information. The authentication of terminal 401 can further include obtaining an authentication result from identification server 403 at 424. In some embodiments, in response to receiving the ID2 and the authentication code from management server 404 at 420, identification server 403 authenticates the authentication code based at least in part on a mapping of authentication codes to ID2s and/or a mapping of authentication codes to terminals. As an example, identification server 403 authenticates the authentication code and at 424, provides an authentication result to management server 404. At 424, management server 404 obtains the authentication result for the authentication code.

The authentication of the terminal at 422 can comprise authenticating the signatures with respect to the appkey, the authentication code, and/or the ID2. In some embodiments, authenticating the signatures includes: first, using the appkey to determine the corresponding appsecret, second, using the determined appsecret to verify the signature information, and if the signature information is verified, deeming the authentication of the signatures to be successful. Otherwise, authentication of the signatures fails. The verifying the signature information using the determined appsecret can comprise locally signing ID2, the authentication code, the appkey, and the appsecret, and comparing the signature information thus obtained with the signature information sent by terminal 401. In some embodiments, appsecrets corresponding to each appkey are maintained in advance at the management server 404.

In response to receiving the ID2 and the authentication code at 420, identification server 403 determines the authentication code corresponding to the ID2. Authentication codes can be allocated to each terminal by identification server 403, and identification server 403 locally maintains (or has remote access to) the authentication codes corresponding to each ID2. For example, identification server 403 stores a mapping of authentication codes to ID2s. Therefore, identification server 403 can determine the authentication code corresponding to the ID2 provided by management server 404 and compare the determined authentication code with the authentication code provided by management server 404. If the determined authentication code (e.g., the locally stored authentication code) and the authentication code provided by management server 404 are determined to be the same, then the authentication is successful. Otherwise, if the determined authentication code (e.g., the locally stored authentication code) and the authentication code provided by management server 404 are not the same, the authentication fails. According to various embodiments, the authentication code is allocated based at least in part on random generation, or on random selection of an authentication code from an authentication code pool (e.g., a set of predefined authentication codes).

According to various embodiments, the authentication code is valid for a predefined period of time. For example, the authentication code has an expiration date, expiration time, etc. In some embodiments, the identification server determines whether the authentication code is valid. For example, the identification server determines whether the authentication code is valid based at least in part on a time period for which the authentication code is valid (e.g., based on an expiry date, expiry time, etc.). The identification server can store a mapping of validity periods of time to authentication codes. As an example, the identification server stores an indication of when an authentication code expires or an indication of when an authentication code is valid or no longer valid.

In some embodiments, management server 404 provides the ID2 to identification server 403. In response to receiving the ID2, identification server 403 provides the authentication code to management server 404. In response to receiving the authentication code, management server 404 can verify the authentication code (e.g., authenticate the authentication code received from terminal 401). For example, identification server 403 is not responsible for verifying the authentication code, but rather sends the authentication code corresponding to the ID2 back to management server 404. Management server 404 uses the authentication code sent back by identification server 403 to verify the authentication code provided by terminal 401. In response to a determination that the authentication code provided by terminal 401 does not match the authentication code corresponding to the ID2 (e.g., based at least in part on a mapping of authentication codes to ID2s or a mapping of authentication codes to terminals), then the authentication fails. For example, in response to management server 404 determining that the authentication code provided by identification server 403 does not match the authentication code provided by terminal 401, management server 404 determines that authentication fails.

In some embodiments, verification of the authentication code by identification server 403 is more secure verification of the authentication code than by management server 404. For example, verification of the authentication code by identification server 403 can avoid identification server 403 from communicating the authentication code to management server 404.

The checking of signatures and verification of the authentication code can be performed in any order or simultaneously. In some embodiments, the authentication is successful only if the check of the signatures and the verification of the authentication code are both successful. For example, in some embodiments, if one of the check of the signatures and the verification of the authentication code is unsuccessful, then the authentication is deemed to have failed.

In some embodiments, the check of the signature is performed before verification of the authentication code. Accordingly, if the check of the signature fails, then verification of the authentication becomes unnecessary. For example, the authentication can be deemed to have failed if the check of the signature is determined to have failed. Correspondingly, if the check of the signature succeeds, then the authentication code verification is performed.

In some embodiments, verification of the authentication code is performed before the check of the signature. Accordingly, if the verification of the authentication code succeeds, then the check of the signature is performed. Correspondingly, if the verification of the authentication code fails, then checking the signature becomes unnecessary. For example, the authentication can be deemed to have failed if the verification of the authentication code is determined to have failed.

At 426, a response pertaining to the authentication is provided. In some embodiments, a result of the authentication of terminal 401 is provided to terminal 401. Management server 404 can provide the result of the authentication to terminal 401. In some embodiments, the result of the authentication of terminal 401 is provided to CCP module 402a.

According to various embodiments, the response pertaining to the authentication comprises information that terminal 401 uses in connection with establishing a channel between terminal 401 and server 405. For example, the response pertaining to the authentication comprises a seed key and the channel-establishing parameter information. If authentication (e.g., of terminal 401) is successful, the parameter information used in connection with establishing a channel (e.g., the channel-establishing parameter information) is communicated to terminal 401. As an example, the channel-establishing parameter information is sent in the form of an HTTP response to terminal 401. The parameter information used in connection with establishing a channel can include a seed key and connection parameters (e.g., the channel-establishing parameter information). The connection parameters can include SID, APID, connection server IP address, and port number. Management server 404 can send the parameter information to terminal 401 in response to management server 404 determining that authentication at 422 is successful.

"SID" corresponds to a session ID. SID can be generated by management server 404. SID can be used to identify one connected session between the terminal and connection server (e.g., server 405). SID can be a unique identifier at least with respect to connections established with the connection server (e.g., server 405). Data packets communicated between terminal 401 and the connection server are configured to comprise the corresponding SID. For example, all data packets communicated between terminal 401 and the connection server (at least with respect to the intended purpose for establishing the channel) are configured to comprise the corresponding SID.

"APID" corresponds to an application ID for the terminal 401. APID can identify an application. According to various embodiments, all channels that use the same application (e.g., at least with respect to channels between terminal 401 and server 405) use the same APID. The APID can be optional.

The parameter information that is sent to terminal 401 and that is used in connection with establishing a channel can be encrypted (e.g., encrypted based at least in part on the seed key). As an example, the parameter information can take the specific form of: a message header of the HTTP response message sent back by management server 404 to terminal 401 carrying a seed key encrypted using the ID2 corresponding to terminal 401. The message body of the HTTP response message can include the parameter information. The parameter information comprised in the HTTP response message can be encrypted using the seed key.

According to various embodiments, in response to terminal 401 receiving the parameter information, terminal 401 establishes a channel with server 405 based at least in part on the parameter information, and in response to establishing the channel with server 405, terminal 401 communicates with server 405 using the established channel.

At 428, a response is provided to ID2 module 402b. In some embodiments, CCP module 402a provides an HTTP response to ID2 module 402b. As an example, CCP module 402a can provide the HTTP response message that CCP module 402a obtained from management server 404 at 426. In some embodiments, CCP module 402a provides the channel-establishing parameter information to ID2 module 402b.

At 430, channel-establishing parameter information is provided to CCP module 402a. In some embodiments, ID2 module 402b obtains parameter information (e.g., the channel-establishing parameter information) from the HTTP response message, and provides the parameter information to CCP module 402a. For example, ID2 module 402b analyzes the parameter information that was obtained from the HTTP response and that is used in connection with establishing a channel, and ID2 module 402b provides the parameter information to CCP module 402a.

In some embodiments, ID2 module 402b analyzes the parameter information that was obtained from the HTTP response, or analyzes the HTTP response message. Analysis can include using the ID2 corresponding to terminal 401 to decrypt the message header of the HTTP response message to obtain a seed key, and in response to obtaining the seed key, using the seed key to decrypt the message body of the HTTP response message to obtain parameter information (e.g., connection parameters such as SID, APID, connection server IP address, port number, etc.).

CCP module 402a can provide the message header of the HTTP response message to ID2 module 402b. In response to receiving the message header of the HTTP response message (or in response to receiving the HTTP response message), ID2 module 402b can use the ID2 to decrypt the message header of the HTTP response message and thus obtain the seed key and can provide the seed key to CCP module 402a. CCP module 402a can use the seed key to decrypt the message body of the HTTP response message and obtain connection parameters (e.g., channel-establishing parameter information). The connection parameters can include an SID, an APID, a connection server IP address, a port number, etc.

At 432, a connection is established between terminal 401 and server 405. In some embodiments, CCP module 402a uses connection parameters (e.g., the channel-establishing parameter information) to establish a TCP persistent connection to the connection server (e.g., server 405).

At 434, a channel is established between terminal 401 and server 405. In some embodiments, CCP module 402a and server 405 exchange CCP connection messages and thus establish a CCP channel between terminal 401 and server 405. For example, CCP module 402a sends a CCP connection request to server 405, and server 405 sends a CCP confirmation to CCP module 402a.

Process 400 is described in connection with the example of CCP. Therefore, when a channel is established at step 434, CCP connection messages are communicated between terminal 401 and server 405. According to various embodiments, if another channel protocol is used, then connection messages of another type of channel protocol are exchanged between terminal 401 and server 405.

At 436, terminal 401 and server 405 communicate. In some embodiments, terminal 401 and server 405 communicate via the channel established there between. Terminal 401 and server 405 can communicate via the channel based at least in part on the seed key. For example, the seed key is used to encrypt/decrypt data transmitted on the channel (e.g., the cloud channel) between terminal 401 and server 405.

According to various embodiments, after the management server allocates an SID and seed key to the terminal, the management server provides the SID and the seed key to the connection server. For example, the management server can contemporaneously provide the SID and seed key to the connection server and the terminal. In some cases, the management server will synchronously provide the SID and seed key to the connection server. For example, the connection server can synchronize the correspondence between the SID and the seed key from the management server. Data packets subsequently sent by the terminal on the data channel (e.g., the channel established between the terminal and the connection server) include the SID. In some embodiments, the connection server determines the seed key being used for communication across the channel based at least in part on the SID included in the information communicated on the channel. For example, the connection can query a mapping of SIDs to seed keys, or a mapping of SIDs to terminals (from which the corresponding seed key can be identified) in order to determine the seed key being used for communication across the channel. The mapping of SIDs to seed keys, or a mapping of SIDs to terminals can be stored locally at the connection server, or accessible remotely by the connection server.

According to various embodiments, the terminal uses the seed key to encrypt data packets sent to the connection server (e.g., data packets communicated over the channel established between the terminal and connection server), and uses the seed key to decrypt data packets sent from the connection server. Conversely, the connection server uses the seed key to encrypt data packets sent to the terminal, and uses the seed key to decrypt data packets sent from the terminal.

According to various embodiments, in the event that data is communicated (e.g., transmitted) on the channel (e.g., the CCP channel), data can be sent and received asynchronously. Communication on the channel is further described below.

In response to data being received via a CCP channel, the TCP data sent back by the server is fragmented and scattered and can extend across multiple packets under CCP. In some embodiments, in order to analyze each data packet under CCP (e.g., if TCP data sent back by the server is fragmented and scattered), a finite-state machine approach for receiving data packets is implemented.

Various embodiments implement a heartbeat detection in connection with ensuring channel reliability. For example, a heartbeat detecting mechanism is implemented with respect to the CCP channel. A heartbeat detection can comprise the connection server periodically sending a heartbeat message ping. For example, the connection server sends one ping every 70 seconds (or another predefined period of time) to the terminal. In accordance with the heartbeat detection, in response to receiving a ping, the terminal sends back a heartbeat response pong. In some embodiments, the channel is disconnected if a heartbeat is not detected. For example, the connection server shuts down the CCP channel if the connection server has not received a pong for longer than a set period of time.

In some embodiments, the terminal periodically determines whether the terminal has received a ping. For example, the terminal checks every 10 seconds (or another predefined time period) whether the terminal has received a ping. The terminal can check for the ping on the channel (e.g., the CCP channel). In some embodiments, the terminal disconnects the channel if the terminal has not received a ping within a predefined threshold time period. For example, the terminal device can shut the CCP channel if the terminal does not detect receipt of a ping for longer than the predefined threshold time period (e.g., no ping is received for more than 120 seconds, etc.). If the channel is disconnected (e.g., if the terminal terminates the channel), a new channel can be established with the connection server (e.g., if the terminal and/or server is to communicate information with one another). For example, after the CCP channel has been shut down, process 400 can be initiated (e.g., CCP module 402a can re-execute process 400 illustrated in FIG. 4) and thus can re-establish a CCP channel between terminal 401 and the connection server (e.g., server 405).

According to various embodiments, a terminal can monitor registered network events. For example, the channel can be monitored for abnormalities, or the channel can be disconnected as a result of an occurrence of a network abnormality, etc. In some embodiments, if the network is restored (e.g., after occurrence of an abnormality), the terminal can re-execute at least part of process 400 of FIG. 4. For example, CCP module 402a re-executes the FIG. 4 in response to restoration of the network and thus a CCP channel is re-established between the terminal and the connection server (server 405).

Process 300 of FIG. 3 and/or process 400 FIG. 4 can be implemented in connection with securing communications between cloud servers and various smart home devices and smart automobiles and other devices in the Internet of Things. The connection server can be an application server that provides specific services for Internet of Things devices.

As an example, an ID2 which is allocated to a smart television is prewritten into a trusted platform module in a smart television. An authentication code is obtained from an identification server based on the ID2 allocated to the smart television. In response to successful authentication by the management server based on the authentication code, connection parameters (e.g., channel-establishing connection parameters) with respect to a connection server (e.g., for establishing a connection with the connection server) are obtained from the management server. The connection server can be a video server, etc. Connection parameters can include a seed key, a session ID, a video server IP address, a port number, and the like. The smart television can further use the acquired video server IP address and port number to establish a CCP channel to the video server. Data exchanged between the smart television and the video server on the CCP channel is encrypted using the seed key. As an example, all data communicated on the CCP channel between the smart television and the video server is encrypted using the seed key. The channel session (e.g., corresponding to the channel established between the smart television and the video server) is identified using the session ID among the connection parameters. A secure connection between the smart television and the video server is thus implemented.

In some embodiments, with respect to system 100 illustrated FIG. 1, the transmission of data on the channel between a terminal (e.g., first terminal 122, second terminal 124, third terminal 126, etc.) and server 110 includes an event mechanism and/or an action mechanism. An event mechanism and an action mechanism are further described below.

Event Mechanism:

A terminal can obtain a function module event and, based at least in part on event registration information, the terminal sends an event message to the server. Accordingly, the server receives the event message from the terminal. In some embodiments, the function module event comprises, or is otherwise associated with an identifier. As an example, event registration information is determined based at least in part on a mapping of function module events and event registration information. The mapping of function module events and event registration information can be stored locally at the terminal, or remotely at a storage that is accessible to the terminal. As another example, event registration information is comprised in the function module event.

The registration information can include: an event identifier (e.g., an event identifier reported to a server), event conditions corresponding to the event identifier (e.g., event conditions the satisfaction of which are deemed to be indicative of occurrence of an event), or both an event identifier and event conditions corresponding to the event identifier, etc.

The server can record the event message, and/or the server can send a first message based at least in part on the event message to the terminal from which the server received the event message, or to another terminal. The first message can include an action identifier. A first message sent to the terminal can implement control over terminal triggered by the event reported by the terminal. For example, in response to receiving the first terminal, the terminal can be invoked to implement a function. The function implemented by the terminal can be based at least in part on the action identifier. For example, one or more functions to be implemented can be determined based at least in part on a mapping of function identifiers to functions.

In some embodiments, in response to receiving the event message from a terminal, the server sends a first message to another terminal (e.g., a terminal that is different from the terminal from which the event message was received). The first message sent to the other terminal can implement control over the other terminal device. For example, the first message can invoke the other terminal to perform one or more functions (e.g., upon receipt of the first message). The control implemented over the other terminal is thus triggered by the event which was reported by the terminal to the server. The one or more functions implemented by the other terminal can be based at least in part on the action identifier. For example, one or more functions to be implemented can be determined based at least in part on a mapping of function identifiers to functions. Accordingly, in some embodiments, a plurality of terminals can interact with each other via a server. For example, an event that occurs at one terminal can invoke a function to be performed by another terminal based at least in part on information communicated by the terminal to the server and correspondingly information communicated by the server to the other terminal.

In some embodiments, the terminal obtains a function module event and, based at least in part on event registration information, causes (e.g., triggers) the function module associated with the event to perform one or more functions. The terminal can obtain the function module event based on an event corresponding to the function module of the terminal. In some embodiments, the event registration information includes an event identifier, a function module, and an execution instruction associated with (e.g., linked by) the event identifier. The execution instruction can be sent to the function module associated with the event identifier. According to various embodiments, various modules within a single terminal interact with each other. For example, an execution instruction can be determined based at least in part on an event obtained by a first module of a terminal, and the execution instruction can be provided to a second module of the terminal. The execution instruction can be provided to the second module by the first module, or a processor of the terminal can determine the execution instruction based at least in part on an event detected at a first module, and the processor can send the execution instruction to the second module.

In some embodiments, the terminal obtains a device profile. As an example, the device profile is provided (e.g., sent) to the terminal by a development device. As another example, the device profile is configured by a user such as a user of the terminal. As another example, the device profile can be a pre-configured device profile such as by a manufacturer, an administrator of a system within which the terminal is deployed, an administrator of the terminal, etc. In some embodiments, the device profile comprises information pertaining to events (e.g., event registration information). In some embodiments, the terminal performs an event registration based at least in part on the device profile. The device profile can comprise a mapping of function module events and event registration information, or a mapping of inputs or events to functions (e.g., one or more functions to be invoked in response to the determination that a corresponding input or event has occurred).

Figure 5:
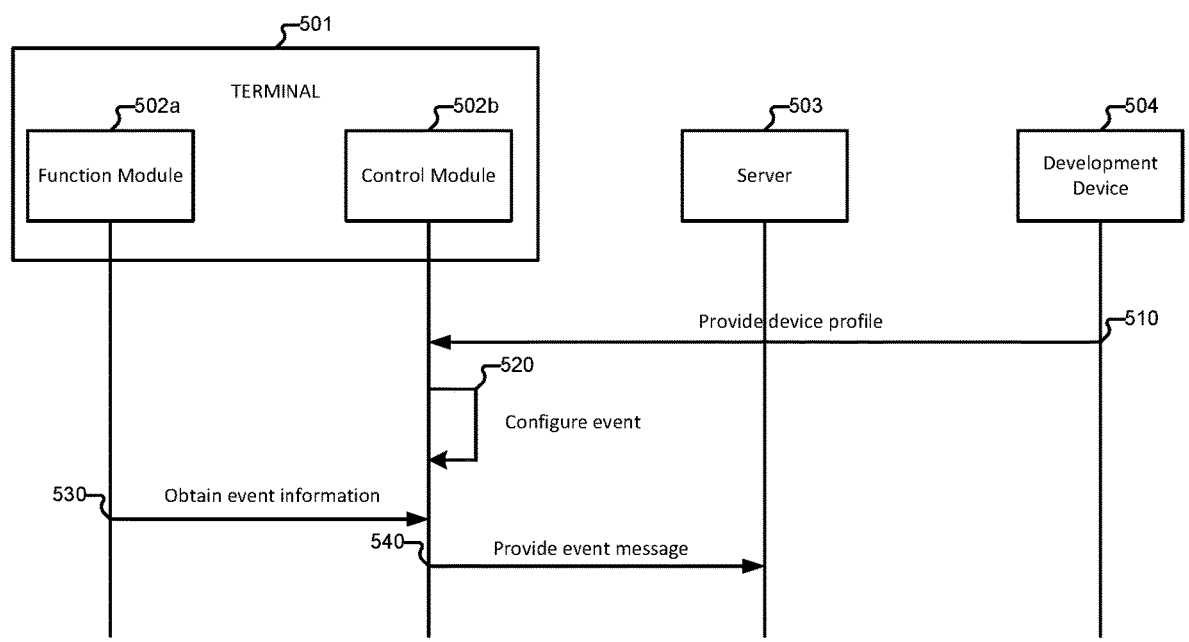
FIG. 5 is a flowchart of a method for event handling according to various embodiments of the present application.

FIG. 5 is a flowchart of a method for event handling according to various embodiments of the present application.

Referring to FIG. 5, method 500 is provided. Method 500 can be implemented in connection with method 200 of FIG. 2, method 300 of FIG. 3, method 400 of FIG. 4, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. Method 500 can be implemented at least in part by system 100 of FIG. 1, computer system 1500 of FIG. 15, system 1600 of FIG. 16A, and/or system 1650 of FIG. 16B.

At 510, a device profile is provided. The device profile is provided to terminal 501. In some embodiments, the device profile is provided to the terminal 501 by development device 504. For example, the development device communicates (e.g., sends) the device profile to the terminal 501 via one or more networks. Control module 502b can obtain the device profile. Control module 502b can be implemented (e.g., programmatically) by one or more processors of terminal 501.

According to various embodiments, development device 504 is a terminal (e.g., a server) that configures device profiles. The device profiles can be configured based at least in part on a setting of a terminal for which the device profile is being configured (e.g., a user of the terminal, one or more specifications of the terminal, etc.), a system in which the terminal corresponding to the device profile is to be deployed, etc. As an example, an administrator configures the device profile (e.g., the device profile can be configured based at least in part on one or more inputs from the administrator). As another example, a manufacturer (e.g., a manufacturer of the terminal) configures the device profile. In some embodiments, the device profile is configured based at least in part on a service with which the terminal (or a user of the terminal) is registered. The service can be provided by a server (e.g., a software as a service implementation, a location-based service, etc.). Configuration of the device profile can comprise setting (e.g., defining) an association between one or more events to one or more functions (e.g., a function to be invoked in response to detection or occurrence of the corresponding event(s)). The development device 504 can store a mapping of device profiles to terminals. Accordingly, development device 504 can obtain the device profile corresponding to terminal 501 (e.g., from the mapping of device profiles to terminals), and provide the device profile to terminal 501.

According to various embodiments, control module 502b implements event processing. For example, in response to the occurrence of an event (e.g., detection of an event), control module 502b invokes a function corresponding to the event. For example, the control module 502b can generate and send an event message in response to receiving a determination that an event has occurred (e.g., in response to receiving an indication that the event has occurred, or in response to detecting the occurrence of the event). Control module 502b can be a unit in terminal 501 that performs control and coordination functions for various modules of terminal 501.

At 520, an event is configured. In some embodiments, terminal 501 performs event registration (e.g., with respect to one or more events). For example, control module 502b performs the event registration in response to obtaining the device profile at 510. The event registration can be performed based at least in part on the device profile. Event registration can comprise setting the device profiles (e.g., by registering the device profile), such as by storing an association of one or more functions with one or more events (e.g., by updating or storing a mapping of events to functions). The association of the one or more functions with the one or more events can be stored locally at terminal 501. This includes registering event information reported to a server (e.g., server 503). The registration of the event information with the server can include sending the event information to the server.

Figure 6:
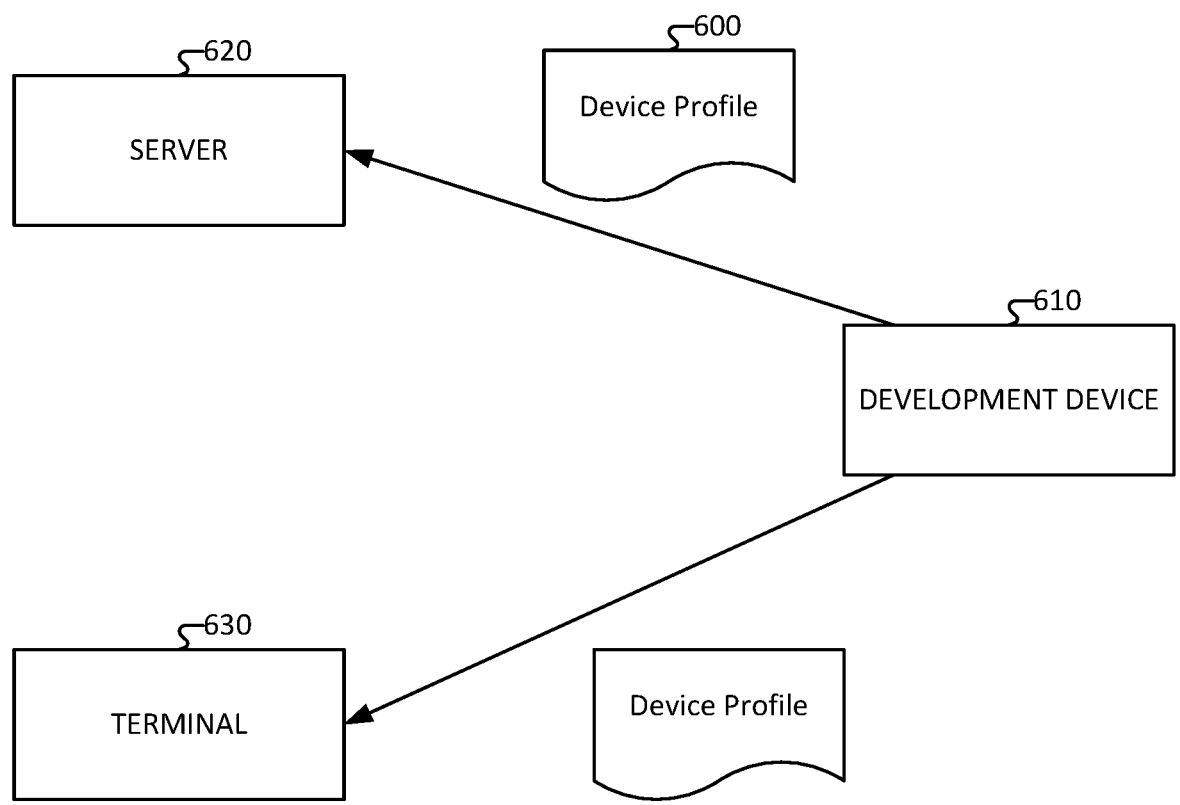
FIG. 6 is a diagram of remote development of configurations according to various embodiments of the present application.

According to various embodiments, 510 and 520 are performed in advance (e.g., during configuration of terminal 501, etc.). For example, 510 and 520 are performed separate from (e.g., independent of) occurrence of an event (e.g., such that upon occurrence of the event, terminal 501 is configured with respect to the device profile and can function accordingly). In some embodiments, a manufacturer or developer (e.g., application developer) defines a device profile for its own intelligent hardware (e.g., the terminal developed by the developer such as terminal 501) and a development device (e.g., development device 504) is used to send the device profile to the corresponding terminal and the server (e.g., server 503). As an example, FIG. 6 illustrates the providing of the device profile by the developer (or development device) to a terminal and/or a server. Accordingly, a developer of a terminal (or of an application running on the terminal) can implement remote event configuration.

FIG. 6 is a diagram of remote development of configurations according to various embodiments of the present application.

Referring to FIG. 6, configuration with respect to device profile 600 is provided. The configuration with respect to device profile 600 can be implemented in connection with method 200 of FIG. 2, method 300 of FIG. 3, method 400 of FIG. 4, method 500 of FIG. 5, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. The configuration with respect to device profile 600 can be implemented at least in part by system 100 of FIG. 1, computer system 1500 of FIG. 15, system 1600 of FIG. 16A, and/or system 1650 of FIG. 16B.

As illustrated in FIG. 6, development device 610 can provide device profile 600 to server 620 and/or terminal 630. Device profile 600 can be developed (e.g., defined) remote from server 620 and/or terminal 630, and can be later provided (e.g., sent) to server 620 and/or terminal 630. Server 620 and/or terminal 630 can respectively store device profile 600 locally. In some embodiments, development of device profile 600 and distribution of device profile to server 620 and/or terminal 630 can be performed asynchronously. As an example, development device 610 can contemporaneously (e.g., simultaneously, etc.) provide device profile 600 to server 620 and/or terminal 630. As another example, the providing of device profile 600 to server 620 is separate from the providing of device profile 600 to terminal 630.

In some embodiments, a device profile defines event names and event conditions corresponding to the event names. A format of the device profile can be "event name: event conditions." For example:

event1 name: power_low args: 10% indicates a charge-less-than-10% event.

In some embodiments, a general device profile is provided for one type of terminal (e.g., terminals having similar functionality). For example, smart speakers provided by the developer of smart speaker A and the developer of smart speaker B both have play, pause, restore, volume-setting, and other functions. In some embodiments, smart speaker A and smart speaker B can share a device profile (e.g., the smart speakers have a common device profile). If each of the two smart speakers (e.g., smart speaker A and smart speaker B) has corresponding distinctive functions, then the smart speakers can have separate (e.g., different) corresponding device profiles. In some embodiments, a terminal has a plurality of device profiles. Each of the plurality of device profiles can correspond to a different set of functions (e.g., the set of functions corresponding to each of the plurality of device profiles can be entirely different or can have a subset of overlapping events). The use of identical or similar device profiles across similar terminals can reduce redundant effort involved in developing intelligent hardware. Further, the use of identical or similar device profiles across similar terminals can assist with the popularization of intelligent hardware by lowering the threshold associated with development of such terminals.

Figure 7:
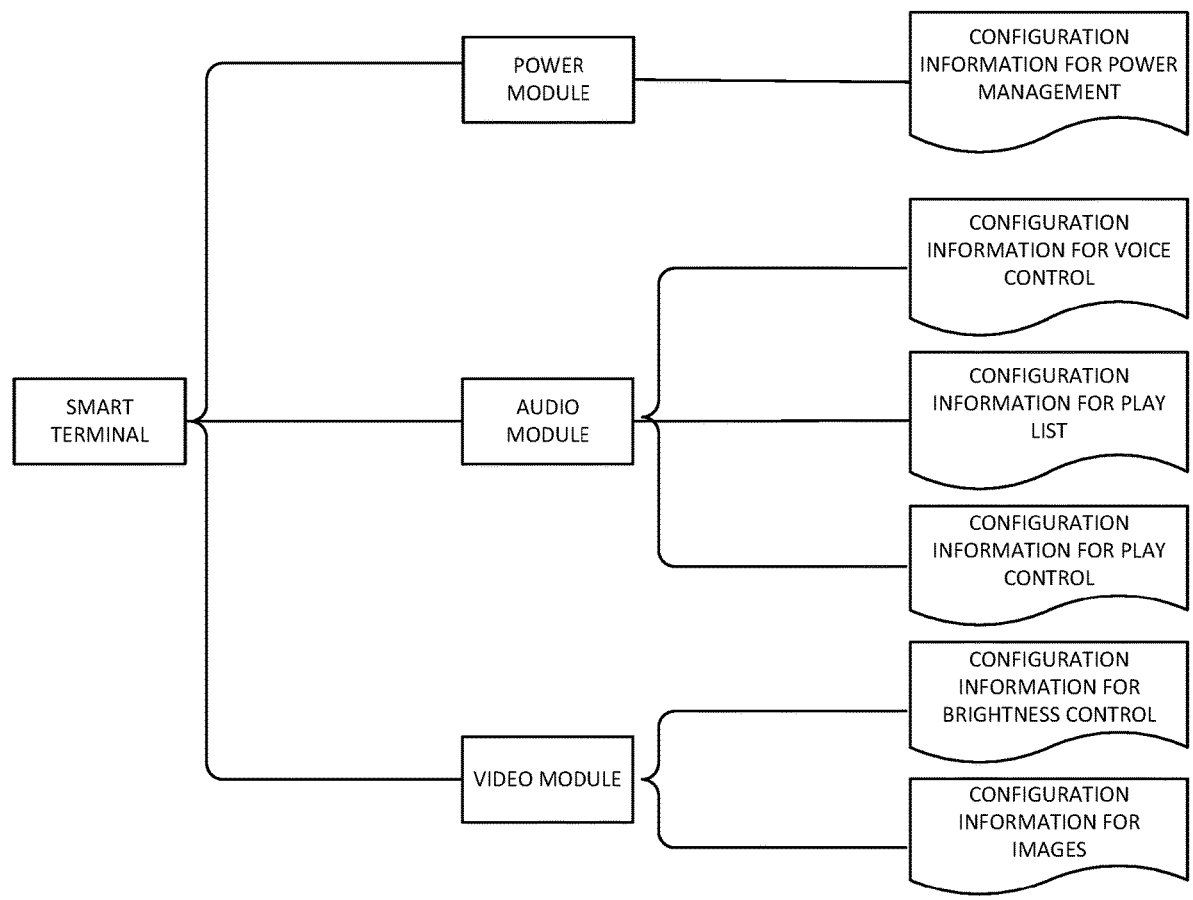
FIG. 7 is a structural diagram of a device profile according to various embodiments of the present application.

FIG. 7 is a structural diagram of a device profile according to various embodiments of the present application.

Referring to FIG. 7, device profile 700 is provided. Device profile 700 can be implemented in connection with method 200 of FIG. 2, method 300 of FIG. 3, method 400 of FIG. 4, method 500 of FIG. 5, configuration with respect to device profile 600 of FIG. 6, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. Device profile 700 can be implemented at least in part by system 100 of FIG. 1, computer system 1500 of FIG. 15, system 1600 of FIG. 16A, and/or system 1650 of FIG. 16B.

As illustrated in FIG. 7, device profile 700 can pertain to a terminal. Device profile 700 can comprise information pertaining to one or more modules implemented in the terminal (e.g., hardware and/or software implemented modules). According to various embodiments, device profile 700 comprises configuration information associated with one or more functions. For example, the one or more functions can be associated with the one or more modules of the terminal for which information is included in device profile 700.

The one or more functions for which configuration information comprised in the device profile 700 can be associated with are power functions, audio functions, video functions, calling functions, application functions, communication functions, messaging functions, email functions, gaming functions, location functions, video playback functions, touch input functions, etc. Device profile 700 can comprise configuration information for various other functions. As illustrated in FIG. 7, device profile 700 can comprise configuration information for power management function(s) (e.g., associated with a power module of the terminal), configuration information for voice control function(s) (e.g., associated with an audio module of the terminal), configuration information for play list function(s) (e.g., associated with an audio module of the terminal), configuration information for play control function(s) (e.g., associated with an audio module of the terminal), configuration information for brightness control function(s) (e.g., associated with an audio module of the terminal), configuration information for image function(s) (e.g., associated with an audio module of the terminal), etc.

In some embodiments, device profile 700 is set forth (e.g., defined) in a document. As an example, the device profile can be organized in the form of a tree-shaped header file directory. The sub-node of each node in the tree-shaped header file directory is a sub-function of the node, as illustrated in FIG. 7. The root node is a terminal (e.g., the terminal to which the device profile 700 corresponds). Sub-nodes of device profile 700 can include: power module, audio module, video module, etc. Device profile 700 can also have sub-nodes at more levels. In some embodiments, each of the nodes corresponding to the power module, audio module, and video module has corresponding configuration information. The configuration information pertaining to the nodes (e.g., power module, audio module, and video module) can include an event name and a corresponding event condition. For example, each of the power module, audio module, and video module can have configuration information defined in device profile 700. As shown in FIG. 7, the "power" module can include configuration information relating to power management (power_manage.h). The "audio" module can include configuration information relating to voice control (voice_control.h), configuration information relating to the play list (play_list.h), and configuration information relating to play control (play_control.h). The "video" module can include configuration information relating to brightness control (light_control.h) and configuration information relating to images (image.h). In some embodiments, the ".h" in the configuration information described above is the format suffix for configuration information.

According to various embodiments, the event registration (e.g., performed at 520 by terminal 501 of FIG. 5) includes analyzing the device profile and locally registering (e.g., setting) event identifiers included in the device profile. For example, control module 502b can analyze a device profile and locally register the event identifiers included in the device profile. In some embodiments, the event registration includes the terminal locally registering the event identifiers included in the device profile and registering event conditions corresponding to the event identifiers. As an example, an event identifier can take on the form of "event id," "event name," etc. Various embodiments described herein are described using an event identifier having the form "event name." However, various other forms of the event identifier can be implemented.

The registered event names correspond to the event names reported to the server (e.g., server 503). In some embodiments, registering information (e.g., registration of the event) includes locally recording (e.g., storing) the information to be registered (e.g., event name or event name and corresponding event conditions).

In some embodiments, event registration at terminal 501 includes function module registration in addition to event registration. As used herein, "function module" refers to a part of a terminal device that has a specific function. The module (part) of the terminal can be implemented using hardware, software, or both hardware and software. Examples of a function module include a power module, a control module, and a detection module. Other function modules can be implemented. A developer can use development device 504 to send a function module registration file to control module 502b of the terminal 501 or development device 504 can directly pre-configure terminal 501 with the function module registration file. For example, development device 504 can pre-configure the function module registration module in control module 502b. In some embodiments, control module 502b can perform function module registration based at least in part on the function module registration file (e.g., the device profile). According to various embodiments, the function module registration file includes initialization process information for one or more function modules (e.g., each function module of the terminal, or each function module to which the function module registration file pertains). In some embodiments, the terminal uses the initialization process information for one or more function modules. As an example, the terminal automatically runs the initialization process for each function module at system startup. The system startup can be configured to run the initialization process of the one or more function modules (e.g., at least one, or all, of the function modules to which the function module registration file pertains). In some embodiments, the function module registration file includes event names corresponding to one or more function modules. For example, the function module registration file can comprise event names corresponding to events that are associated with the one or more function modules to which the function module registration file pertains. An event can be associated with a function module if the function module functions based at least in part on (or in response to) detection of the event. Accordingly, if the function module registration file comprises event names, the function module can report the event name corresponding to a detected event. In some embodiments, in response to detecting an event associated with a function module, the function module provides the terminal (e.g., control module 502b) with an indication of the occurrence of the event (e.g., the function module reports the detected event). The indication of the occurrence of the event can comprise the event name corresponding to the detected event.

According to various embodiments, event registration can be processed at the server (e.g., the server with which the terminal interacts in response to occurrence of an event). For example, in response to receiving a device profile, server 503 performs event registration. Server 503 can obtain the device profile from development device 504. In response to obtaining a device profile from development device 504, server 503 can use the device profile in connection with event registration. For example, server 503 can locally register event information and control instructions corresponding to event information. According to various embodiments, the event information includes event names, event conditions, or event names and event conditions. The event information can include other information pertaining to events (e.g., events that can be detected at a terminal and for which a function is invoked in response to detection of such event). The event registration at server 503 is in connection with server 503 implementing a control over a terminal 501 such as control of terminal 501 based on an event reported by terminal 501. As an example, the server 503 can perform event registration based at least in part on (e.g., in response to) a reporting of an event by terminal 501. Server 503 can use information included in the reporting of the event by terminal 501 as a basis for the event registration. In some embodiments, server 503 uses a device profile (e.g., a device profile obtained from development device 504) as a basis to locally register event information and destination terminal IDs and control instructions corresponding to event information. The destination terminal IDs can refer to a terminal with which server 503 interacts (e.g., instructs to perform a function, causes invocation of a function, etc.) in response to obtaining a report of an event (e.g., in response to receiving an event message). The event registration, or registration of the event information, can be performed in connection with server 503 implementing control over a terminal (e.g., instructing to perform a function, causing invocation of a function, etc.) based on an event reported by another terminal. For example, if a first terminal reports an event to the server and such report of the event causes the server to interact with (e.g., instruct to perform a function, cause invocation of a function at, etc.) a second terminal, the server can perform the registration contemporaneously with the server interacting with the second terminal.

The registration mechanism described above can, in addition to registering information at the time of terminal activation, register information while the terminal device is running an upgrading of the terminal. Use of the registration mechanism described above can make upgrading the terminal device even easier for the developer. For example, if new event registration information exists (e.g., is developed or obtained), a device profile comprising the new event registration information can be sent to the terminal and/or the server device. A device profile can be generated in response to obtaining new event registration information, and the device profile can be provided to a terminal and/or server (which can use the device profile in connection with an event registration). The server device and/or the terminal can easily obtain new event registration based at least in part on the registration mechanism described above. According to various embodiments, all of the event information included in the device profile is registered. For example, event registration corresponding to all events for which event information is comprised in the device profile can be performed contemporaneously. In some embodiments, a subset of the event information included in the device profile is registered. For example, event registration corresponding to a subset of events for which event information is comprised in the device profile can be performed (and a remaining set of events can be registered at a later time). Event information pertaining to an unregistered event can be registered and event information pertaining to an event that is already registered can be skipped (because the corresponding event is already registered). In some embodiments, event information comprised in a device profile is analyzed to determine whether the event information comprises updated event information for an event (e.g., an event that is already locally registered at the terminal and/or server). In response to determining that the device profile comprises an updated (e.g., a newer version of) event information for an event that is already locally registered, the updated event information can be used to update registration of the corresponding event.

In some embodiments, a developer preconfigures a device profile in the terminal (e.g., control module 502b) and/or server. As an example, the device profile is set in the terminal and/or server such that the development device 504 is not required to provide the device profile to terminal 501 and/or server 503. As an example, the device profile is preconfigured in terminal 501 when the terminal is shipped from the factory (of the manufacturer or the developer). In some embodiments, the device profile is defined at the terminal and/or server by a corresponding user thereof. For example, a terminal can be configured (e.g., set) with a device profile based at least in part on a user's operating habits, preferences, settings, and/or actual use needs. For example, the device profile can be configured at the terminal via an interface provided by the terminal to the user (e.g., a graphical user interface), and the terminal (e.g., the control module) stores the user-configured device profile. The various implementations for configuring device profiles described above enable both developers and terminal device users to configure terminal device control schemes flexibly according to need and/or preferences.

At 530, event information is obtained. In some embodiments, function module 502a of terminal 501 provides the event information to control module 502b of terminal 501. The event information can comprise an event name (e.g., an event name corresponding to an event that occurred). According to various embodiments, in response to determining that an event occurred (e.g., in response to detecting the event), terminal 501 obtains the event information corresponding to the event that occurred.

In some embodiments, in response to function module 502a detecting the event, the function module 502a reports the event to control module 502b. For example, function module 502a reports the event name of the event to control module 502b.

At 540, an event message is provided. According to various embodiments, terminal 501 provides the event message to server 503. Terminal 501 can provide the event message to server 503 in response to terminal 501 determining that the event occurred. One example is in response to control module 502b receiving indication that the event occurred from function module 502a. For example, if terminal 501 (e.g., control module 502b) determines that the event name reported by function module 502a corresponds to a locally registered event identifier, then terminal 501 communicates the event message to server 503. In some embodiments, terminal 501 provides the event message to server 503 in response to detecting an event and determining that the event corresponds to a locally registered event (e.g., a locally registered event identifier) and corresponds to an event that is registered at a server.

According to various embodiments, an event identifier includes information from which the corresponding event can be determined. For example, the event identifier includes descriptive information that can be used to determine the event.

In some embodiments, an event message comprises information from which the corresponding event can be determined. For example, the event message includes the corresponding event name or event identifier. In some embodiments, the event message includes the corresponding event name or event identifier without any further information that identifies the event. As an example, when the terminal 501 (e.g., control module 502b) sends an event message to server 503, the event message includes only the event name. As an example, communicating an event message including the corresponding event name or event identifier can be implemented if the event (e.g., the event name or event identifier) and its corresponding event conditions were registered (e.g., at server 503) during registration. In some embodiments, the event message includes the event name (or another event identifier) and the corresponding event conditions. As an example, communicating an event message that includes the event name (or event identifier) and the corresponding event conditions can be implemented if the event conditions corresponding to the event (e.g., the event name) were not registered (e.g., at server 503) during registration. In some embodiments, the event conditions corresponding to an event are included in the event message provided by terminal 501 to server 503 if the server has not pre-registered the event conditions in association with the corresponding event.

In some embodiments, the server performs one or more operations based at least in part on an event message. In response to receiving an event message (e.g., from a terminal), the server can perform one or more operations. As an example, the server can store a mapping of operations to events. In response to receiving the event message, the server can determine the one or more operations to be performed based at least in part on the mapping of operations to events. For example, the server queries the mapping of operations to events in connection with the server determining the one or more operations to be performed. The one or more operations can include providing instructions to a terminal (e.g., the terminal from which the event message was received, or a different terminal). In some embodiments, the server records the received event information (e.g., pertaining to the received event message) without performing any confirmation of the event message.

In some embodiments, the server uses a control instruction corresponding to a pre-registered event name as a basis to provide (e.g., send) a control instruction corresponding to the received event name to the terminal. For example, the server exercises control over the terminal based at least in part on the event corresponding to the received event message. The exercise of control over the terminal by the server can include a server providing one or more instructions to the terminal such as instructing the terminal to perform one or more corresponding functions. As an example, detection of a "control speech recording," and/or reception of an indication that the "control speech recording" event occurred will trigger the server to exercise control over the terminal (e.g., trigger the server to provide one or more instructions to the terminal).

In some embodiments, the server (e.g., server 503 of FIG. 5) has locally registered events. For example, in connection with the locally registered events, the server has locally registered event names, destination terminal IDs, and control instructions corresponding to the events (e.g., corresponding to the event names). The server can store a mapping of events (e.g., an identifier that identifies events) to destination terminal IDs and/or a mapping of events to control instructions. "Destination terminal ID" can refer to the terminal that sent the event message or to another terminal. As an example, a destination terminal ID refers to another terminal (e.g., a terminal that is different from the terminal from which the event message is received) when occurrence of an event at a first terminal (e.g., detected at a first terminal) serves as a basis to trigger control over a second terminal. In response to the server receiving an event name reported by a terminal, the server determines the destination terminal ID and control instruction corresponding to the locally registered event name and sends the determined control instruction to the terminal corresponding to the destination terminal ID. As an example, in response to the server receiving an event message (e.g., indicating occurrence of an event), the server determines a destination terminal ID and/or a control instruction based at least in part on the event message (e.g., based on the destination terminal ID and control instruction that correspond to the event associated with the event message). In some embodiments, the server provides a control instruction to a terminal (e.g., a terminal corresponding to the destination terminal ID).

In some embodiments, the event message comprises an indication of the terminal (e.g., a terminal that is providing the event message to the server, etc.). For example, the event message includes terminal identification information such as a terminal identifier, etc. Including the terminal identification information in the event message can improve security of the system. The terminal identification information included in the event message can be used in connection with an authentication. For example, in response to the server receiving the event message, the server performs an authentication based on the device identification information included in the event message. For example, the server determines whether the terminal ID is legitimate (e.g., based at least in part on the event message). In response to determining that the authentication is successful (e.g., that the terminal ID is legitimate), the server processes the received event message. Conversely, in response to determining that the authentication is not successful (e.g., that the terminal ID is not legitimate), the server discards (or ignores) the event message. If authentication is not successful, the server can provide to the terminal an indication that authentication is not successful.

The terminal ID of a terminal can correspond to information from which the terminal is identified. For example, the terminal ID comprises information capable of uniquely identifying the corresponding terminal. In some embodiments, the terminal ID is a unique Internet of Things ID. The unique Internet of Things ID can be centrally allocated to all terminal by an ID-allocating device (e.g., a server of a system in which the corresponding terminals are deployed). The terminal ID can be permanently set (e.g., stored) at the terminal. For example, the terminal ID can be set in a chip of the terminal in connection with the manufacture of the terminal (e.g., contemporaneous with the terminal being shipped from the factory). The terminal ID cannot be falsified or illicitly obtained. The terminal IDs can be preset in the server. For example, the server stores a mapping of terminal IDs to terminals. The mapping of terminal IDs to terminals stored at the server can be used in connection with determining whether a terminal or terminal ID is legitimate. If terminal device IDs are centrally allocated by an ID-allocating device, the server can obtain legitimate terminal IDs from the ID-allocating device in advance (e.g., before or contemporaneous with an authentication of the terminal).

In some embodiments, the event message comprises one or more content fields. The event message can comprise event information (e.g., an event name, one or more event conditions, etc.), terminal identification information, and the one or more content fields.

According to various embodiments, the server provides an event response message to the terminal in response to the server obtaining the corresponding event message. In some embodiments, the server does not provide a response to the terminal in response to the server obtaining an event message.

A system or a terminal can be configured to determine whether an event response message is obtained from the server in response to the server obtaining a corresponding event message. If the server is configured in a manner such that an event response message is sent back to the terminal (e.g., in response to the terminal sending the event message to the server), then if the terminal determines that an event response message is not received from the server, then the terminal resends the event message. In some embodiments, the terminal resends the event message if the terminal does not receive the event response message within a set period of time from a time the terminal reported the event (e.g., the time at which the terminal communicated the event message). In some embodiments, a number of times that an event message is resent is limited to a preset threshold.

According to various embodiments, the event response message comprises information from which a corresponding event can be identified. For example, the event message includes the event name, an event identifier, an indication of a terminal that reported the event (e.g., an identifier of the terminal that sent the event message), etc., or any combination thereof. The event name can be used to identify the correspondence with the event message.

Figure 8:
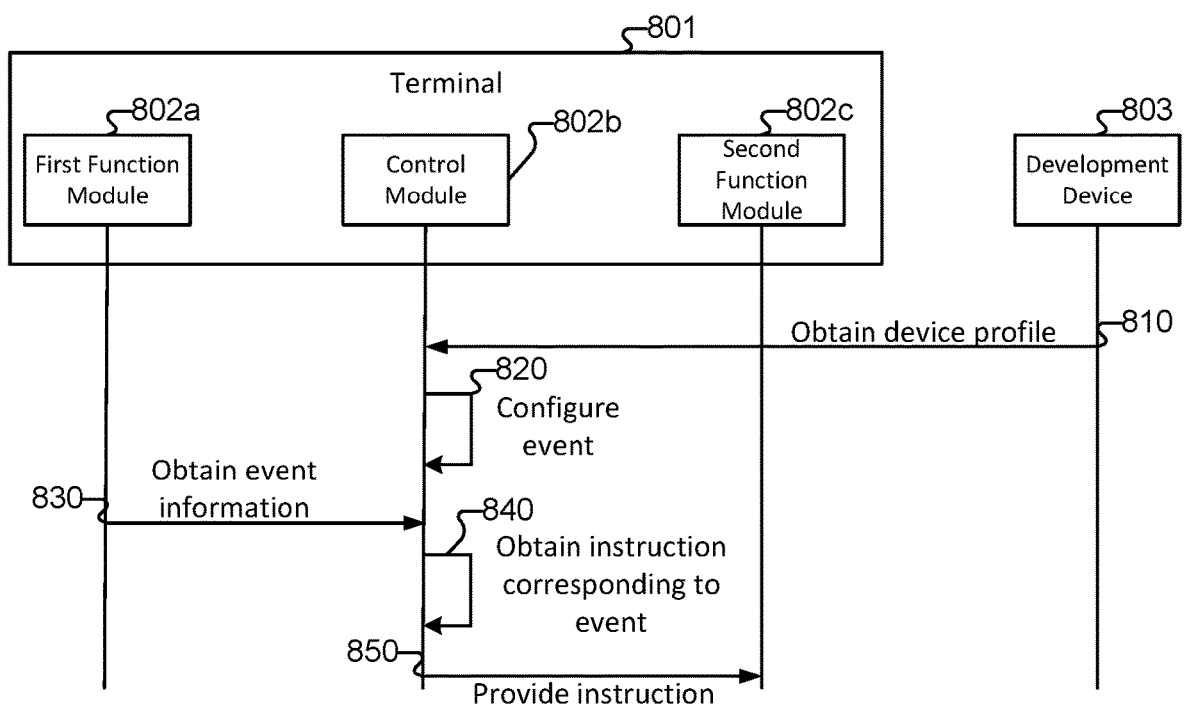
FIG. 8 is a flowchart of a method for event handling according to various embodiments of the present application.

FIG. 8 is a flowchart of a method for event handling according to various embodiments of the present application.

Referring to FIG. 8, method 800 is provided. Method 800 can be implemented in connection with method 200 of FIG. 2, method 300 of FIG. 3, method 400 of FIG. 4, method 500 of FIG. 5, device profile 600 of FIG. 6, device profile 700 of FIG. 7, method 900 of FIG. 9, method 1000 of FIG. 10, method 1100 of FIG. 11, method 1200 of FIG. 12, method 1300 of FIG. 13, and/or method 1400 of FIG. 14. Method 800 can be implemented at least in part by system 100 of FIG. 1, computer system 1500 of FIG. 15, system 1600 of FIG. 16A, and/or system 1650 of FIG. 16B.

At 810, a device profile is obtained. The device profile is provided to terminal 801. In some embodiments, the device profile is provided to the terminal 801 by development device 803. For example, the development device communicates (e.g., sends) the device profile to the terminal 801 via one or more networks. Control module 802b can obtain the device profile. Control module 802b can be implemented (e.g., programmatically) by one or more processors of terminal 801.

According to various embodiments, development device 803 is a terminal (e.g., a server) that configures device profiles. The device profiles can be configured based at least in part on a setting of a terminal for which the device profile is being configured (e.g., a user of the terminal, one or more specifications of the terminal, etc.), a system in which the terminal corresponding to the device profile is to be deployed, etc. As an example, an administrator configures the device profile (e.g., the device profile can be configured based at least in part on one or more inputs from the administrator). As another example, a manufacturer (e.g., a manufacturer of the terminal) configures the device profile. In some embodiments, the device profile is configured based at least in part on a service with which the terminal (or a user of the terminal) is registered. The service can be provided by a server (e.g., a software as a service implementation, a location-based service, etc.). Configuration of the device profile can comprise setting (e.g., defining) an association between one or more events to one or more functions (e.g., a function to be invoked in response to detection or occurrence of the corresponding event(s)). The development device 803 can store a mapping of device profiles to terminals. Accordingly, development device 803 can obtain the device profile corresponding to terminal 801 (e.g., from the mapping of device profiles to terminals), and provide the device profile to terminal 801.

According to various embodiments, control module 802b implements event processing. For example, in response to occurrence of an event (e.g., detection of an event), control module 802b invokes a function corresponding to the event. For example, the control module 802b can generate and send an event message in response to receiving a determination that an event has occurred (e.g., in response to receiving an indication that the event has occurred, or in response to detecting the occurrence of the event). Control module 802b can be a unit in terminal 801 that performs control and coordination functions for various modules of terminal 801.

At 820, an event is configured. In some embodiments, terminal 801 performs event registration (e.g., with respect to one or more events). For example, control module 802b performs the event registration in response to obtaining the device profile at 810. The event registration can be performed based at least in part on the device profile. Event registration can comprise setting the device profiles (e.g., by registering the device profile), such as by storing an association of one or more functions with one or more events (e.g., by updating or storing a mapping of events to functions). The association of the one or more functions with the one or more events can be stored locally at terminal 801.

According to various embodiments, 810 and 820 are performed in advance (e.g., during configuration of terminal 801, etc.). For example, 810 and 820 are performed separate from (e.g., independent of) occurrence of an event (e.g., such that upon occurrence of the event, terminal 801 is configured with respect to the device profile and can function accordingly).

According to various embodiments, configuring the event comprises registering one or more function modules and control instructions associated with the event. 810 and 820 are similar to the event registration process of 510 and 520 of method of 500 illustrated in FIG. 5. In some embodiments, the registration of an event is only carried out in the terminal device. For example, an event can be registered only with respect to a particular device, and a corresponding event registration is not performed with respect to a server. The event can be registered only at the terminal if one or more operations that are performed in response to detection of an event by the terminal are generated at the terminal and without a server providing instructions with respect to the detected event. Control module 802b can obtain the device profile, and in response to obtaining the device profile, control module 802b can analyze the device profile. Analyzing the device profile can include determining information pertaining to one or more events associated with the device profile (e.g., one or more events to be registered). In response to obtaining the device profile (e.g., after control module 802b analyzes the device profile), control module 802b locally registers an event. For example, terminal 801 (e.g., control module 802b) locally registers the event name included in the device profile, and the function module and execution instruction associated with the event name.

At 830, event information is obtained. In some embodiments, first function module 802a of terminal 801 provides the event information to control module 802b of terminal 801. The event information can comprise an event name (e.g., an event name corresponding to an event that occurred). According to various embodiments, in response to determining that an event occurred (e.g., in response to detecting the event), terminal 801 obtains the event information corresponding to the event that occurred.

In some embodiments, in response to first function module 802a detecting the event, first function module 802a reports the event to control module 802b. For example, first function module 802a reports the event name of the event to control module 802b.

At 840, an instruction corresponding to an event is obtained. In some embodiments, terminal 801 determines an instruction corresponding to the event. In response to determining that an event occurred (e.g., in response to detecting the event), the terminal determines an instruction corresponding to such an event. The instruction corresponding to an event can be determined based at least in part on the event registration. For example, a mapping of instructions to events (e.g., event identifiers such as an event name, an event ID, an event type, etc.) can be queried to determine the instruction corresponding to the event. The instruction can comprise one or more operations to be performed in response to occurrence of an event. In some embodiments, the instruction comprises an indication of one or more function modules to perform the one or more operations. In some embodiments, the instruction corresponding to the event is the execution instruction.

As an example, in response to the event being reported, control module 802b determines the second function module 802c and the instruction associated with the event name (e.g., that are reported by locally registered first function module 802a). In some embodiments, the event information obtained at 830 (e.g., corresponding to the reporting of the event) comprises the instruction that includes the one or more operations to be performed in response to the occurrence of the event and an indication of second function module 802c that is to perform the one or more operations. As an example, control module 802b can determine the one or more operations to be performed in response to the occurrence of the event and an indication of second function module 802c that is to perform the one or more operations by extracting such information from the event information obtained from first function module 802a in response to the event being detected.

According to various embodiments, if a locally registered function module has an interactive relationship with the event name, an execution instruction corresponding to the event name is provided to the function module with which the event is associated. For example, if a local registration of an event indicates that an event corresponds to a certain function module, then the function module is provided the execution instruction in response to determining that the event occurred. Accordingly, the event of one function module (e.g., an event detected at a first function module) thus constitutes the basis for controlling another function module (e.g., for another function module to perform an operation).

At 850, an instruction is provided. In some embodiments, the instruction is provided based at least in part on the detected event. As an example, a second function module 802c obtains the instruction from control module 802b. The instruction can correspond to an instruction for second function module 802c to perform one or more operations.

Action Mechanism:

According to various embodiments, messages can be communicated between a server and a terminal. The messages communicated between the server and the terminal can be action messages (e.g., messages pertaining to one or more actions such as operations). For example, the server can communicate (e.g., send) a first message to a terminal. The first message (e.g., the first action message) can include an action identifier. The action identifier can identify an action such as an operation of the server or an operation of the terminal.

The terminal can obtain the first message. For example, the server can send the first message to the terminal via one or more networks. In response to obtaining the first message, the terminal determines a second message. For example, the terminal can determine (e.g., generate) a response to the first message. The terminal can send a second message to the server. In some embodiments, the second message is associated with the first message (e.g., a response to the first message). The terminal can receive the first message and send a second message back to the server. In some embodiments, the second message (e.g., a second action message) includes the action identifier and an action status. The action identifier included in the second message is the same action identifier that is included in the corresponding first message. The action status can indicate an action execution status of the first message by the terminal. For example, the action status can indicate a status of an operation being performed at the terminal.

The first terminal can send the second message to the server via one or more networks. The server can receive the second message sent back by the terminal.

According to various embodiments, the first message is triggered based at least in part on an event message provided (e.g., reported) by the terminal. In response to determining that an event occurred, the terminal can report an event message to the server. The server can receive the event message reported by the terminal. In response to receiving the event message, the server can determine an action corresponding to an event associated with the event message. The server can determine the action (or an identifier of the action) corresponding to the event of the event identifier based on preset associations of events to actions. For example, the server can determine an event associated with the event message and can query a mapping of events to actions, or a mapping of event identifiers to action identifiers. The action (e.g., the action corresponding to the action identifier) can correspond to one or more operations (e.g., one or more operations that are to be performed in response to the occurrence of an event). The one or more operations can correspond to one or more operations to be performed by the terminal, etc. In response to determining the action or action identifier, the server generates a first message based at least in part on the action or action identifier. For example, the server includes the action identifier in a first message. The server communicates the first message to the terminal (e.g., via one or more networks).

In some embodiments, the terminal from which the server receives an event message is different from the terminal to which the server sends an action message (e.g., an instruction to perform one or more operations in response to the occurrence of the event). For example, the server can receive an event message from a first terminal. In response to receiving the event message, the server can determining an action corresponding to an event associated with the event message. The server can determine the action (or an identifier of the action) corresponding to the event of the event identifier based on preset associations of events to actions. For example, the server can determine an event associated with the event message and can query a mapping of events to actions, or a mapping of event identifiers to action identifiers. In addition, in response to receiving the event message, the server can determine a target terminal associated with the action or which action message (e.g., an instruction to perform one or more operations in response to the occurrence of the event) is to be sent. As an example, in response to receiving the event message, the server can determine an identifier of the target terminal. In response to determining the action or action identifier and/or the identifier of the target terminal, the server generates a first message based at least in part on the action or action identifier. For example, the server includes the action identifier in a first message and communicates the first message to the target terminal (e.g., via one or more networks).

Examples of the implementations of processing in response to an event message are described below.

Application Scenario 1: Control at a Terminal by a Cloud Based on Event Detected by the Terminal A developer sets (e.g., defines) events of a speech control module in a smart speaker and pre-registers the events in the control module of the terminal (e.g., intelligent hardware). The events (e.g., with respect to the speech control module) are also pre-registered on the cloud. The events of the speech control module include a "control speech recording." In response to the terminal (e.g., the speech recording module in the smart speaker) detecting that a "control speech recording" event has occurred (e.g., that the "control speech recording" has been triggered), the terminal communicates an indication that the event has occurred to a server associated with the cloud. For example, the speech control module of the terminal reports the event name (or other information from which the event can be identified) to the control module of the terminal.

The terminal (e.g., the control module) determines that the event corresponds to an event that is registered with the cloud. For example, the terminal determines that the cloud (e.g., the server) has a corresponding registration of the event (e.g., of the event name). The smart speaker (e.g., the terminal) sends an event message including the event name to the cloud device. In some implementations, the cloud device provides a confirmation of receipt of the event message. In response to receiving the event message, the cloud device performs processing (e.g., one or more operations) based on the event corresponding to the event message. As an example, the cloud device determines the event (e.g., the event that occurred) based on information (e.g., the event name or other event identifier) comprised in the event message. The processing performed by the cloud device with respect to the event message can include recognizing the control speech included in the event and/or determining one or more operations to be performed in response to the event. For example, the cloud device determines one or more operations (e.g., instructions) to be performed based at least in part on the control speech included in the event. In response to receiving the event message, the cloud device (e.g., the server) provides, to the terminal, information indicating the one or more operations to be performed.

In such an implementation, the providing of an indication that an event occurred by a terminal to a cloud device (e.g., a server) links the terminal (e.g., a smart device) and a cloud device to each other.

Application Scenario 2: Control at a Second Terminal Based on an Event Detected at a First Terminal A first terminal (e.g., smart door or smart window) can detect an event. For example, the smart door (e.g., a status detecting module of the smart door) can detect that a door or window has opened. In response to determining that an event has occurred (e.g., in response to detecting that a door has been opened), the status detecting module can report occurrence of the event to the control module of the first terminal. For example, the status detecting module provides (e.g., reports) the event name to the control module of the first terminal (e.g., the smart door or window). In response to determining that an event occurred, the first terminal determines whether the event corresponds to an event registered at a cloud device (e.g., the server). For example, in response to the control module determining that the event name corresponds to an event that was registered at a cloud device, the first terminal (e.g., the control module) generates an event message to report the occurrence of the event to the cloud device. The event message can comprise the event name or other identifier associated with the event. The first terminal sends the event message to the cloud device.

In response to receiving the event message, the cloud device performs processing (e.g., one or more operations) based on the event corresponding to the event message. As an example, the cloud device determines the event (e.g., the event that occurred) based on information (e.g., the event name or other event identifier) comprised in the event message. In addition, in response to receiving the event message, the cloud device can determine the target terminal (e.g., an identifier corresponding to the target terminal) to which an instruction to perform one or more operations to be performed is to be sent. For example, the cloud device queries a mapping of events to information (e.g., target terminals or identifiers for target terminals, and control instructions) to determine the target terminal (e.g., the identifier corresponding to the target terminal) and a control instruction corresponding to the event associated with the event message (e.g., event name). As an example, the target terminal (e.g., the second terminal) can be a smart lamp and the control instruction can correspond to an instruction to turn on the lamp. According to such an example, in response to determining the target terminal and the control instruction, the cloud device provides (e.g., sends) the control instruction to turn on the lamp to the smart lamp. Consequently, after a user opens a door, a smart lamp is automatically illuminated.

In such an implementation, the detection of an event by a first terminal is associated with the performing of one or more operations at a second terminal. Accordingly, a smart device is linked to another smart device through a cloud device.

Application Scenario 3: Control at a Terminal by the Terminal Based on Event Detected by the Terminal Various function modules in a smart device can be controlled based on one or more events detected by another function module(s) in the smart device.

A first terminal (e.g., a smart lamp) can detect an event. For example, the smart lamp (e.g., a status detecting module of the smart lamp) can detect a brightness level (e.g., a change in a brightness level, a brightness level being raised more than a preset threshold, or a brightness level being lowered below the preset threshold, etc.). In response to determining that an event has occurred (e.g., in response to a light detecting module in a smart lamp detecting that brightness is lower than a preset threshold value), the light detecting module can report occurrence of the event to the control module of the first terminal. For example, the light detecting module provides (e.g., reports) the event name to the control module of the smart lamp. In response to determining that an event occurred, the first terminal determines whether the event corresponds to a locally registered event and/or whether the event is registered locally in connection with a function module of the first terminal. For example, the control center determines whether a function module and a control instruction are linked to the locally registered event name. The first terminal can query a mapping of events (or identifies events such as event names) to control instructions and/or function modules of the first terminal in connection with the first terminal determining whether the event is locally registered and/or whether a function module and control instruction is registered in association with the event. The event name can be associated with a switching module, and the corresponding control instruction can correspond to a "turn on lamp" instruction. In response to determining that the event is locally registered and/or whether a function module and control instruction are registered in association with the event, the terminal (e.g., the control module) provides the corresponding control instruction (e.g., a "turn on lamp" instruction) to the switching module of the smart lamp. In response to receiving the control instruction, the switching module can switch (e.g., activate) a light of the smart lamp. Accordingly, the smart lamp is turned on. Consequently, such an implementation can obtain automatic illumination based on an ambient light brightness level (e.g., in response to an ambient light brightness dropping below a threshold value, the smart lamp automatically turns on a light).

In such an implementation, the detection of an event by a first module of the terminal is associated with the performing of one or more operations at a second module of the terminal. Accordingly, function modules of a smart terminal are linked together.

Figure 9:
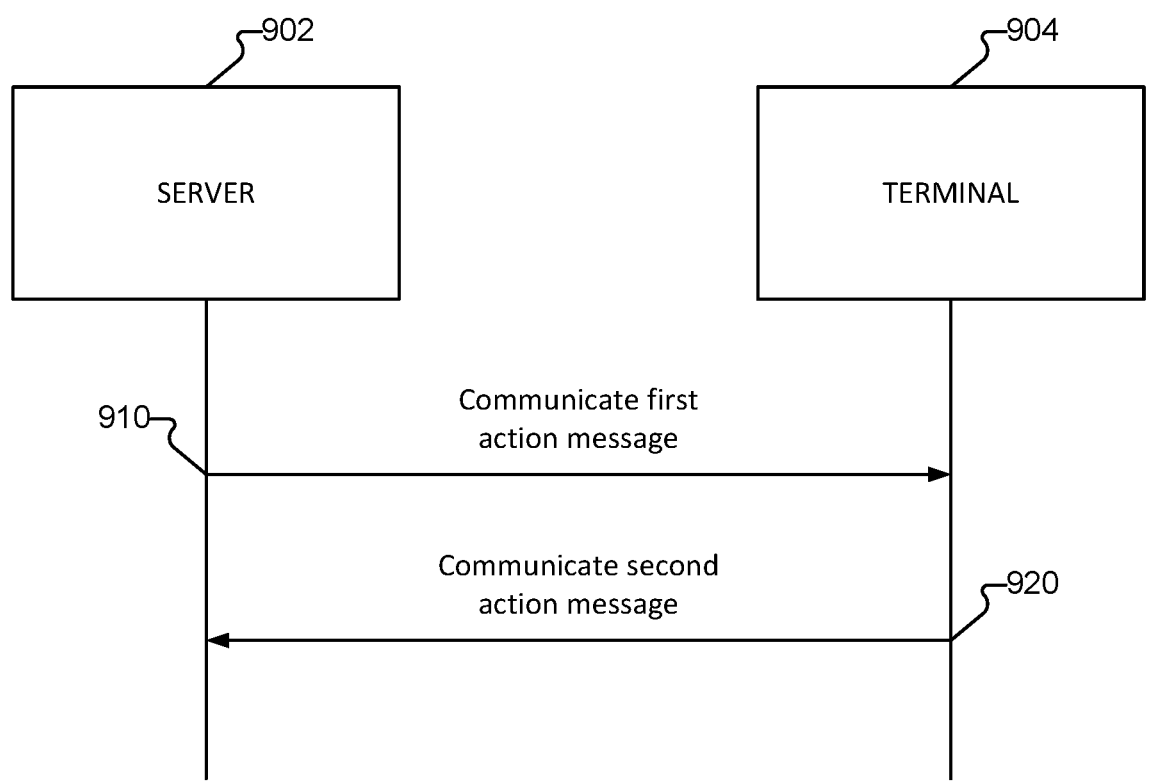
FIG. 9 is a flowchart of a method for an action mechanism according to various embodiments of the present application.

FIG. 9 is a flowchart of a method for an action mechanism according to various embodiments of the present application.

Referring to FIG. 9, method 900 is provided. Method 900 can be implemented in connection with method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 1000 of FIG. 10, method 1100 of FIG. 11, method 1200 of FIG. 12, method 1300 of FIG. 13, and/or method 1400 of FIG. 14. Method 900 can be implemented at least in part by system 100 of FIG. 1, computer system 1500 of FIG. 15, system 1600 of FIG. 16A, and/or system 1650 of FIG. 16B.

At 910, a first action message is communicated. In some embodiments, server 902 communicates the first action message to terminal 904. Server 902 can send the first action message to terminal 904 via one or more networks. In some embodiments, a first action message includes an action identifier which can be an alphanumerical string, hexadecimal string, etc. that identify the first action message.

It should be noted that the first action message and the second action message are names of a first message and a second message used as examples in an embodiment of the present invention. However, embodiments of the present invention are not limited to such message names.

Server 902 can send the first action message to terminal 904 in response to various events or inputs. Two implementations of server 902 sending the first action message to terminal 904 are discussed in further detail below. However, server 902 can send the first action message in various other contexts (e.g., server 902 can periodically send first action message to terminal 904).

According to various embodiments, server 902 sends the first action message to terminal 904 in response to a triggering by a control device. For example, server 902 receives a control instruction from (e.g., communicated by) a control device. In response to receiving the control instruction, the server can send the first action message to the terminal. As an example, the control device is any terminal such as a smart terminal operable by a user, such as a smart phone, a PC, or a notebook computer. A control interface for the terminal can be provided to the user on the control device. As an example, the control interface can be provided by an application installed on the control device, where the application corresponds to an application for the terminal (e.g., an application to control the terminal). A user of the terminal can input one or more inputs to the control device, and the control instruction can be determined (e.g., generated) based at least in part on the one or more inputs. According to various embodiments, a control instruction for a specific terminal can be sent to the cloud through the control interface (e.g., the control interface provided on the control device). The user can use the control interface provided on a control device to control one or more other terminals. For example, in response to an input to the control interface, the control device sends a control instruction to a server (e.g., the cloud), and in turn, the server sends an instruction to the one or more other terminals that are to be controlled. The instruction to the one or more other terminals can be included in the first action message. The instruction can instruct (e.g., request) the one or more other terminals to perform one or more operations.

The control instruction can include the terminal ID corresponding to the input to the control interface (e.g., the terminal ID associated with the terminals that the user is attempting to control via the control device). The terminal ID can be acquired by the control device via the control interface, or based on the user input to the control interface. The terminal ID of the terminal device can correspond to any information capable of uniquely identifying the terminal. In some embodiments, the terminal ID is a unique Internet of Things ID centrally allocated to all terminal devices (e.g., at least the terminal devices within the system of Internet of Things) by an ID-allocating device. The terminal ID can be permanently set in a chip of the terminal device and/or stored in a secure zone of the storage of the terminal. The terminal ID can be set and written to the terminal when the terminal is to be shipped from, or manufactured at, the factory. The terminal ID is configured and set such that the terminal ID cannot be falsified or illicitly acquired. The server uses the terminal ID in connection with sending the first action message. For example, server 902 deems the terminal ID included in the control instruction as corresponding to a target terminal to which the first action message is to be sent. Accordingly, server 902 sends a first action message to terminal 904 corresponding to the target terminal associated with the control instruction. In some embodiments, the control instruction obtained from the control device includes a type of target terminal, and the server determines the target terminal (e.g., the terminal to which to send the first action message) based at least in part on the type of target terminal and/or the control instruction (e.g., a type of instruction).

In some embodiments, associations with respect to control instructions and action identifiers are pre-established in the cloud. For example, a server can store a mapping of control instructions to actions (or action identifiers). Each control instruction can have at least one corresponding action identifier. In some embodiments, a control instruction has a plurality of corresponding action identifiers. The action identifier can be pre-registered locally in the server and in one or more terminals (e.g., the one or more terminals in a system such as an Internet of Things system). If only action identifiers are registered in the server, and if the first action message includes only an action identifier, then the terminal can register action identifiers and control arguments corresponding to action identifiers. The terminal can store mappings of action identifiers to control conditions, and/or mappings of action identifiers to operations. If action identifiers and control conditions corresponding to action identifiers are registered in the server, then the first action message can also include a control condition corresponding to an action identifier. In some embodiments, if the server stores associations between actions (e.g., action identifiers) and control conditions, the terminal need only register action identifiers. In some embodiments, action identifiers and control conditions corresponding to action identifiers are registered (e.g., stored) in both the server and terminal. If action identifiers and control conditions corresponding to action identifiers are registered (e.g., stored) in both the server and terminal, the first action message can optionally include control conditions (e.g., according to configurations and/or preferences such as those of the system including the server and the terminal). According to various embodiments, the terminal is to obtain control conditions corresponding to the action identifier included in the first action message. An action identifier can include information from which a corresponding action can be determined. For example, the action identifier can include an action ID, an action name, etc.

In response to server 902 receiving the control instruction (e.g., sent by the control device), server 902 can determine the corresponding action (e.g., an action identifier). In some embodiments, server 902 determines the action identifier corresponding to the control instruction based at least in part on a mapping of actions (or action identifiers) to control instructions. In response to determining the action (e.g., the action identifier) corresponding to the control instruction, server 902 generates (e.g., determines) a first action message that includes the action identifier. Server 902 communicates the first action message (e.g., to the terminal 904, which can correspond to a determined target terminal). In some embodiments, in response to determining the action identifier corresponding to the control instruction, server 902 uses locally pre-registered information as a basis to issue the action identifier and a corresponding control condition via the first action message to the terminal 904 (e.g., the smart device).

According to various embodiments, in response to a triggering (e.g., invoking) by terminal 904, server 902 determines (e.g., generates) the first action message. Server 902 can communicate the first action message to terminal 904 in response to server 902 determining the first action message. The triggering of server 902 to determine the first action message can include obtaining an indication that an event occurred (e.g., from terminal 904). For example, terminal 904 can report an event to server 904, and in response to receiving the reporting of the event, server 902 determines the first action message. The determining of the first action message can comprise querying a mapping of events (or event identifiers) to actions (or action identifiers) for an action that corresponds to the event that is reported. As an example, after a "control speech recording" event occurs (e.g., and is reported to server 902), the server device is triggered (e.g., invoked) to recognize speech and the server issues the corresponding control.

According to various embodiments, server 902 receives an indication that an event occurred based at least in part on the event reported by terminal 904. In response to receiving the indication that the event occurred, server 902 can determine and communicate a first action message to terminal 904.

In response to receiving an indication that the event occurred (e.g., from terminal 904), the server can query a mapping of events (or event identifiers) to actions (or action identifiers) in connection with determining an action and/or action identifier corresponding to the event. The mapping of events (or event identifiers) to actions (or action identifiers) can be pre-stored at server 902. Server 902 can use locally pre-registered information as a basis to issue the action identifier and its corresponding control conditions via the first action message to the smart device. For example, server 902 can query a query of actions (or action identifiers) to control conditions (or operations to be performed) in connection with determining the control conditions corresponding to the action and/or action identifier.

In some embodiments, in response to a server obtaining an indication that an event occurred from (e.g., an event being reported by) a first terminal, the server communicates a first action message (e.g., that is based at least in part on the event) to a second terminal. For example, the terminal from which the server receives a reporting of an occurrence of an event is different from the terminal to which the server sends the first action message corresponding to the event.

In connection with the terminal reporting the event to the server (e.g., the cloud), the server queries a mapping associated with the event. The mapping associated with the event can correspond to preset mappings of events (or event identifiers) to actions (or action identifiers). The mappings associated with events can also include mappings of events (or event identifiers) to target terminals, and/or mappings of actions (or action identifiers) to target terminals. Accordingly, an event can be used in connection with determining the corresponding action identifier. In some embodiments, the target terminal ID is based at least in part on the event (or the reporting of the event). The action identifier can be included in a first action message and the first message can be sent to the terminal corresponding to the target terminal ID.

In some embodiments, before the server sends a first action message, the server determines whether the identification information of the target terminal (e.g., included in the control instruction, identification information of the terminal that sent the event, or registered identification information of a target terminal corresponding to the event) corresponds to the first action message is a legitimate terminal ID. The server can determine that a target terminal corresponds to a legitimate ID based at least in part on a registration of terminals (e.g., a terminal can be registered with a server), a table of legitimate (e.g., approved) terminals, a mapping of events to target terminals, etc. If the server determines that the identification information of the target terminal is not a legitimate terminal ID, the server prohibits (e.g., refrains) sending the first action message to the terminal device, and/or the server does not respond to the event. If the server determines that the identification information of the target terminal is a legitimate terminal ID, the server can send the first action message to the corresponding terminal (e.g., the target terminal).

Legitimate terminal IDs can be preset in the server. If terminal IDs are centrally allocated by an ID-allocating device, the server can obtain legitimate device IDs from the ID-allocating device in advance.

According to various embodiments, the first action message comprises one or more of an action identifier, one or more content fields, control conditions, and terminal identification information. The first action message can comprise other information and/or other fields.

At 920, a second action message is obtained. In some embodiments, server 902 receives a second action message sent back by terminal 904. The second action message can include an action identifier and an action status. The action identifier comprised in the second action message can correspond to (e.g., be the same as) the action identifier comprised in the first action message. The action status can correspond to an indication of one or more operations associated with the control conditions comprised in the first action message. For example, the action status can indicate that the one or more operations are completed, in progress, incomplete, in queue, etc.

According to various embodiments, the action identifier in the second action message is the same as the action identifier in the first action message and is used to indicate the relationship between the second action message and the first action message. The action status can indicate action execution status with regard to the first action message at the terminal 904 end.

The action status can comprise an indication of one or more of a first status, a second status, a third status, a fourth status, etc. The first status can correspond to an indication that the first action message has been received. The second status can correspond to an indication that the preparatory work for the action to be executed according to the control conditions corresponding to the action identifier in the first action message has been completed. The third status can correspond to an indication that the action to be executed according to the control conditions corresponding to the action identifier in the first action message has been completed. The fourth status can correspond to an indication that an exception occurred in relation to the action executed according to the control conditions corresponding to the action identifier in the first action message.

An action registration mechanism was discussed above in connection with FIG. 9 above. A detailed description of an action registration mechanism is provided below. The actions can correspond to control information issued by a server. The actions can correspond to the various functions provided by terminals. For example, an action can correspond to an instruction for a terminal to perform one or more operations (e.g., using a function module of the terminal, etc.). An action issued by a server can correspond to one action, or an action can correspond to a series of actions. Action messages can correspond to messages exchanged between a server and a terminal device regarding an action.

To differentiate between different actions, action identifiers can be used to label and differentiate each action. Action identifiers can correspond to specific control conditions. The control conditions can include action types, such as play, pause, etc. Some actions, such as pause, can require only an action type. However, some other actions, such as play and increase volume, can require other further information (e.g., further conditions). As an example, such further information with respect to the play and increase volume actions can include an indication of an object to be played, or magnitude of volume increase. The action identifiers and corresponding control conditions can be defined by the device profile. A format of the device profile can include: "action identifier: control conditions," wherein multiple control conditions may be separated by commas. For example:

action1 name: play, args: "Little Apple"
    action2 name: pause
    wherein the action corresponding to "action1 name" is "play" (e.g., play Little Apple) and the action corresponding to "action2 name" is "pause."

In addition to defining action identifiers and the corresponding control conditions, the device profile can also define event identifiers and the corresponding event conditions. The format of the device profile can be "Event identifier: event conditions." For example:

event1 name: power_low args:10%
    indicates a charge-less-than-10% event.

A developer (e.g., of an application, a smart terminal, etc.) can define a device profile. For example, the device profile can be developed (e.g., configured) for intelligent hardware (e.g., a terminal). A development device can be used to send the device profile to a server and/or the terminal, as shown in FIG. 6. In this manner, the terminal device developer can implement remote action and event configuration. With regard to device profiles, refer to the relevant descriptions in the event mechanisms.

The process for server (e.g., the cloud) registration includes analyzing the device profile of a certain type of terminal, and, for that type of terminal, locally registering each action identifier included in the device profile, controlling conditions corresponding to the action identifiers, event identifiers, and event conditions corresponding to the event identifiers. The server can determine actions, events, action conditions, event conditions, or identifiers corresponding to actions or events, etc. based at least in part on the device profile. The server can set a mapping among actions, events, action conditions, event conditions, and/or terminals based at least in part on the device profile. Accordingly, the server can determine (e.g., generate) action messages, provide action messages (e.g., to the terminal), and receive and process event messages.

The process for terminal registration includes the terminal (e.g., the control module of the terminal) analyzing a device profile and locally registering each action identifier contained in the device profile, controlling conditions corresponding to the action identifiers, event identifiers, and event conditions corresponding to the event identifiers. The terminal can determine actions, events, action conditions, event conditions, or identifiers corresponding to actions or events, etc. based at least in part on the device profile. The terminal can set a mapping among actions, events, action conditions, and/or event conditions based at least in part on the device profile. Thus, the terminal can receive, process, and send action messages and send and process event messages.

According to various embodiments, registration at the terminal end differs from registration at the server end because registration at the terminal end can include registration with respect to one or more function modules in addition to registration of actions and/or events. A "function module" can refer to a part of a terminal that is configured to perform a function (e.g., the function module has a specific function). Examples of function modules include power modules, control modules, and detection modules, etc. A developer can use a development device to send a function module registration file to the terminal (e.g., the control module of the terminal) or the developer sets the function module registration in advance (e.g., during development of the terminal). The terminal (e.g., the control module of the terminal) can perform function module registration based at least in part on the function module registration file. The function module registration file can include initialization process information for one or more function modules (e.g., each function module of the terminal, or each function module for which registration information is included in the function module registration file). Accordingly, the terminal can run the initialization process for the function modules (e.g., each function module) at system startup. The terminal can automatically run the initialization process for the function modules at startup. In some embodiments, the function module registration files include action identifiers corresponding to actions supported by various function modules. If the function module registration files include action identifiers corresponding to actions supported by various function modules, in response to receiving the first action message (e.g., a first action instruction), the terminal (e.g., the control module of the terminal) can use the action identifiers in the file as a basis to determine the function module for executing the action corresponding to the first action message, and the terminal can provide control conditions corresponding to the action identifier to the appropriate function module for execution of the action.

According to various embodiments, developers can use the registration mechanism described above to facilitate simple upgrading of the terminal. For example, if a new action identifier is developed (e.g., defined), the device profile including the new action identifier and the corresponding control conditions are sent to the server and to the terminal. The server and the terminal can easily implement new action upgrades through the aforesaid registration mechanism. For example, the server and/or the terminal updates the applicable mappings among events (or event identifiers), actions (or action identifiers), terminals, etc. In some embodiments, all of the action identifiers included in a device profile are correspondingly registered by the server and/or terminal, as applicable. In some embodiments, only the previously unregistered action identifiers are correspondingly registered by the server and/or terminal, as applicable, and action identifiers that are already locally registered are skipped. In some embodiments, only the updated action identifiers (e.g., action identifiers that have been updated in relation to an existing registered action identifier, such as a newer version of an existing registered action identifier) are correspondingly registered by the server and/or terminal, as applicable, and action identifiers that are not updated and/or new action identifiers are skipped.

Figure 10:
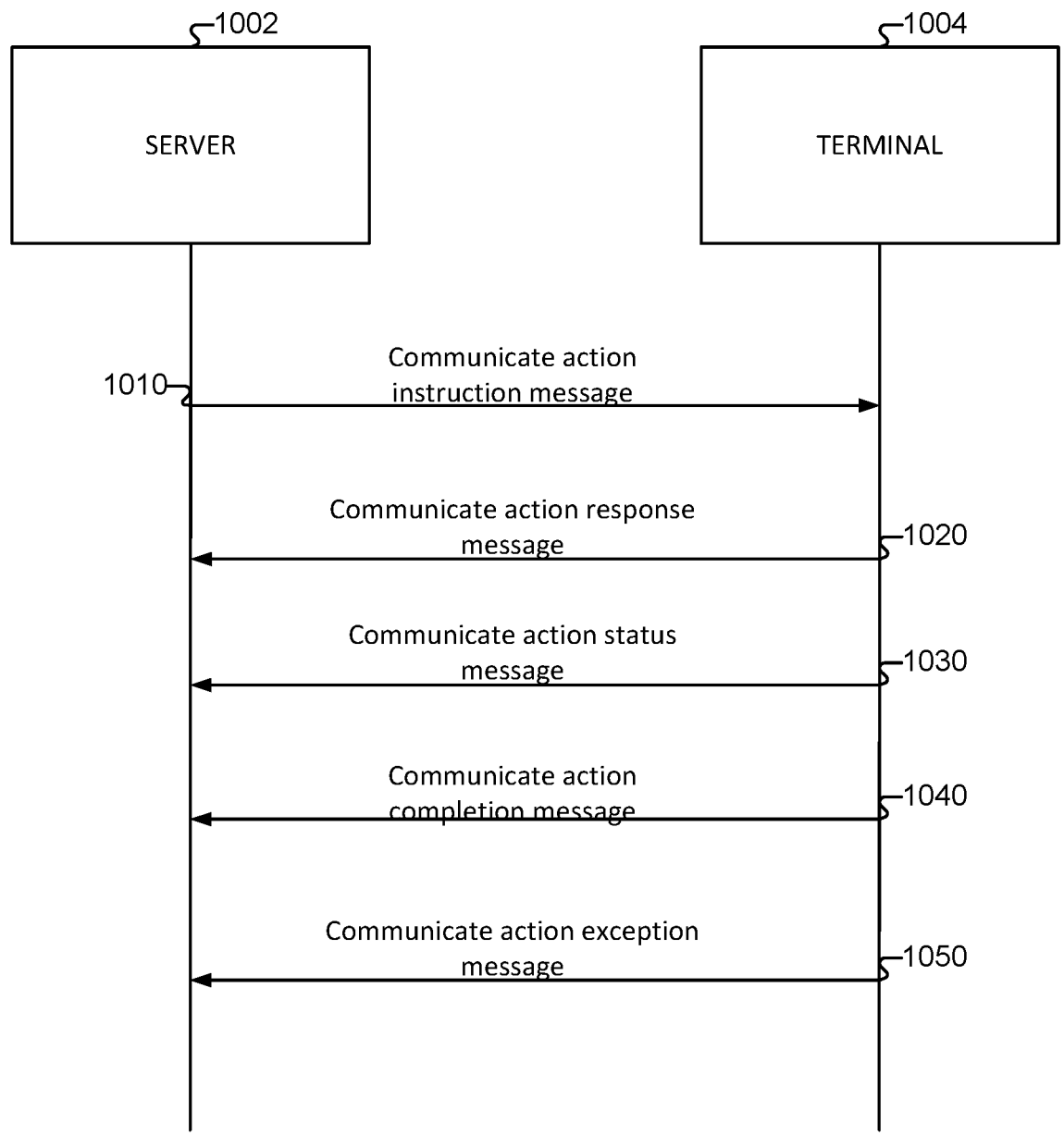
FIG. 10 is a flowchart of a method for action message exchanges according to various embodiments of the present application.

FIG. 10 is a flowchart of a method for action message exchanges according to various embodiments of the present application.

Referring to FIG. 10, method 1000 is provided. Method 1000 can be implemented in connection with method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1100 of FIG. 11, method 1200 of FIG. 12, method 1300 of FIG. 13, and/or method 1400 of FIG. 14. Method 1000 can be implemented at least in part by system 100 of FIG. 1, computer system 1500 of FIG. 15, system 1600 of FIG. 16A, and/or system 1650 of FIG. 16B.

At 1010, an action instruction message is communicated. In some embodiments, server 1002 communicates the action instruction message. For example, server 1002 sends the action instruction message to terminal 1004 (e.g., via one or more networks). The action instruction message can comprise an action identifier and/or control conditions. In some embodiments, server 1002 communicates the action instruction message in response to an event (e.g., in response to obtaining an indication that an event occurred). The action instruction message can be identified by the action identifier. In some embodiments, the action instruction message includes information that is indicative of one or more operations that are to be performed (e.g., by terminal 1004).

At 1020, an action response message is communicated. In some embodiments, terminal 1004 sends the action response message to server 1002. Terminal 1004 can send the action response message to server 1002 in response to obtaining the action instruction message (e.g., from server 1002). As an example, the action response message is associated with the action instruction message. The action response message can indicate that the action instruction message was received. In some embodiments, the action response message comprises status information. For example, the action response message comprises information pertaining to the first status. The information pertaining to the first status can be represented by an "Action_received."

According to various embodiments, the action response message comprises an action identifier. The action identifier comprised in the action response message can be the same as an action identifier included in the action instruction message. The action response message can be uniquely identified by the action identifier and/or first status information. The first status information can be indicative of whether the action instruction message (e.g., the first action message) was received. The first status information can be a bit or flag that is set according to whether the action instruction message was received.

At 1030, an action status message is communicated. In some embodiments, terminal 1004 sends the action status message to server 1002. Terminal 1004 can send the action status message to server 1002 in response to configuring the action (e.g., the one or more corresponding operations) to be performed. As an example, the action status message is associated with the action instruction message. As an example, after completing the preparatory work of the action to be executed according to the control conditions included in the action instruction message, terminal 1004 sends the action status message (e.g., a second action message). The action status message can be associated with the action instruction message. In some embodiments, the action status message comprises status information. As an example, the action status message comprises information pertaining to the second status. The information pertaining to the second status can be represented as "Action_doing." In some embodiments, the action status message includes the action identifier and the information pertaining to the second status.

According to various embodiments, the action status message comprises an action identifier. The action identifier comprised in the action response message can be the same as an action identifier included in the action instruction message. The action status message (e.g., the second action message) can be uniquely identified by the action identifier and/or second status information. The second status information can be indicative of whether the preparatory work of the action to be executed according to the control conditions (e.g., in the first action message) has been completed. The second status information can be a bit or flag that is set according to whether the action instruction message was received.

At 1040, an action completion message is communicated. In some embodiments, terminal 1004 sends the action completion message to server 1002. Terminal 1004 can send the action completion message to server 1002 in response to completing the action (e.g., completing the corresponding one or more operations that were to be executed by terminal 1004). As an example, the action completion message is associated with the action instruction message. For example, after completing the action to be executed according to the control conditions, terminal 1004 sends the action completion message (e.g., a second action message) to server 1002. The action completion message can indicate that the action has been completed. In some embodiments, the action completion message comprises status information. For example, the action response message comprises information pertaining to the third status. The information pertaining to the third status can be represented as an "Action_done."

According to various embodiments, the action completion message comprises an action identifier. The action identifier comprised in the action completion message can be the same as an action identifier included in the action instruction message. The action completion message can be uniquely identified by the action identifier and/or third status information. The third status information can be indicative of whether the action to be executed according to the control conditions (e.g., included in the first action message) has been completed. The third status information can be a bit or flag that is set according to whether the action instruction message was received.

At 1050, an action exception message is communicated. In some embodiments, terminal 1004 sends the action exception message to server 1002. Terminal 1004 can send the action exception message to server 1002 in response to configuring the action (e.g., the one or more corresponding operations) to be performed. As an example, the action status message is associated with the action instruction message. As an example, in response to determining that an exception occurred in relation to the action to be executed according to the control conditions, terminal 1004 sends the action exception message (e.g., a second action message) to server 1002. The action exception message can be associated with the action instruction message. In some embodiments, the action exception message comprises status information. As an example, the action exception message comprises information pertaining to the third status. The information pertaining to the fourth status can be represented as an "Action_exception." In some embodiments, the action exception message includes the action identifier and the information pertaining to the fourth status.

According to various embodiments, the action exception message comprises an action identifier. The action identifier comprised in the action exception message can be the same as an action identifier included in the action instruction message. The action exception message (e.g., the second action message) can be uniquely identified by the action identifier and/or fourth status information. The second status information can be indicative of whether an exception occurred in relation to the action to be executed according to the control conditions in the action instruction message (e.g., the first action message). An exception can correspond to an indication that a device (e.g., the terminal), or a component of the device, is not functioning properly (e.g., according to a normal operation, etc.). The exception can also be referred to (or considered as) abnormal information (e.g., information pertaining to an abnormal operation of the device).

According to various embodiments, 1050 does not necessarily occur after 1040. Rather 1050 can be performed at any time after step 1010. For example, as long as an exception occurs, 1050 can be performed.

According to various embodiments, the server resends the action (e.g., the action instruction message) if the server fails to receive a corresponding action response message (e.g., the Action_received indication) within a set period of time after the action instruction message is communicated. In some embodiments, the server resends the action (e.g., the action instruction message) if the server fails to receive a corresponding action status message (e.g., the Action_doing indication) within a set period of time after the action response message (e.g., the Action_received indication) is received and/or within a set period of time after the action instruction message is communicated. In some embodiments, the server resends the action (e.g., the action instruction message) if the server fails to receive a corresponding action completion message (e.g., the Action_done indication) within a set period of time after the action status message (e.g., the Action_doing indication) is received and/or within a set period of time after the action instruction message is communicated. In some embodiments, the server resends the action (e.g., the action instruction message) if the server receives an action exception message (e.g., the Action_exception indication). According to various embodiments, the server resends the action (e.g., the action instruction message) up to a threshold number of times. For example, a resend upper limit is set for the action. The action will not be resent after the number of resends of the action reaches the upper limit.

In addition, the various action statuses received by the server can be sent back to the control device that sent the control instruction. Various implementations of the server communicating with the control device are described below. However, various other implementations are possible in accordance with various embodiments.

Application Scenario 1:

A user mobile phone sends a control instruction via the cloud to a smart speaker to play the "Little Apple" audio. Mappings of action identifiers to control instructions were stored in advance in a cloud device (e.g., a server). After the cloud device receives, from the user mobile phone, the control instruction to play the "Little Apple" audio, the cloud device determines the action identifier corresponding to the instruction based at least in part on the mappings of action identifiers to control instructions. For example, the action identifier is:

action1 name: play, args: "Little Apple"

wherein "action1 name" is the action identifier and "play" and "args: 'Little Apple'" are the control conditions.

The cloud device can also determine the target terminal (e.g., smart speaker) based on the ID2 (e.g., an Internet of Things ID which is centrally allocated by an identifier allocating device and which uniquely identifies the smart device) included in the control instruction, and the cloud device sends an action instruction message (e.g., the first action message) to the smart speaker. The first action message can include the action identifier and control conditions.

In response to receiving the action instruction message (e.g., the first action message), the smart speaker sends an action response message (e.g., a second action message including an action_received indication) as the status back to the cloud device. The action response message can include an action identifier (e.g., that is the same as the action identifier in the corresponding action instruction message) and an indication of a current action status. For example, the action response message can include the following fields: action1 name and current action status (e.g., action_received). The action identifier and the indication of the current action status (e.g., the two fields) can uniquely identify the message currently returned by the smart speaker.

If the cloud device fails to receive back from the smart speaker the action response message (e.g., the second action message including action_received as the status) within a set period of time, the cloud device can resend the first action message.

In response to the smart speaker sending the action response message (e.g., the second action message including action_received as the status) back to the cloud device, the smart speaker begins the preparatory work for the action to be executed according to the control conditions in the action instruction message (e.g., the first action message). In response to completing the preparatory work for the action to be executed, the smart speaker sends an action status message (e.g., a second action message including an action_doing indication) as the status back to the cloud. The action status message can include an action identifier (e.g., that is the same as the action identifier in the corresponding action instruction message) and an indication of a current action status. For example, the action status message can include the following fields: action1 name and current action status (e.g., action_doing). The action identifier and the indication of the current action status (e.g., the two fields) can uniquely identify the message currently returned by the smart speaker.

In response to executing the action of playing the "Little Apple" audio, the smart speaker sends an action completion message (e.g., a second action message including an action_done indication) as the status back to the cloud device. The action completion message can include an action identifier (e.g., that is the same as the action identifier in the corresponding action instruction message) and an indication of a current action status. For example, the action response message can include the following fields: action1 name and current action status (e.g., action_done). The action identifier and the indication of the current action status (e.g., the two fields) can uniquely identify the instruction currently returned by the smart speaker.

If an exception occurs during the action execution process, the smart speaker can send an action exception message (e.g., a second action message including an action_exception indication) as the status back to the cloud. The action exception message can include an action identifier (e.g., that is the same as the action identifier in the corresponding action instruction message) and an indication of a current action status. For example, the action exception message can include the following fields: action1 name and current action status (e.g., action_exception). The action identifier and the indication of the current action status (e.g., the two fields) can uniquely identify the message currently returned by the smart speaker. In addition, the second action message including action_exception as the status can include a parameter field indicating the specific type of exception.

The cloud device can determine the smart speaker's action execution status based at least in part on the action status (e.g., included in the corresponding second action message) sent back by the smart speaker. Accordingly, the cloud device can monitor each status of the control issued by the cloud device and executed on the intelligent hardware device (e.g., the smart speaker). The monitoring of the status of an action to be performed at a smart terminal can improve the integrity and traceability of action execution. In addition, the cloud device can send the action status returned by the smart speaker back to the smart phone that sent the control instruction (e.g., the control device) so that the user can promptly learn the execution status of the action.

Application Scenario 2:

This application scenario is a smart device-cloud device event mechanism.

A developer registers relevant events of the speech control module in a smart speaker. For example, the device profile pertaining to events for a speech control module in a smart speaker is pre-registered in a control module (control center) of intelligent hardware. In addition, the events of the speech control module in a smart speaker are pre-registered on a cloud device. One of the registered events includes "control speech recording." In response to "control speech recording" event for a smart speaker being triggered (e.g., invoked based on an input from a user), the smart speaker sends an indication of the occurrence of the event to the cloud device. In some embodiments, the cloud does not provide any confirmation regarding the event (e.g., confirmation of the occurrence of the event or the reporting thereof). The cloud device can perform subsequent processing based on the event. For example, the cloud device can process information pertaining to the event (e.g., comprised in the message from the smart speaker reporting occurrence of the event) in connection with the recognizing of the control speech. The cloud device can determine an action identifier and control conditions corresponding to the control speech, generate a first action message based at least in part on the action identifier and the control conditions corresponding to the control speech, and communicate the first message to the smart speaker.

Application Scenario 3:

In response to a smart door and/or window detecting an opening event (e.g., a door opening event, a window opening event, etc.), the event is reported to a cloud device. In response to obtaining an indication that the event occurred (e.g., in response to receiving the report of the event), the cloud device determines the action identifier, control conditions, and the target terminal corresponding to the event. As an example, the determined action identifier is "Action2 name," the control condition is "light," and the target terminal is a smart lamp. The cloud device communicates a first action message to the smart lamp. The first action message includes "Action2 name" (e.g., in a field for the action identifier) and a corresponding control condition (e.g., in a field for the control condition(s)) to the smart lamp. In response to the smart lamp receiving the first action message, the smart lamp performs one or more operations corresponding to the control conditions. For example, the smart lamp illuminates (e.g., turns on a lamp) based on the information comprised in the first action message (e.g., the "Action2 name" and the corresponding control condition). The smart lamp communicates a second action message with information pertaining to a status (e.g., of the event) to the cloud device.

The terminal can comprise and/or be connected to one or more sensors. For example, the terminal has data collecting functions (e.g., the one or more sensors can collect information such as information pertaining to events, and/or the one or more sensors can detect events). For example, the terminal collects multimedia data such as sounds and images, environmental data such as temperature and humidity, and motion data such as acceleration and speed. Various other types of information can be obtained by the terminal (e.g., by the sensors of the terminal). The terminal communicates sensor-collected data via a channel to the server. As an example, the sensor data obtained by the sensors is passed through the terminal to a server (e.g., the cloud). The sensors can be referred to as cloud sensors (e.g., if the sensor-collected data is communicated to the server by the sensors or by a terminal connected to the sensors). According to various embodiments, the sensors have various interfaces. For example, the sensors include a hardware interface that is configured to connect to a device chip (e.g., a chip of the terminal). As another example, the sensors include a driver interface that is configured to connect to various software elements of the terminal.

According to various embodiments, a sensor of the terminal is a pluggable sensor. In order for a sensor to correspond to a pluggable sensor, the sensor hardware interfaces and driver interfaces are to be standardized. A driver for the pluggable sensor is configured to be capable of dynamic loading from a server. A description of dynamic loading of a driver is provided below.

In response to a new sensor being activated or a newly connected sensor being detected, a drive request including a terminal ID is sent to a server. The server provides the terminal with sensor information based at least in part on the terminal ID or the server. For example, the server information can serve as a basis to download the corresponding driver from the server.

In response to receiving the drive request, the server determines sensor information based at least in part on the terminal ID. The sensor information can be pre-registered at the server. The server communicates the sensor information to the terminal.

In response to the terminal detecting a newly connected sensor or the sensor being activated, the terminal communicates a driver request to the server. The terminal obtains the sensor information communicated by the server. The sensor information communicated by the server can serve as a basis for the terminal to download the corresponding driver (e.g., to download the corresponding driver from the server or from another address).

In response to receiving a drive request (e.g., from the terminal), the server determines the sensor information (e.g., information corresponding to the sensor connected to the terminal), and communicates the sensor information to the terminal.

According to various embodiments, dynamic loading of the driver (e.g., the sensor driver) includes pre-registration of sensor information (e.g., corresponding to the terminal) with the server, and detection (e.g., detects newly connected sensor information of the terminal).

FIG. 11 is a flowchart of a method for dynamic loading of a type of driver according to various embodiments of the present application Referring to FIG. 11, method 1100 is provided. Method 1100 can be implemented in connection with method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1200 of FIG. 12, method 1300 of FIG. 13, and/or method 1400 of FIG. 14. Method 1100 can be implemented at least in part by system 100 of FIG. 1, computer system 1500 of FIG. 15, system 1600 of FIG. 16A, and/or system 1650 of FIG. 16B.

According to various embodiments, the terminal ID of the terminal is represented by ID2.

At 1110, a sensor is detected. For example, terminal 1102 can detect a sensor for which a driver is not installed or which an installed driver is out of date. Terminal 1102 can detect the sensor in connection with activation of terminal 1102.

At 1120, a driver request is communicated. In some embodiments, terminal 1102 communicates the driver request to server 1104. Terminal 1102 can communicate the driver request in response to a corresponding sensor being detected and/or in response to terminal 1102 being activated. According to various embodiments, the driver request comprises an indication of the terminal. For example, the driver request comprises the ID2. As an example, terminal 1102 sends the driver request in response to terminal 1102 determining that a driver installed with respect to a sensor is out of date.

Terminal 1102 can send the driver request upon first being activated, and/or in response to terminal 1102 detecting a newly connected sensor (e.g., newly connected to a sensor when a sensor is replaced or a new sensor is added to terminal 1102). As an example, terminal 1102 can have an automatic detection function to detect a newly connected sensor.

At 1130, sensor information is communicated. In some embodiments, server 1104 communicates sensor information to terminal 1102. The sensor information communicated to terminal 1102 can correspond to one or more sensors for which the driver request was sent to server 1104. In response to server 1104 receiving the driver request, server 1104 can determine and/or obtain the corresponding sensor information. For example, the ID2 comprised in the driver request can be used in connection with determining the corresponding sensor information. For example, a mapping of sensor information to ID2s (or to terminals) is queried to determine the sensor information corresponding to the ID2. The mapping of sensor information to ID2s (or to terminals) can be stored locally at server 1104 or remotely. In response to determining the sensor information corresponding to the ID2, server 1104 sends the sensor information to terminal 1102.

The ID2 can be associated with the sensor information pertaining to the sensor during development (e.g., manufacture or registration) of the terminal. According to various embodiments, a device chip in terminal 1102 pre-registers information (e.g., model information, manufacturer, etc.) pertaining to the sensors used by, or connected to, terminal 1102. The information pertaining to the sensors is pre-registered with server 1104 and the ID2 is stored in association with the sensor information. For example, a mapping of sensors to ID2s (or to terminals) is stored or updated with the registration information obtained from terminal 1102. In response to obtaining a driver request (e.g., including an ID2), server 1104 can determine the sensor information associated with the ID2 corresponding to the driver request. The sensor information can comprise the sensor model number. In some embodiments, the sensor information includes an address at which a driver for the sensor can be obtained. The address can be a URL, a network address, a storage location, etc.

At 1140, a driver is obtained. In some embodiments, terminal 1102 obtains a driver corresponding to a sensor thereof (e.g., the sensor that is detected, a sensor for which the installed driver is out of date, etc.). In response to obtaining the sensor information, the sensor information can be used in connection with terminal 1102 obtaining the driver. For example, terminal 1102 uses sensor information as a basis to download the corresponding driver (e.g., from the server or another location at which the driver is stored).

FIG. 12 is a flowchart of a method for dynamic loading of a type of driver according to various embodiments of the present application.

Referring to FIG. 12, method 1200 is provided. Method 1200 can be implemented in connection with method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1300 of FIG. 13, and/or method 1400 of FIG. 14. Method 1200 can be implemented at least in part by system 100 of FIG. 1, computer system 1500 of FIG. 15, system 1600 of FIG. 16A, and/or system 1650 of FIG. 16B.

At 1210, a sensor is detected. For example, terminal 1202 can detect a sensor for which a driver is not installed or which an installed driver is out of date. Terminal 1202 can detect the sensor in connection with activation of terminal 1202.

At 1220, a driver request is communicated. In some embodiments, terminal 1202 communicates the driver request to server 1204. Terminal 1202 can communicate the driver request in response to a corresponding sensor being detected and/or in response to terminal 1202 being activated. According to various embodiments, the driver request comprises an indication of the terminal. For example, the driver request comprises the ID2. As an example, terminal 1202 sends the driver request in response to terminal 1202 determining that a driver installed with respect to a sensor is out of date. In some embodiments, the driver request is communicated if terminal 1202 is being activated for the first time.

At 1230, sensor information is detected. In some embodiments, server 1204 detects the sensor information corresponding to the sensor. For example, in response to receiving the driver request, server 1204 communicates with terminal 1202 or the corresponding sensor of terminal 1202 in connection with detecting sensor information. Server 1204 can obtain sensor information such as model information, manufacturer, sensor type, etc. from terminal 1202. In some embodiments, server 1204 obtains information from which sensor information such as model information, manufacturer, sensor type, etc. can be determined. The sensor information communicated to terminal 1202 can correspond to one or more sensors for which the driver request was sent to server 1204. In response to server 1204 receiving the driver request and/or detecting the sensor information, server 1204 can determine and/or obtain the corresponding sensor information. For example, the ID2 comprised in the driver request can be used in connection with determining the corresponding sensor information. For example, a mapping of sensor information to ID2s (or to terminals) is queried to determine the sensor information corresponding to the ID2. The mapping of sensor information to ID2s (or to terminals) can be stored locally at server 1204 or remotely.

At 1240, sensor information is communicated. In some embodiments, server 1204 communicates sensor information to terminal 1202. In response to determining the sensor information corresponding to the ID2, server 1204 sends the sensor information to terminal 1202.

At 1250, a driver is obtained. In some embodiments, terminal 1202 obtains a driver corresponding to a sensor thereof (e.g., the sensor that is detected, a sensor for which the installed driver is out of date, etc.). In response to obtaining the sensor information, the sensor information can be used in connection with terminal 1202 obtaining the driver. For example, terminal 1202 uses sensor information as a basis to download the corresponding driver (e.g., from the server or another location at which the driver is stored).

In some embodiments, server 1204 pushes the driver to terminal 1202. For example, in response to server 1204 determining the corresponding sensor information, server 1204 pushes the driver corresponding to the sensor information (e.g., directly communicates the sensor information) to terminal 1202. In response to obtaining the sensor information, terminal 1202 downloads the corresponding driver and installs the driver (e.g., loads the driver onto the operating system). After the driver is successfully installed, the sensor can operate normally. In some embodiments, in response to terminal 1202 obtaining the sensor information, terminal 1202 communicates a download request based at least in part on the sensor information. As an example, terminal 1202 generates a download request based at least in part on the sensor information, and terminal 1202 communicates the download request to server 1204. In response to obtaining the download request, server 1204 communicates the corresponding driver to terminal 1202. For example, server 1204 determines the driver corresponding to the download request based at least in part on the driver request, and server 1204 sends the corresponding driver to terminal 1202. In response to obtaining the corresponding driver, terminal 1202 downloads the corresponding driver and/or installs the driver (e.g., loads the driver onto the operating system). In some embodiments, server 1204 provides the corresponding driver in response to obtaining the driver request at 1220. For example, server 1204 pushes the driver in response to obtaining the driver request from terminal 1202.

In general, a network can have a very large number of terminal devices. Even a single local area network can have multiple terminal devices. In some embodiments, terminals can operate according to at least two statuses: a node (operating node) and a gateway.

A gateway has the ability to access (e.g., directly via one or more channels) a server. For example, the gateway already has established a channel to a server. A node can connect the channel to the server via the gateway.

Generally, there is a group of terminals that includes at least one gateway, and the remaining terminals are nodes. Groups of terminals can be defined according coverage areas of connected devices or according to local area networks. Groups of terminals can be defined according to various other criteria. The gateway of a group can be designated by a user, by an administrator, by the cloud, or through negotiations among multiple operating nodes within one group.

In some embodiments, a node establishes a channel to a server via at least one gateway. The process of establishing a channel is discussed in further detail below.

FIG. 13 is a flowchart of a method for establishing a node-server channel according to various embodiments of the present application.

Referring to FIG. 13, method 1300 is provided. Method 1300 can be implemented in connection with method 200 of FIG., method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 21100 of FIG. 11, method 1200 of FIG. 12, and/or method 1400 of FIG. 14. Method 1300 can be implemented at least in part by system 100 of FIG. 1, computer system 1500 of FIG. 15, system 1600 of FIG. 16A, and/or system 1650 of FIG. 16B.

According to various embodiments, a node terminal ID corresponds to an ID2.

At 1310, encrypted data is communicated. In some embodiments, node 1302 communicates the encrypted data to gateway 1304 (e.g., via one or more networks or one or more direct connections there between). The encrypted data can correspond to data that is encrypted based at least in part on a private key. In some embodiments, the private key corresponds to an ID2 of node 1302. According to various embodiments, node 1302 encrypts data based at least in part on a private key corresponding to the ID2 of node 1302 to obtain the encrypted data. In response to encrypting the data, node 1302 sends the encrypted data to gateway 1304.

In some embodiments, node 1302 communicates the ID2 of node 1302 in connection with communication of the encrypted data to gateway 1304. For example, node 1302 communicates a message comprising the ID2 of node 1302 and the encrypted data to gateway 1304.

At 1320, the encrypted data is communicated. In some embodiments, gateway 1304 communicates the encrypted data to server 1306. For example, in response to obtaining the encrypted data from node 1302, gateway 1304 forwards the encrypted data to server 1306 (e.g., via one or more communication channels established there between).

At 1330, the encrypted data is decrypted. In some embodiments, the encrypted data is decrypted based at least in part on the public key corresponding to the ID2 communicated in connection with the encrypted data (e.g., the ID2 corresponding to node 1302). Server 1306 can decrypt the encrypted data in response to obtaining the encrypted data (e.g., from gateway 1304).

In some embodiments, server 1306 saves the public key corresponding to the ID2 in advance. Accordingly, server 1306 can use the public key to decrypt the received encrypted data. In response to decrypting the encrypted data, server 1306 can save the decrypted data to a data platform. In this way, a channel between node 1302 and server 1306 is established. Data forwarding on this channel can be by way of gateway 1304. Server 1306 can communicate data to node 1302. Data communicated by server 1306 to node 1302 can be encrypted using the public key corresponding to the ID2 (e.g., of node 1302). Server 1306 can send the encrypted data to node 1302 via gateway 1304. In response to receiving encrypted data from server 1306, node 1302 can decrypt the encrypted data based at least in part on the private key corresponding to the ID2.

Process 1300 can be implemented in connection with connection modes such as Bluetooth, wherein node and gateway processing is performed by terminals.

FIG. 14 is a flowchart of a method for establishing a node-server channel according to various embodiments of the present application.

Referring to FIG. 14, method 1400 is provided. Method 1400 can be implemented in connection with method 200 of FIG., method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 21100 of FIG. 11, method 1200 of FIG. 12, and/or method 1300 of FIG. 13. Method 1400 can be implemented at least in part by system 100 of FIG. 1, computer system 1500 of FIG. 15, system 1600 of FIG. 16A, and/or system 1650 of FIG. 16B.

At 1410, a broadcast frame is communicated. For example, node 1402 sends (or broadcasts) the broadcast frame. The broadcast frame can comprise an ID2 corresponding to the node from which the broadcast frame is communicated (e.g., node 1402).

At 1420, the ID2 is obtained. In some embodiments, gateway 1404 obtains the ID2 from the broadcast frame. For example, in response to receiving the broadcast fame, the gateway obtains (e.g., extracts) the ID2 from the broadcast frame.

According to various embodiments, a plurality of nodes broadcast corresponding broadcast frames. Because many broadcast frames can be contemporaneously broadcast (e.g., by various nodes), a broadcast frame cannot be simply processed (e.g., by gateway 1404). In some embodiments, gateway 1404 is configured to process broadcast frames that have been communicated from one or more nodes in the group to which gateway 1404 belongs. For example, gateway 1404 can receive broadcast frames from nodes outside the group to which gateway 1404 belongs, and gateway 1404 can be configured to not process broadcast frames from outside the group to which gateway 1404 belongs. In other words, in some embodiments, only nodes within the group to which gateway 1404 belongs are permitted to access the network via gateway 1404.

At 1430, the ID2 is communicated. In some embodiments, gateway 1404 communicates the ID2 to server 1408. For example, gateway 1404 sends the ID2 (e.g., corresponding to node 1402) in response to gateway 1404 obtaining the ID2 from the broadcast node (e.g., communicated by node 1402), and gateway 1404 sends the ID2 to server 1408.

At 1440, the ID2 is verified. In some embodiments, server 1408 verifies the ID2 in response to receiving the ID2 from gateway 1404.

In some embodiments, the verification of the ID2 includes server 1408 providing the ID2 to a verification server for verification. The verification of the ID2 can comprise determining whether the ID2 corresponds to an ID2 of a legitimate terminal (e.g., a registered terminal, etc.). If the verification of the ID2 is performed by a verification server, then the verification server can provide an indication of a result of the verification to server 1408.

At 1450, a public key is communicated. In some embodiments, server 1408 communicates the public key to gateway 1404. The public key can correspond to the ID2 (e.g., the ID2 communicated by gateway 1404 to server 1408). In some embodiments, the public key is communicated to the gateway 1404 if the verification of the ID2 is successful. In some embodiments, if the verification of the ID2 is not successful, then the public key is not provided to gateway 1404.

The public key can be stored in association with the ID2. For example, server 1408 can store a mapping of public keys to ID2s. Server 1408 can determine the public key corresponding to the ID2 included in the broadcast frame based at least in part on querying the mapping of public keys to ID2s. In some embodiments, server 1408 obtains the public key corresponding to the ID2 from another server such as a verification server.

At 1460, network access parameters are communicated. In some embodiments, gateway 1404 communicates the network access parameters to node 1402. The network access parameters communicated to node 1402 can be encrypted. For example, the network access parameters communicated to node 1402 can be encrypted based at least in part on the public key (e.g., the public key obtained by the gateway 1404 from server 1408 at 1450). In some embodiments, in response to obtaining the public key, gateway 1404 uses the public key to encrypt network access parameters. Gateway 1404 can send the encrypted network access parameters to node 1402.

Because gateway 1404 is already capable of accessing the network (e.g., gateway 1404 has acquired the network access parameters), the gateway provides this "capability" to node 1402 through encryption at 1460.

At 1470, the network access parameters are decrypted. In some embodiments, node 1402 decrypts the network access parameters. For example, node 1402 uses the public key corresponding to the ID2 in connection with decrypting the network access parameters. In response to receiving the network access parameters from gateway 1404, node 1402 can obtain the public key corresponding to the ID2 and use the public key to decrypt the network access parameters.

At 1480, a network is accessed. In some embodiments, the network is accessed based at least in part on the network access parameters. For example, node 1402 accesses the network using the decrypted network access parameters. Node 1402 can access the network via network access device 1406 (e.g., a network access point).

Various embodiments can be applied to network connection modes such as WiFi. In the context of WiFi, the aforesaid broadcast frame can be a WiFi beacon frame, and the network access parameters can include: a service set ID (SSID) and a password. Accordingly, at 1480, node 1402 can access network access point (AP) 1406 which is already connected to gateway 1404 by using the SSID and password. In some embodiments, a channel between node 1402 and server 1408 can be established in connection with (e.g., using) process 300 of FIG. 3.

In some embodiments, if a user in a local area network at home uses a mobile phone to access an AP and to establish a channel to a cloud device, then the mobile phone can serve as the gateway and a smart speaker in the local area network can serve as a node. The smart speaker broadcasts WiFi beacon frames carrying an ID2 (e.g., the ID2 corresponding to the smart speaker). The gateway provides the ID2 to the cloud device for verification. The public key corresponding to the ID2 is returned to the mobile phone following successful verification. After using the public key to encrypt the SSID and password for accessing the AP, the mobile phone sends the SSID and password back to the smart speaker. After decrypting the SSID and password with the private key corresponding to the ID2, the smart speaker obtains the SSID and password, and the smart speaker uses the obtained SSID and password to access the AP. With such an approach, the smart speaker does not need to be manually configured with the SSID and password. In addition, the smart speaker can seamlessly (e.g., automatically without manual input) access the AP through the mobile phone already connected to the AP.

As was mentioned above in regard to the action mechanism, the server stores mappings that can be used in connection with data transfers between terminal devices or event-based control over devices. In some embodiments, the mappings are to be cached in the gateway. Accordingly, if the mappings are stored at the server, in response to receiving the event message reported by the node, the gateway can forward the event message to the server. If the mappings are stored at the gateway, then the gateway sends a first message to the node or to another node, and the gateway can use the cached mappings in connection with determining a target terminal (e.g., a target node) and information (e.g., instructions for performing one or more operations) to be sent to the target terminal.

The mappings cached by the gateway can be pre-issued to the gateway by the server or by a development device. In some embodiments, a user or administrator configures the gateway with the cached mappings.

Figure 15:
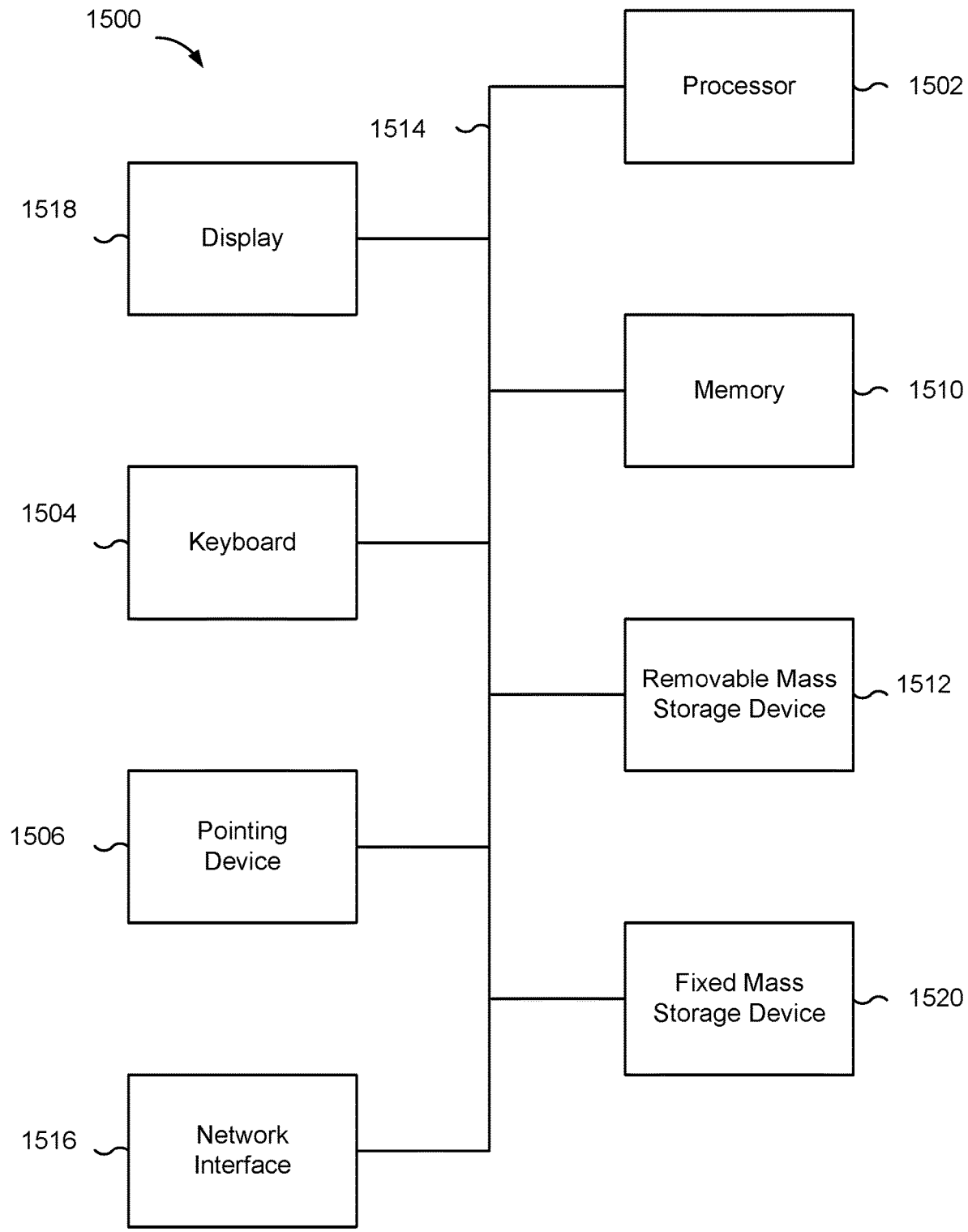
FIG. 15 is a functional diagram of a computer system for data transmission according to various embodiments of the present application.

FIG. 15 is a functional diagram of a computer system for data transmission according to various embodiments of the present application.

Referring to FIG. 15, computer system 1500 is provided. Computer system 1500 can be implemented in connection with method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. Computer system 1500 can be implemented in connection with system 100 of FIG. 1, system 1600 of FIG. 16A, and/or system 1650 of FIG. 16B.

Computer system 1500, which includes various subsystems as described below, includes at least one microprocessor subsystem (also referred to as a processor or a central processing unit (CPU)) 1502. For example, processor 1502 can be implemented by a single-chip processor or by multiple processors. In some embodiments, processor 1502 is a general purpose digital processor that controls the operation of the computer system 1500. Using instructions retrieved from memory 1510, the processor 1502 controls the reception and manipulation of input data, and the output and display of data on output devices (e.g., display 1518).

Processor 1502 is coupled bi-directionally with memory 1510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1502. Also as is well known in the art, primary storage typically includes basic operating instructions, program code, data, and objects used by the processor 1502 to perform its functions (e.g., programmed instructions). For example, memory 1510 can include any suitable computer-readable storage media, described below, depending on whether, for example, data access needs to be bi-directional or uni-directional. For example, processor 1502 can also directly and very rapidly retrieve and store frequently needed data in a cache memory (not shown). The memory can be a non-transitory computer-readable storage medium.

A removable mass storage device 1512 provides additional data storage capacity for the computer system 1500, and is coupled either bi-directionally (read/write) or uni-directionally (read only) to processor 1502. For example, storage 1512 can also include computer-readable media such as magnetic tape, flash memory, PC-CARDS, portable mass storage devices, holographic storage devices, and other storage devices. A fixed mass storage 1520 can also, for example, provide additional data storage capacity. The most common example of mass storage 1520 is a hard disk drive. Mass storage device 1512 and fixed mass storage 1520 generally store additional programming instructions, data, and the like that typically are not in active use by the processor 1502. It will be appreciated that the information retained within mass storage device 1512 and fixed mass storage 1520 can be incorporated, if needed, in standard fashion as part of memory 1510 (e.g., RAM) as virtual memory.

In addition to providing processor 1502 access to storage subsystems, bus 1514 can also be used to provide access to other subsystems and devices. As shown, these can include a display monitor 1518, a network interface 1516, a keyboard 1504, and a pointing device 1506, as well as an auxiliary input/output device interface, a sound card, speakers, and other subsystems as needed. For example, the pointing device 1506 can be a mouse, stylus, track ball, or tablet, and is useful for interacting with a graphical user interface.

The network interface 1516 allows processor 1502 to be coupled to another computer, computer network, or telecommunications network using a network connection as shown. For example, through the network interface 1516, the processor 1502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1502 can be used to connect the computer system 1500 to an external network and transfer data according to standard protocols. For example, various process embodiments disclosed herein can be executed on processor 1502, or can be performed across a network such as the Internet, intranet networks, or local area networks, in conjunction with a remote processor that shares a portion of the processing. Additional mass storage devices (not shown) can also be connected to processor 1502 through network interface 1516.

An auxiliary I/O device interface (not shown) can be used in conjunction with computer system 1500. The auxiliary I/O device interface can include general and customized interfaces that allow the processor 1502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 15 is but an example of a computer system suitable for use with the various embodiments disclosed herein. Other computer systems suitable for such use can include additional or fewer subsystems. In addition, bus 1514 is illustrative of any interconnection scheme serving to link the subsystems. Other computer architectures having different configurations of subsystems can also be utilized.

The systems, means, modules, or units illustrated by the above embodiments specifically may be implemented by computer chips or entities or by products having certain functions. A typical implementing device is a computer. The particular form a computer may take may be a personal computer, laptop computer, cellular phone, camera phone, smart phone, personal digital assistant, media player, navigation device, email receiving device, game console, tablet computer, wearable device, or a combination of any of these devices.

In a typical configuration, a computer comprises one or more processors (CPUs), input/output ports, network interfaces, and memory.

Memory may include the following forms in computer-readable media: volatile memory, random access memory (RAM), and/or non-volatile memory, e.g., read-only memory (ROM) or flash RAM. Memory is an example of a computer-readable medium.

Computer-readable media, including permanent and non-permanent and removable and non-removable media, may achieve information storage by any method or technology. The information may be computer-readable instructions, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk-read only memory (CD-ROM), digital versatile disk (DVD) or other optical storage, cassette tapes, magnetic tape and disk storage or other magnetic storage devices, or any other non-transmitting media that may be used to store computer-accessible information. In accordance with the definitions in this document, computer-readable media do not include transitory computer-readable media (transitory media) such as modulated data signals and carrier waves.

A terminal can be implemented by a computer system such as computer system 1500, and the terminal can include a device chip. The terminal ID assigned such as via process 200 of FIG. 2 can be written to the secure storage of the device chip. The device chip can be one or more processors. The terminal ID can uniquely identify the terminal and can be used in connection with verifying the legitimacy of the terminal. The private key corresponding to the terminal ID can be written into the secure storage of the device chip. The device chip may include a hardware portion and a software portion.

The terminal can include a communication unit. The communication unit can be part of, or implement the network interface. The communication unit can be, for example, a radio-frequency (RF) unit. The terminal (e.g., computer system 1500) can include one or more sensors. The one or more sensors can include hardware portions. The terminal can have software installed thereon and implement one or more functions, operations, and/or routines. The software of the terminal can include an operating system and one or more programs that run on a processor. The one or more programs can be stored in the memory and are executed by the processor to implement the operations such as operations described in connection with the various embodiments described herein. In some embodiments, the terminal has installed hereon (and runs) an Internet of Things operating system. The terminal can also have a system hardware adaptation layer (HAL), a sensor device, a radio-frequency (RF) unit, a microcontroller unit (MCU), and an AP. ID2, which is the terminal ID for the Internet device, can be stored on a trusted platform module.

In addition, servers can be a single server or a plurality of servers (e.g., a plurality of servers interconnected and/or operating in connection with each other). The servers can be consolidated into a server (cloud) data and services platform. The data and services platform can implement the establishing of channels to terminals, data interaction, service provision, and data transfers between terminals. One or more functions of the terminals can be defined by the device profile and can be exposed (e.g., opened) to the data and services platform. In some embodiments, control over a terminal and data transfers between terminals can be implemented using the data and services platform.

Figure 16A:
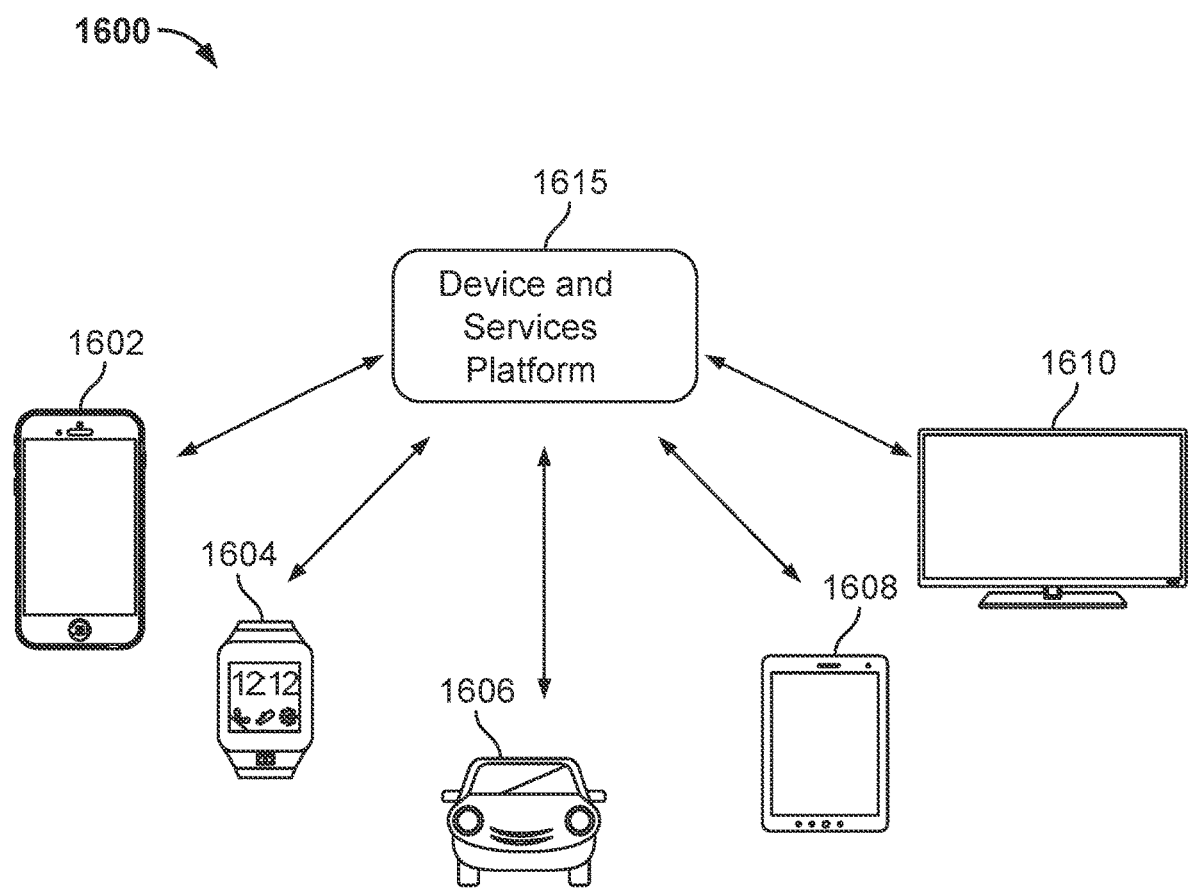
FIG. 16A is a diagram of a system provided by various embodiments of the present application.

According to various embodiments, a cloud data and services platform can control various at least some functionality of terminals in the Internet of Things and transfer data between Internet of Things terminals, as illustrated in system 1600 of FIG. 16A. A developer or user can customize business logic on a cloud data and services platform according to need or user operating habits. In some embodiments, the cloud data and services platform can implement a self-learning mechanism and obtain business logic from self-learning based on user operating habits (e.g., historical information of the user, or user preferences, etc.).

FIG. 16A is a diagram of a system provided by various embodiments of the present application.

Referring to FIG. 16A, system 1600 is provided. System 1600 can be implemented in connection with method 200 of FIG., method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. 2 System 1600 can be implemented in connection with system 100 of FIG. 1, computer system 1500 of FIG. 15, and/or system 1650 of FIG. 16B.

System 1600 can correspond to an Internet of Things system. According to various embodiments, system 1600 comprises a plurality of terminals. For example, system 1600 comprises mobile phone 1602, smart watch 1604, smart car 1606, tablet 1608, smart TV 1610, etc. The plurality of terminals (e.g., mobile phone 1602, smart watch 1604, smart car 1606, tablet 1608, smart TV 1610, etc.) can communicate with device and services platform 1615. In some embodiments, device and services platform 1615 is implemented by one or more servers. For example, the device and services platform 1615 can be a software as a service, or other cloud-based implementation. As used herein, a cloud device can refer to device and services platform 1615.

Figure 16B:
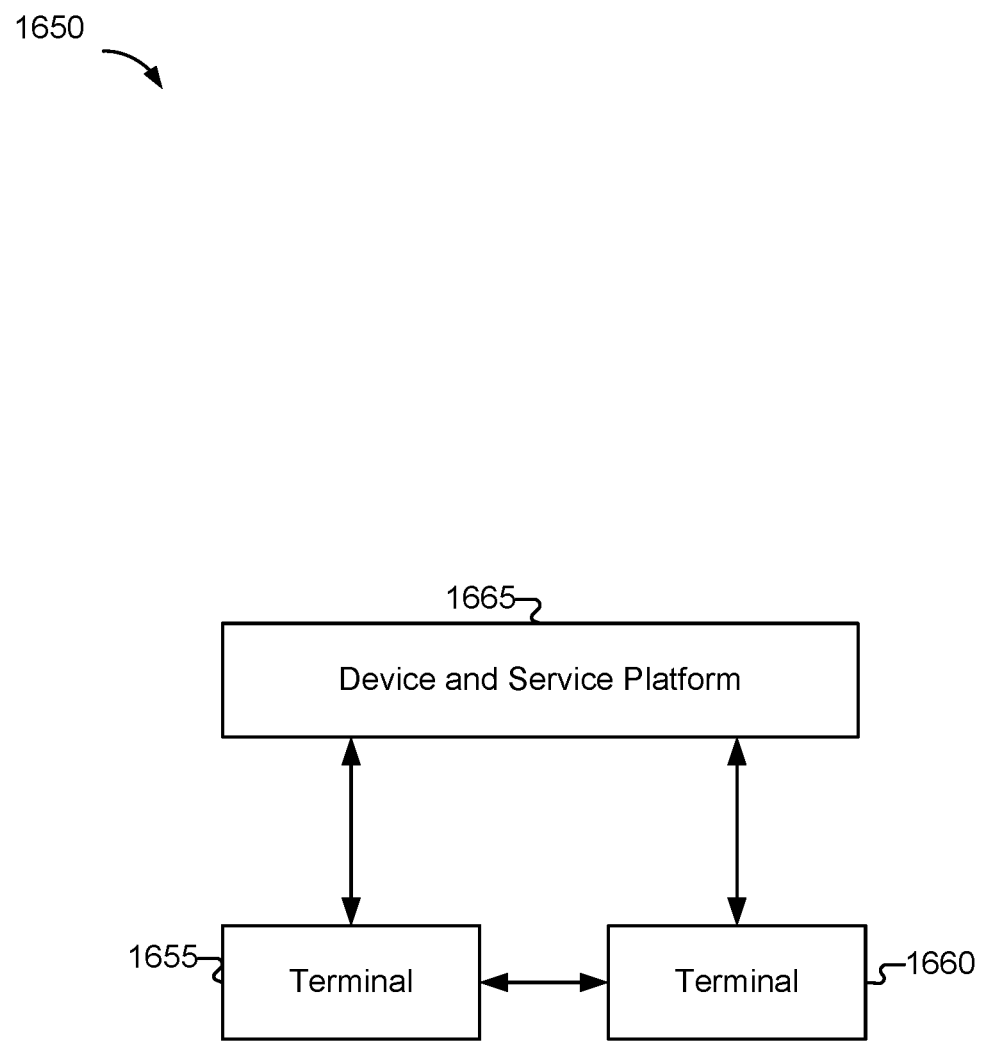
FIG. 16B is a diagram of a system provided by various embodiments of the present application.

FIG. 16B is a diagram of a system provided by various embodiments of the present application.

Referring to FIG. 16B, system 1650 is provided. System 1650 can be implemented in connection with method 200 of FIG. 2, method 300 of FIG. 3, method 400 of FIG. 4, method 500 of FIG. 5, device profile 600 of FIG. 6, device profile 700 of FIG. 7, method 800 of FIG. 8, method 900 of FIG. 9, method 1000 of FIG. 10, method 1100 of FIG. 11, method 1200 of FIG. 12, method 1300 of FIG. 13, and/or method 1400 of FIG. 14. System 1650 can be implemented in connection with system 100 of FIG. 1, computer system 1500 of FIG. 15, and/or system 1600 of FIG. 16A.

System 1650 can correspond to an Internet of Things system. According to various embodiments, system 1650 comprises a plurality of terminals. For example, system 1650 comprises terminal 1655 and terminal 1660. The plurality of terminals can communicate with each other and/or with device and services platform 1665. In some embodiments, device and services platform 1665 is implemented by one or more servers. For example, the device and services platform 1665 can be a software as a service, or other cloud-based implementation. As used herein, a cloud device can refer to device and services platform 1665.

Each Internet device (e.g., terminal 1655 and/or terminal 1660) can securely access the data and services platform 1665 via a channel and/or interact with other Internet devices through the data and services platform 1665. In some embodiments, Internet of Things devices (e.g., terminal 1655 and/or terminal 1660) communicate directly with each other based on the context.

According to various embodiments, interconnecting a large number of terminals is implemented by connecting all the terminals to a network and ensuring (e.g., allocating) a unique identity to each terminal. In some embodiments, a unique terminal ID, such as an ID2 (Internet terminal ID), is assigned to each smart device and the ID is permanently set with respect to the corresponding terminal (e.g., the ID2s are set within chips) so that the terminal ID cannot be falsified or predicted and is globally unique. Devices can discover each other and connect with each other through the secure communication mode in connection with establishing autonomous networks and reliable self-coordinating networks and efficiently transfer services via big data service platforms.

It should be noted that in the several embodiments provided by the present invention, the disclosed system, device, and method may be realized in other ways. For example, the device embodiment described above is merely illustrative. For example, the delineation of units is merely a delineation according to local function. The delineation can take a different form during actual implementation.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, all the functional units in the various embodiments of the present invention could be integrated in a processing unit. Or each unit could physically exist on its own, or two or three or more units could be integrated into one unit. The aforesaid integrated units can take the form of hardware, or they can take the form of hardware combined with software function units.

The units described above, in which the software function units are integrated, can be stored in a computer-readable storage medium. The software function units described above are stored in a storage medium and include a number of instructions whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

The preferred embodiments of the present invention that are described above are merely that and do not limit the present invention. Any modification, equivalent substitution, or improvement that is made in keeping with the spirit and principles of the present invention shall be included within the protective scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first terminal, having an associated terminal ID; and
a server;
wherein:

at least one of the first terminal and the server establishes a channel between the first terminal and the server based at least in part on the terminal ID, the channel corresponding to a communication channel that is to be used by the first terminal and the server to communicate data;

the terminal ID is used to authenticate the first terminal in connection with the channel being established between the first terminal and the server; and the channel between the first terminal and the server is established using parameter information that is provided to the first terminal in response to the first terminal being authenticated;

a device profile that corresponds to the first terminal is registered with the server in association with the first terminal based at least in part on the terminal ID, and the device profile comprise a mapping of events to actions;

in response to the first terminal determining that an event occurred, the first terminal communicates an event message to the server;

the event message comprises an indication of the event;

the server determines one or more operations to be performed in response to the event; and a determination of the one or more operations is based at least in part on the indication of the event and performing a lookup with respect to the mapping of events to actions comprised in the device profile that corresponds to the first terminal.

2. The system of claim 1, wherein the terminal ID is preset and stored in a secure zone of the first terminal.

3. The system of claim 1, wherein the terminal ID is unique at least with respect to an Internet of Things system to which the first terminal and the server belong.

4. The system of claim 1, wherein the terminal ID is allocated by the server.

5. The system of claim 1, wherein the terminal ID is unique at least with respect to the system, the terminal ID being allocated based at least in part on one or more ID generating rules.

6. The system of claim 1, wherein:

an authentication code provided by the first terminal is used in connection with authenticating the first terminal, in response to the first terminal being authenticated, the parameter information is provided to the first terminal, the parameter information being used in connection with establishing the channel, and the parameter information comprising a seed key used in connection with encryption/decryption of information communicated across the channel.

7. The system of claim 6, further comprising a management server, the management server being configured to perform at least part of authentication of the first terminal, and to provide the parameter information to the first terminal in response to successful authentication of the first terminal.

8. The system of claim 1, wherein the parameter information comprises a session identifier (ID), an IP address of the server, and a port number.

9. The system of claim 1, wherein the parameter information further comprises a seed key, the seed key being used in connection with encrypting data transmitted across the channel.

10. The system of claim 1, wherein the first terminal is configured to determine whether an event occurred, and to communicate an event message to the server in response to determining that the event occurred.

11. The system of claim 10, wherein the event message is indicative that the event occurred.

12. The system of claim 10, wherein the first terminal comprises one or more sensors that obtain data from which the first terminal determines that the event occurred.

13. The system of claim 10, wherein the event message comprises an event identifier and one or more event conditions.

14. The system of claim 10, wherein the server is configured to obtain the event message, to determine one or more control instructions based at least in part on the event corresponding to the event message, and to communicate the one or more control instructions to the first terminal.

15. The system of claim 14, wherein the first terminal is configured to perform one or more operations corresponding to the one or more control instructions, the first terminal performing the one or more operations in response to obtaining the one or more control instructions from the server.

16. The system of claim 10, further comprising:

a second terminal, wherein the server is configured to obtain the event message, to determine one or more control instructions based at least in part on the event corresponding to the event message, and to communicate the one or more control instructions to the second terminal.

17. The system of claim 1, wherein:

the one or more operations to be performed in response to the event comprises communicating one or more instructions to at least one terminal in a set of terminals registered with a service provided by the server; and the set of terminals registered with a service provided by the server comprises the first terminal.

18. The system of claim 1, wherein the first terminal is configured to resend the event message to the server in response to a determination that the first terminal does not receive a response message from the server within a predefined period of time.

19. The system of claim 1, wherein:

the one or more operations that the server performs in response to receiving the event message comprises sending an instruction to a second terminal to control the second terminal in connection with the server receiving the event message from the first terminal; and the server resends to the second terminal the instruction in response to a determination that the server does not receive within a preset period of time an acknowledgement or indication that a function corresponding to the instruction is completed by the second terminal.

20. The system of claim 1, wherein the determining, by the first terminal, that the event occurred comprises:

detecting, by the first terminal, that change occurred with respect to a context associated with the first terminal or an environment in which the first terminal is disposed.

21. A method, comprising:

performing, by one or more processors, an authentication of a first terminal based at least in part on a terminal ID associated with the first terminal, the authentication of the first terminal being performed in connection with a channel being established between the first terminal and a server; and establishing, by one or more processors, the channel between the first terminal and the server based at least in part on the terminal ID associated with the first terminal, the channel corresponding to a communication channel that is to be used by the first terminal and the server to communicate data, wherein:
the channel between the first terminal and the server is established using parameter information that is provided to the first terminal in response to the first terminal being authenticated;
a device profile that corresponds to the first terminal is registered with the server in association with the first terminal based at least in part on the terminal ID, and the device profile comprises a mapping of events to actions;
in response to the first terminal determining that an event occurred, the first terminal communicates an event message to the server;
the event message comprises an indication of the event;
the server determines one or more operations to be performed in response to the event; and
a determination of the one or more operations is based at least in part on the indication of the event and performing a lookup with respect to the mapping of events to actions comprised in the device profile that corresponds to the first terminal.

22. The method of claim 21, further comprising:
determining, by the one or more processors, that an event occurred;
communicating, by the one or more processors, an event message from the first terminal to the server, the event message being indicative that an event occurred with respect to the first terminal, and the event message being communicated over the channel;
obtaining, by the one or more processors, an instruction from the server, the instruction corresponding to one or more operations to be performed in response to the event, wherein the server determines the instruction based at least in part on the event corresponding to the event message; and
performing, by the one or more processors, the one or more operations.

23. The method of claim 22, wherein the one or more operations include controlling a function of the first terminal.

24. The method of claim 23, wherein the function comprises one or more of controlling a volume, controlling a brightness, and controlling a playback.

25. The method of claim 21, further comprising:
obtaining, by the one or more processors, an event message from the first terminal, the event message being indicative that an event occurred with respect to the first terminal, and the event message being communicated over the channel;
determining, by the one or more processors, an instruction based at least in part on the event corresponding to the event message, the instruction corresponding to one or more operations to be performed in response to the event, wherein the server determines the instruction based at least in part on the event message; and
communicating, by the server, the instruction to the first terminal.

26. A computer program product, the computer program product being embodied in a non-transitory computer readable storage medium and comprising computer instructions for:
performing, by one or more processors, an authentication of a first terminal based at least in part on a terminal ID associated with the first terminal, the authentication of the first terminal being performed in connection with a channel being established between a first terminal and a server; and
establishing, by one or more processors, the channel between the first terminal and the server based at least in part on the terminal ID associated with the first terminal, the channel corresponding to a communication channel that is to be used by the first terminal and the server to communicate data;
wherein:
the channel between the first terminal and the server is established using parameter information that is provided to the first terminal in response to the first terminal being authenticated;
a device profile that corresponds to the first terminal is registered with the server in association with the first terminal based at least in part on the terminal ID, and the device profile comprises a mapping of events to actions;
in response to the first terminal determining that an event occurred, the first terminal communicates an event message to the server;
the event message comprises an indication of the event;
the server determines one or more operations to be performed in response to the event; and
a determination of the one or more operations is based at least in part on the indication of the event and performing a lookup with respect to the mapping of events to actions comprised in the device profile that corresponds to the first terminal.

\* \* \* \* \*